United States Patent
Sakai

(10) Patent No.: US 10,261,589 B2
(45) Date of Patent: Apr. 16, 2019

(54) INFORMATION PROCESSING APPARATUS, INFORMATION PROCESSING METHOD, AND COMPUTER PROGRAM

(71) Applicant: Saturn Licensing LLC, New York, NY (US)

(72) Inventor: Yusuke Sakai, Kanagawa (JP)

(73) Assignee: Saturn Licensing LLC, New York, NY (US)

( * ) Notice: Subject to any disclaimer, the term of this patent is extended or adjusted under 35 U.S.C. 154(b) by 269 days.

(21) Appl. No.: 14/368,950

(22) PCT Filed: Jan. 9, 2013

(86) PCT No.: PCT/JP2013/000034
§ 371 (c)(1),
(2) Date: Jun. 26, 2014

(87) PCT Pub. No.: WO2013/105493
PCT Pub. Date: Jul. 18, 2013

(65) Prior Publication Data
US 2014/0365927 A1    Dec. 11, 2014

(30) Foreign Application Priority Data

Jan. 13, 2012    (JP) .................................. 2012-005551

(51) Int. Cl.
*G06F 3/048*    (2013.01)
*G06F 3/01*    (2006.01)
(Continued)

(52) U.S. Cl.
CPC ............. *G06F 3/017* (2013.01); *G06F 3/0481* (2013.01); *G06F 3/0484* (2013.01); *G06F 3/0488* (2013.01)

(58) Field of Classification Search
CPC ........................................................ G06F 3/048
See application file for complete search history.

(56) References Cited

U.S. PATENT DOCUMENTS 8,957,847 B1 *  2/2015  Karakotsios ............ G06F 3/013
                                                            345/156
2008/0172627 A1 * 7/2008  Hagawa .............. G06F 3/04892
                                                            715/765
(Continued)

FOREIGN PATENT DOCUMENTS

EP          2065795 A1     6/2009
EP          2315439 A1     4/2011
(Continued)

OTHER PUBLICATIONS http://www.autodeskresearch.com/publications/medusa (Dec. 15, 2011), UIST'11, Oct. 16-19, 2011, Santa Barbara, CA, USA "Medusa: A Proximity-Aware Multi-touch Tabletop" pp. 337-346.
(Continued)

*Primary Examiner* — Xuyang Xia
(74) *Attorney, Agent, or Firm* — Lerner, David, Littenberg, Krumholz & Mentlik, LLP

(57) ABSTRACT

An information processing apparatus may include a control unit to control a user interface based on a determination of (i) a change in position of a user and (ii) a state of the user, by detecting at least one information signal input to the apparatus from outside of the apparatus.

18 Claims, 54 Drawing Sheets

(51) Int. Cl.
*G06F 3/0488* (2013.01)
*G06F 3/0481* (2013.01)
*G06F 3/0484* (2013.01)

(56) References Cited

U.S. PATENT DOCUMENTS

| | | | |
|---|---|---|---|
| 2009/0079765 A1 | 3/2009 | Hoover | |
| 2009/0141147 A1* | 6/2009 | Alberts | G06F 3/012 348/240.99 |
| 2010/0192079 A1* | 7/2010 | Nagahiro | G06F 3/147 715/765 |
| 2010/0251171 A1 | 9/2010 | Parulski | |
| 2011/0135114 A1 | 6/2011 | Oba et al. | |
| 2012/0019447 A1* | 1/2012 | Hanes | G06F 1/3203 345/168 |
| 2013/0016102 A1* | 1/2013 | Look | G06T 15/20 345/426 |

FOREIGN PATENT DOCUMENTS

| | | |
|---|---|---|
| JP | 2004185139 A | 7/2004 |
| JP | 2007272365 A | 10/2007 |
| JP | 2008269044 A | 11/2008 |
| JP | 2008293419 A | 12/2008 |
| JP | 2010016432 A | 1/2010 |
| JP | 2010035477 A | 2/2010 |
| JP | 2010-170573 A | 8/2010 |
| JP | 2011203975 A | 10/2011 |
| JP | 2012003690 A | 1/2012 |
| WO | 2010035477 A | 4/2010 |
| WO | 2011-040932 A1 | 4/2011 |

OTHER PUBLICATIONS

Japanese Office Action for JP Application No. 2012005551, dated Nov. 10, 2015.
http://www.autodeskresearch.com/publications/medusa (Dec. 15, 2011).
International Search Report from International Publication PCT/JP2013/000034 dated Mar. 22, 2013.
Japanese Office Action for JP Application No. 2012005551, dated Mar. 15, 2016.
Chinese Office Action for Application No. 201380004826.9 dated Sep. 26, 2016.
European Office Action for Application No. EP13701300.9 dated Jul. 20, 2016.

* cited by examiner

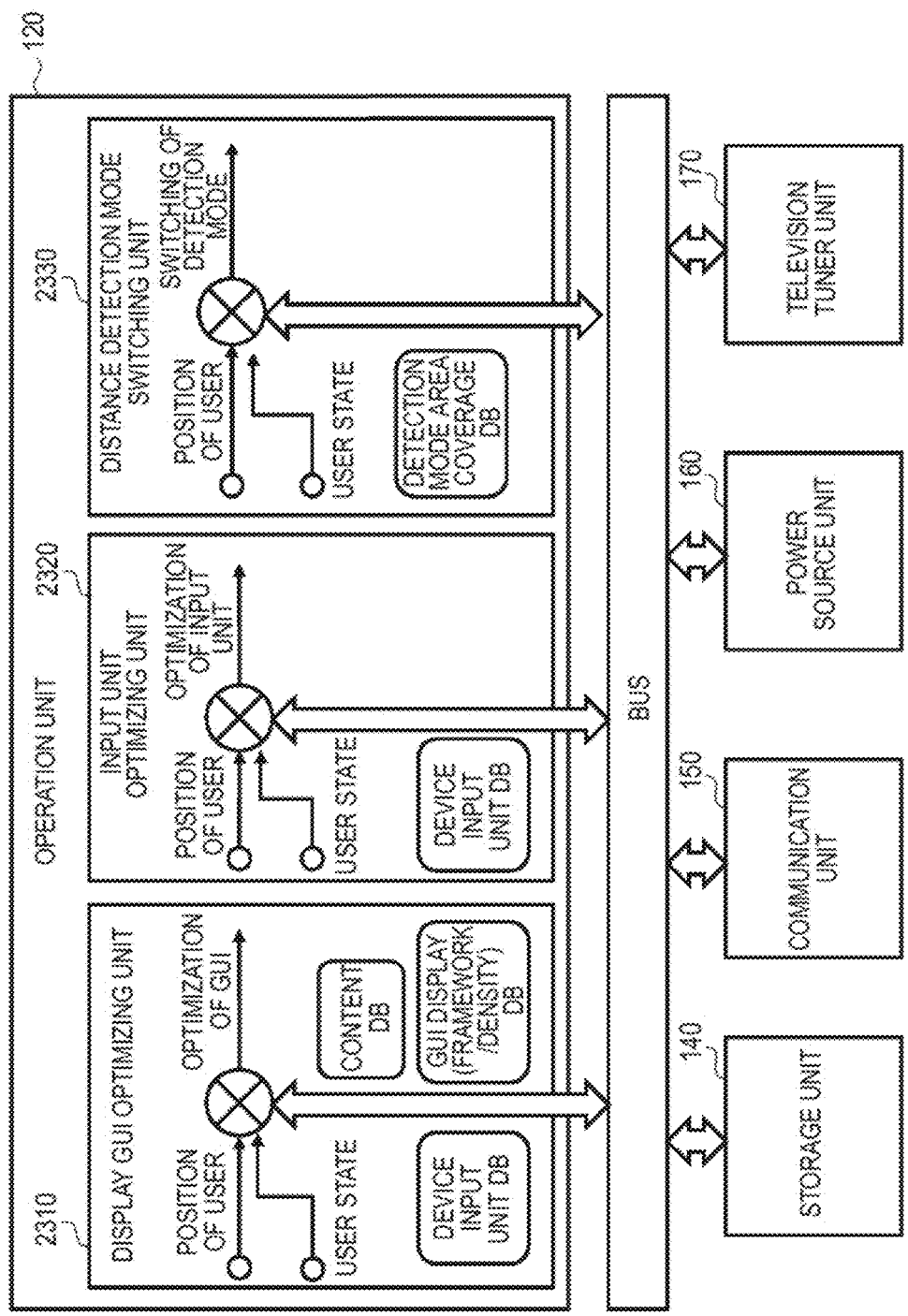

WAITING STATE
(SCREEN OFF)

USER APPEARS
(NOT BEING WATCHED)

AUTOMATIC ZAPPING
(RANDOM)

USER IS WATCHING
(NO MANIPULATION)

AUTOMATIC ZAPPING
(DISPLAY OF STAGES)

USER IS WATCHING
(MANIPULATION USING REMOTE CONTROLLER)

USER IS WATCHING
(TOUCH MANIPULATION)

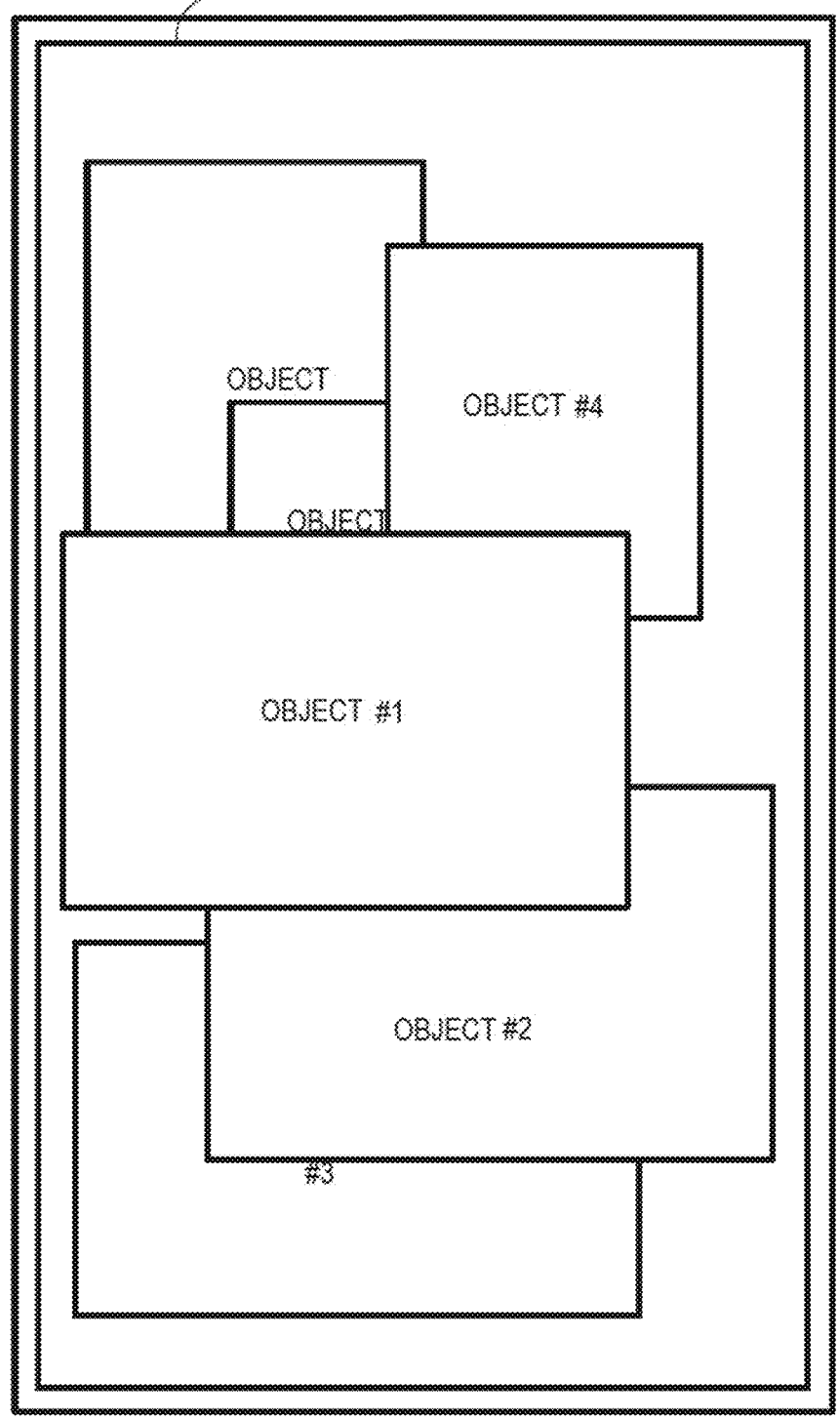

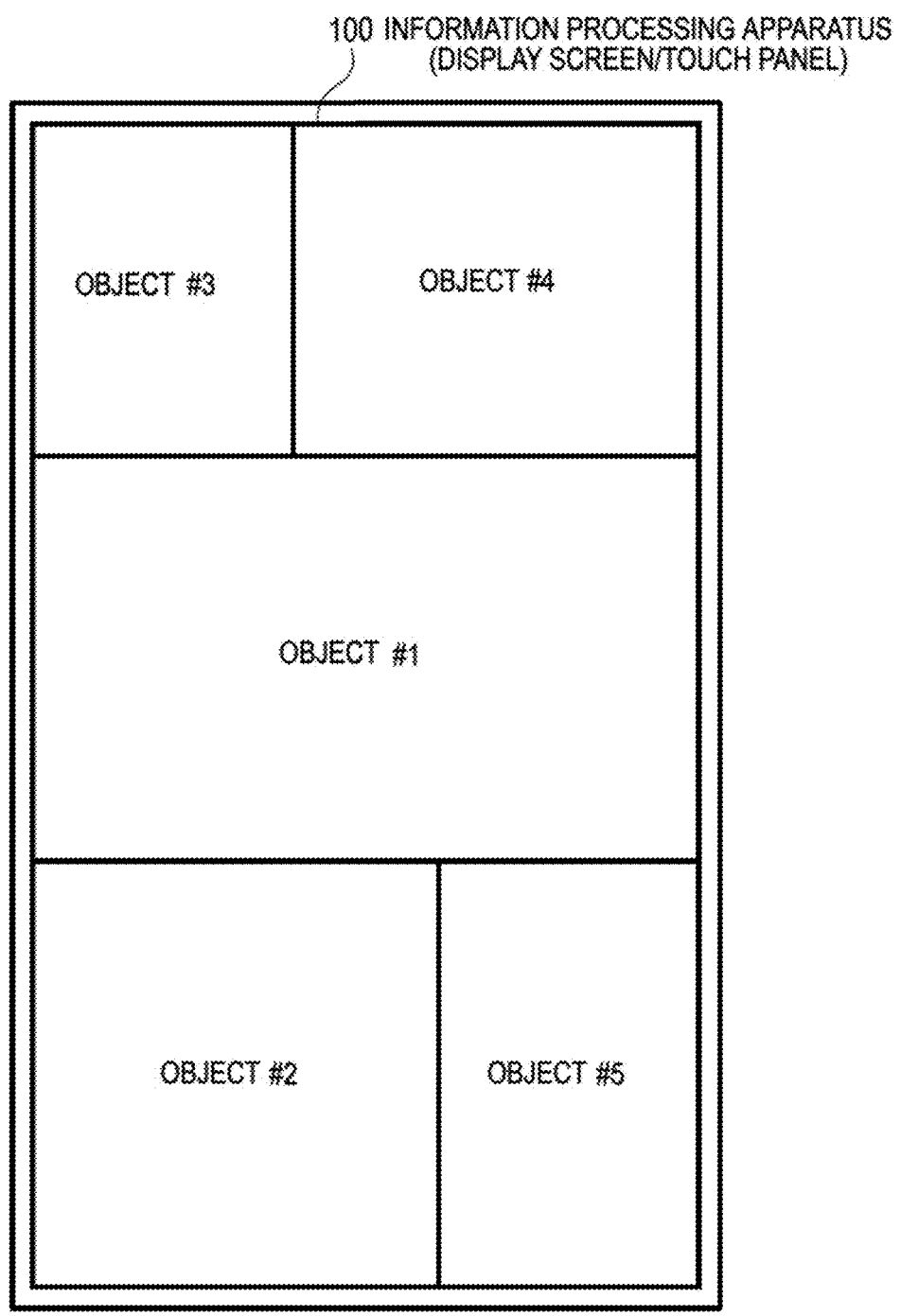

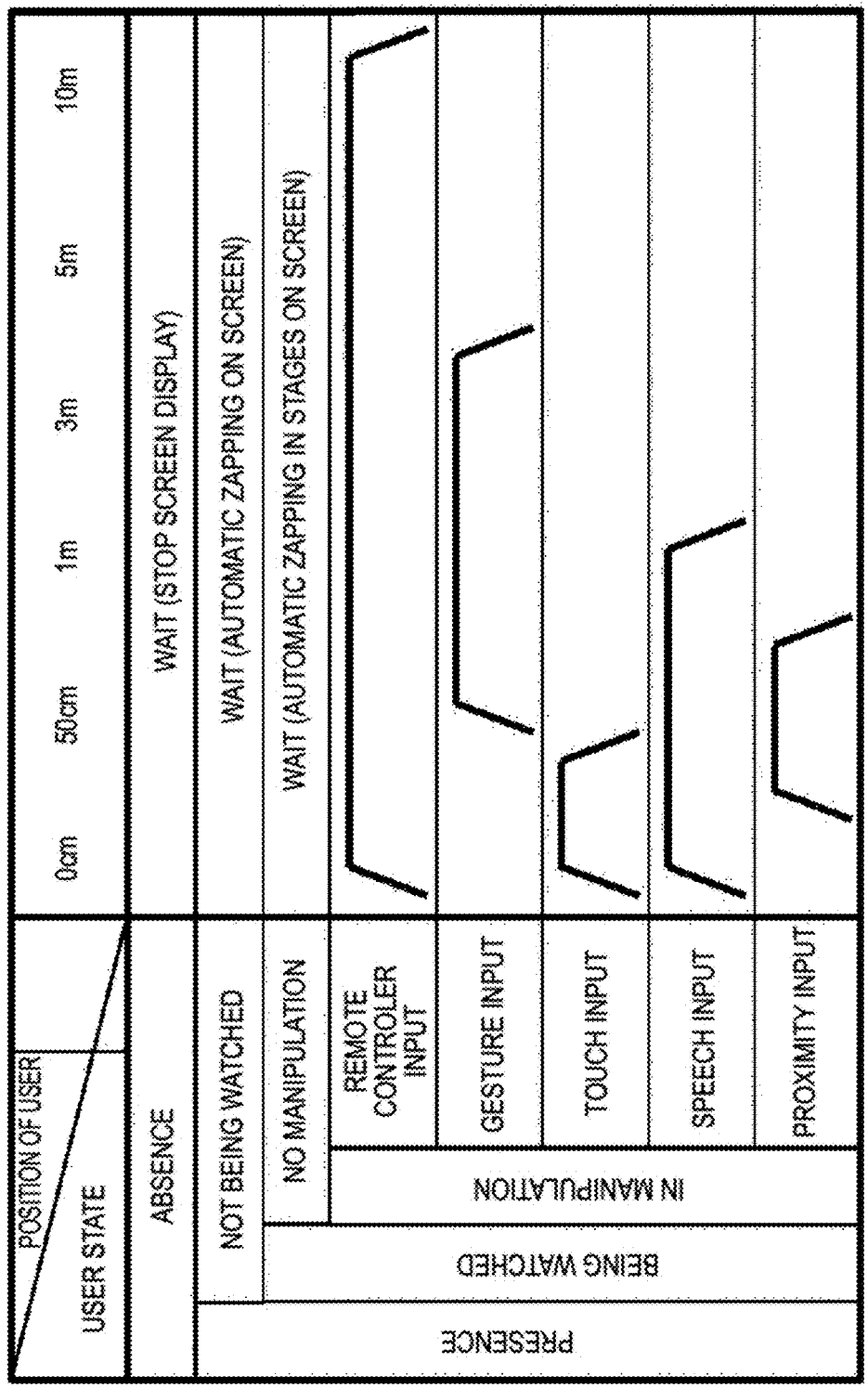

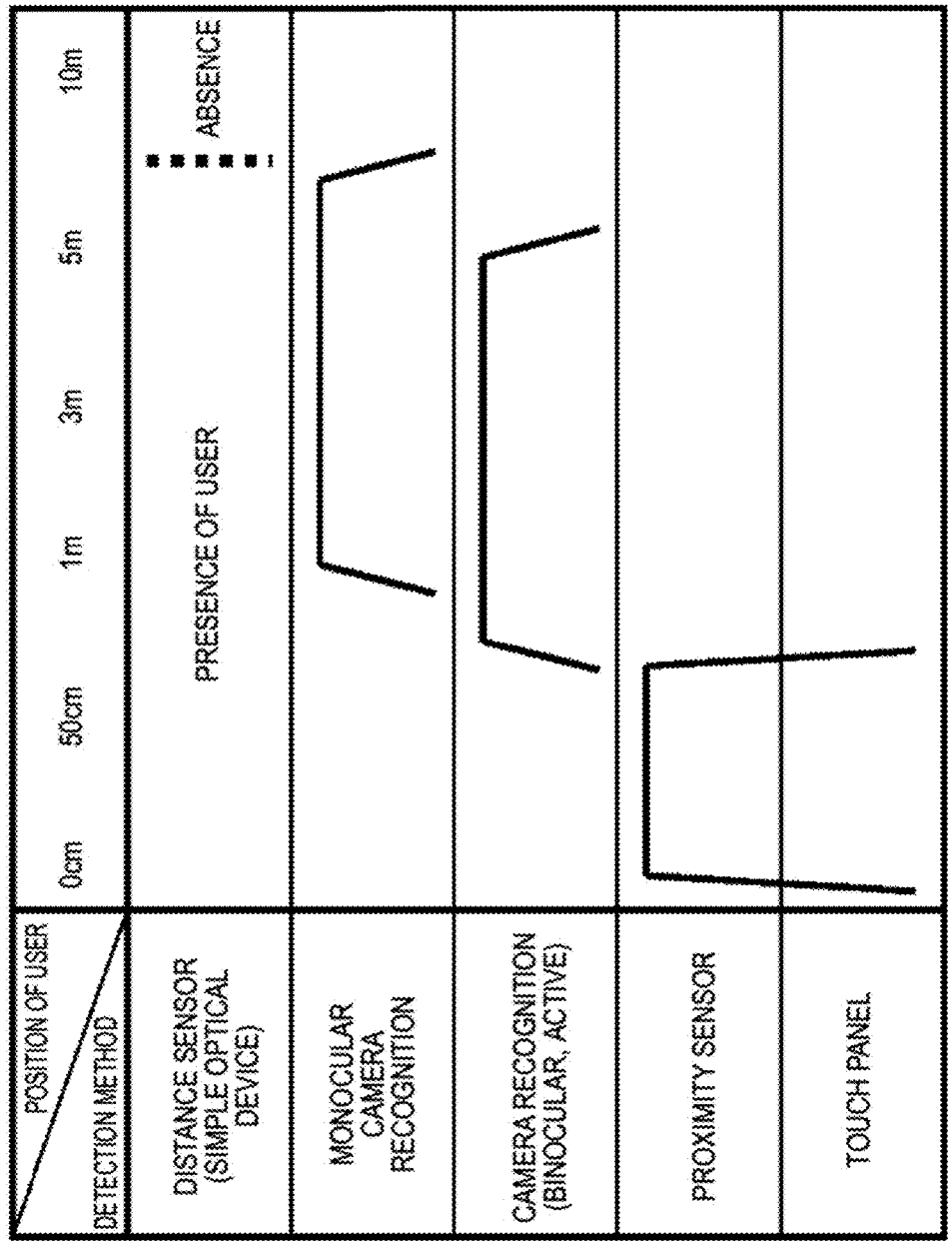

FIG.30
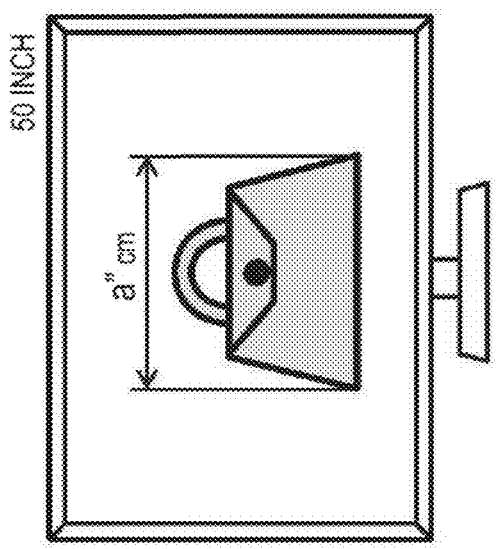
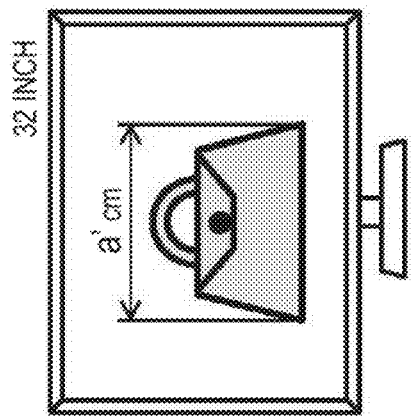
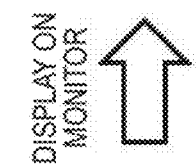
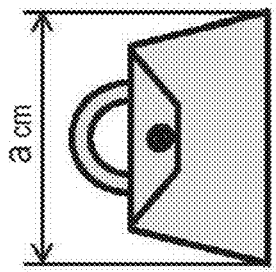

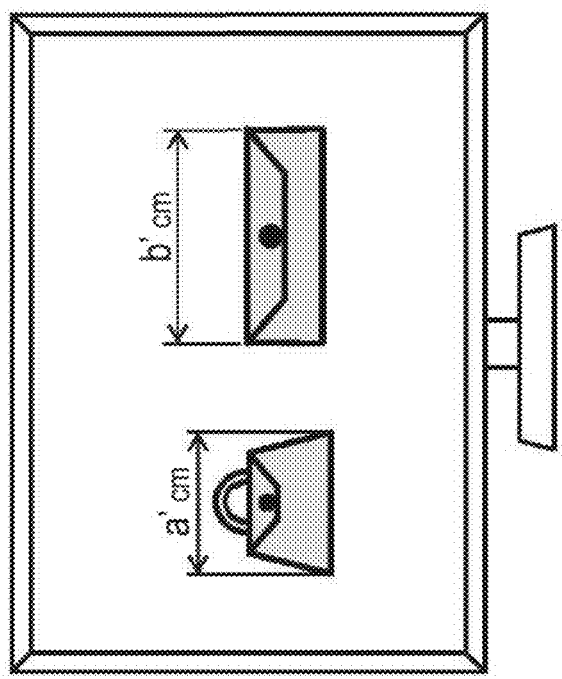
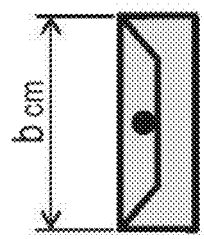
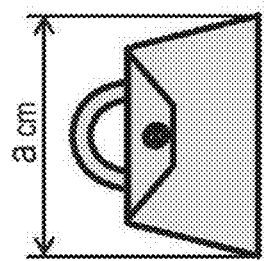
FIG.31

FIG. 34
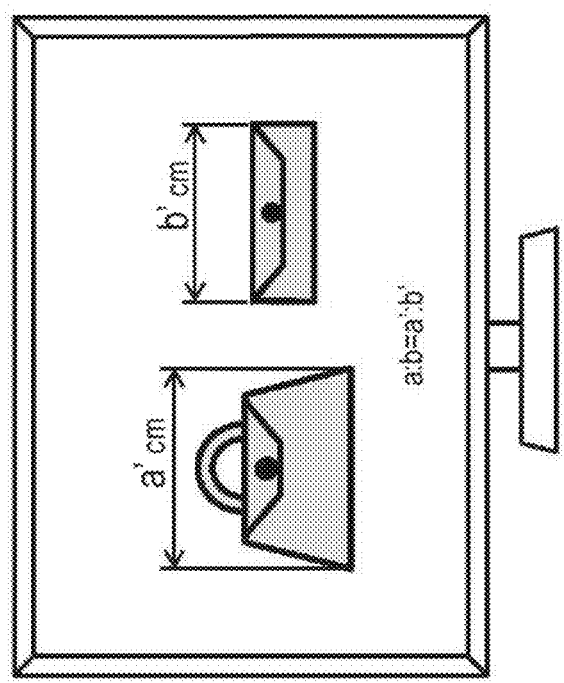
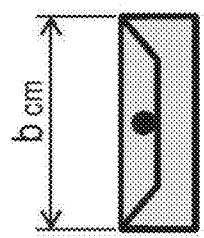
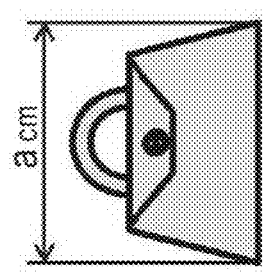

FIG.35
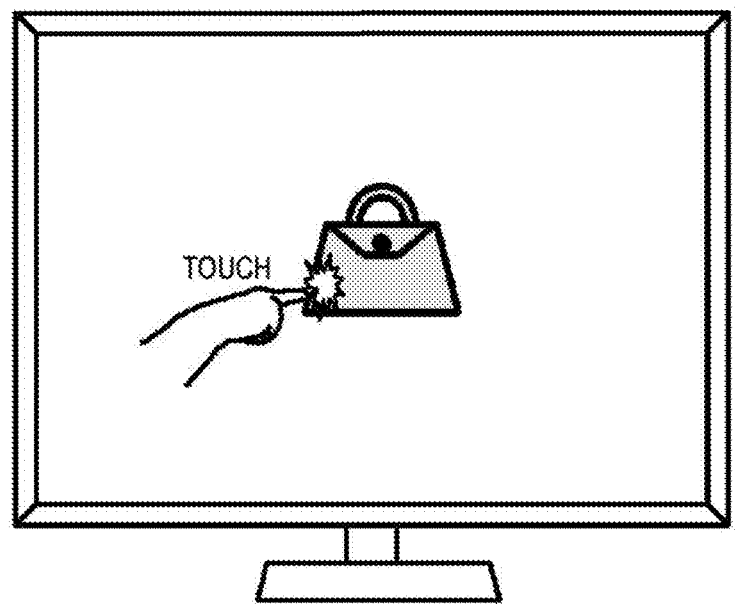
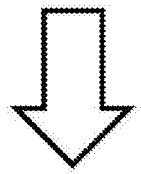
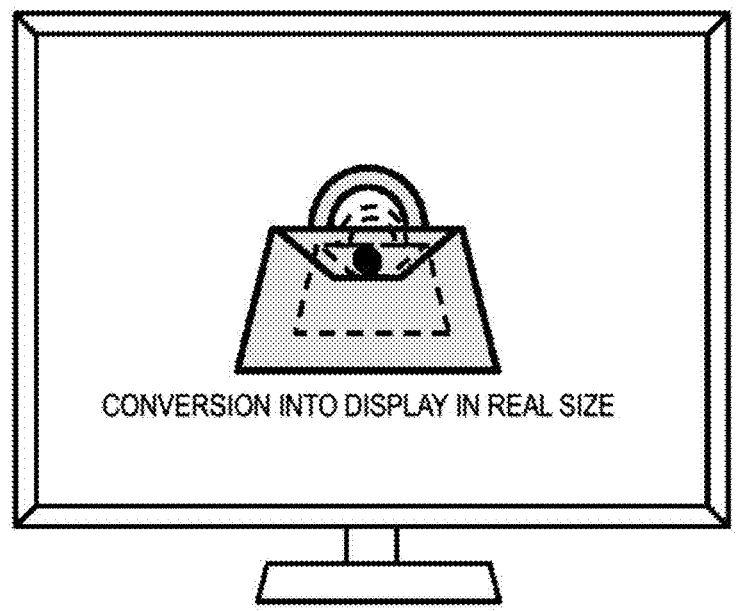

FIG.36
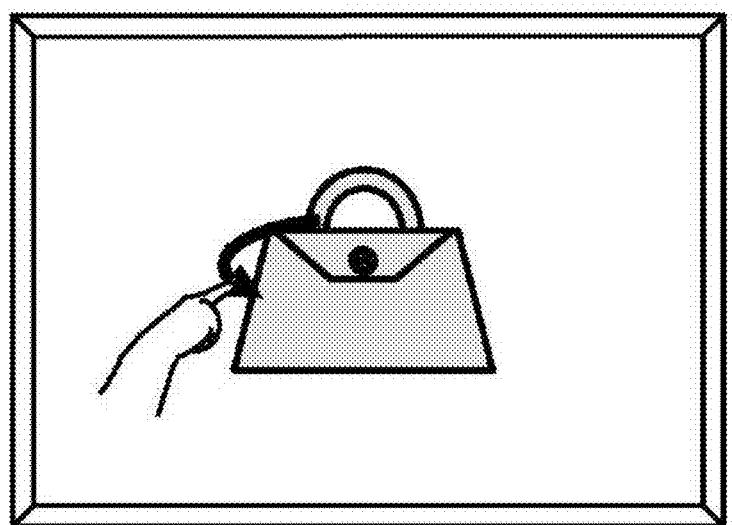
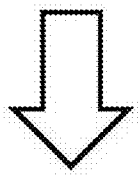
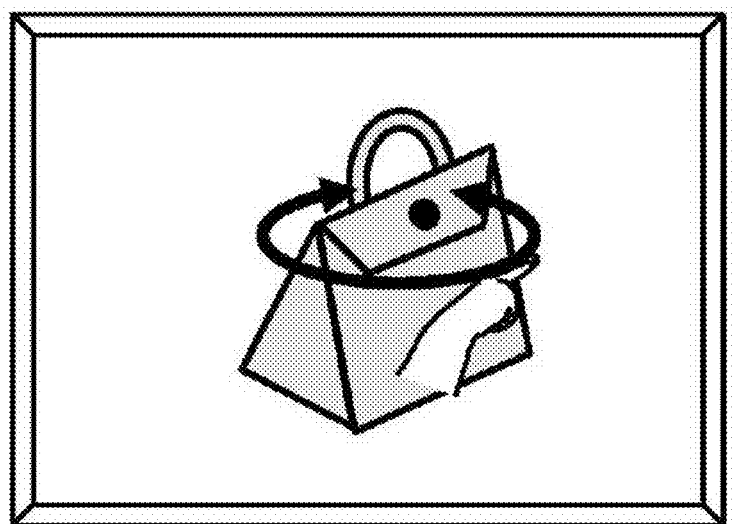

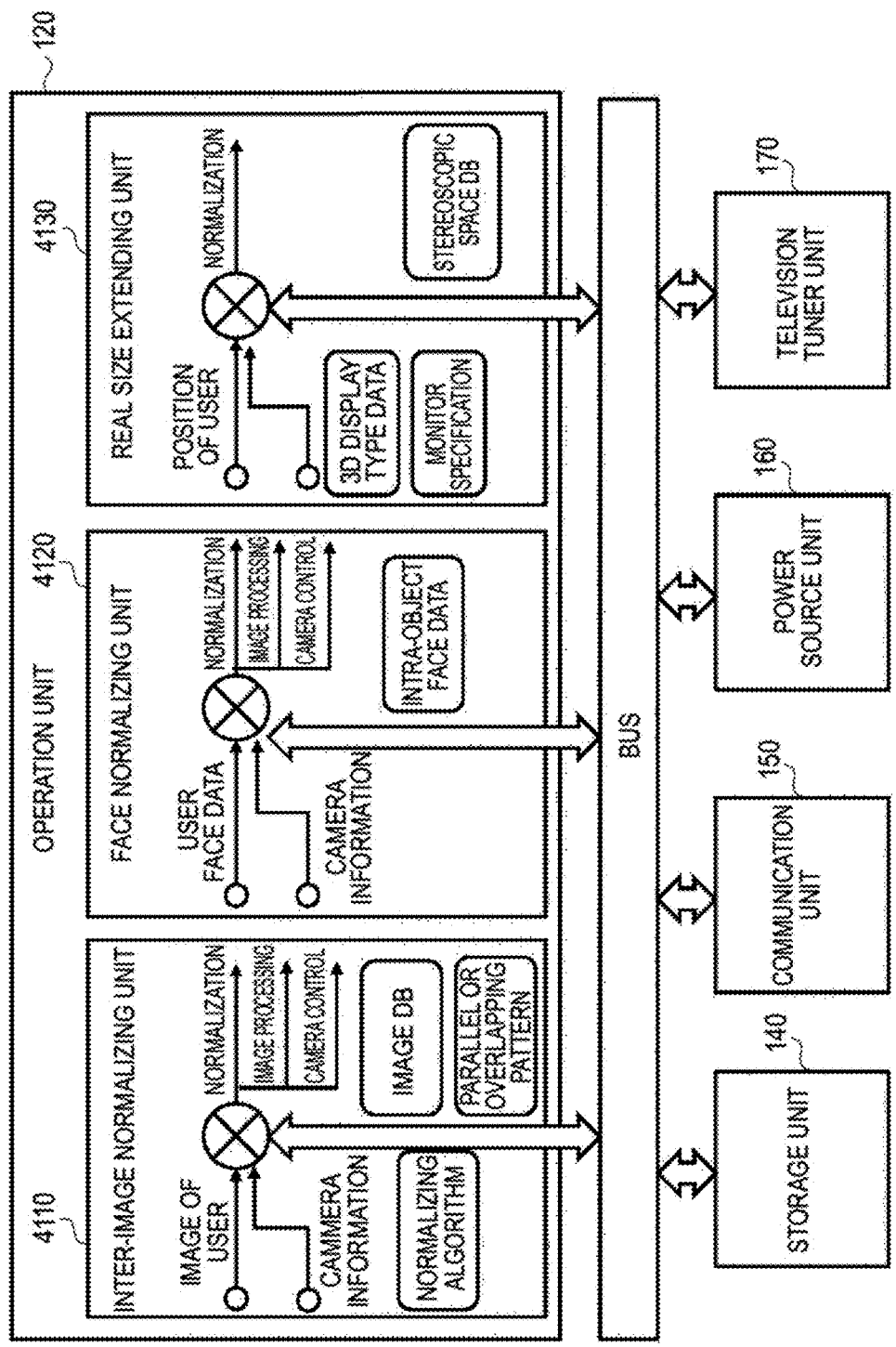

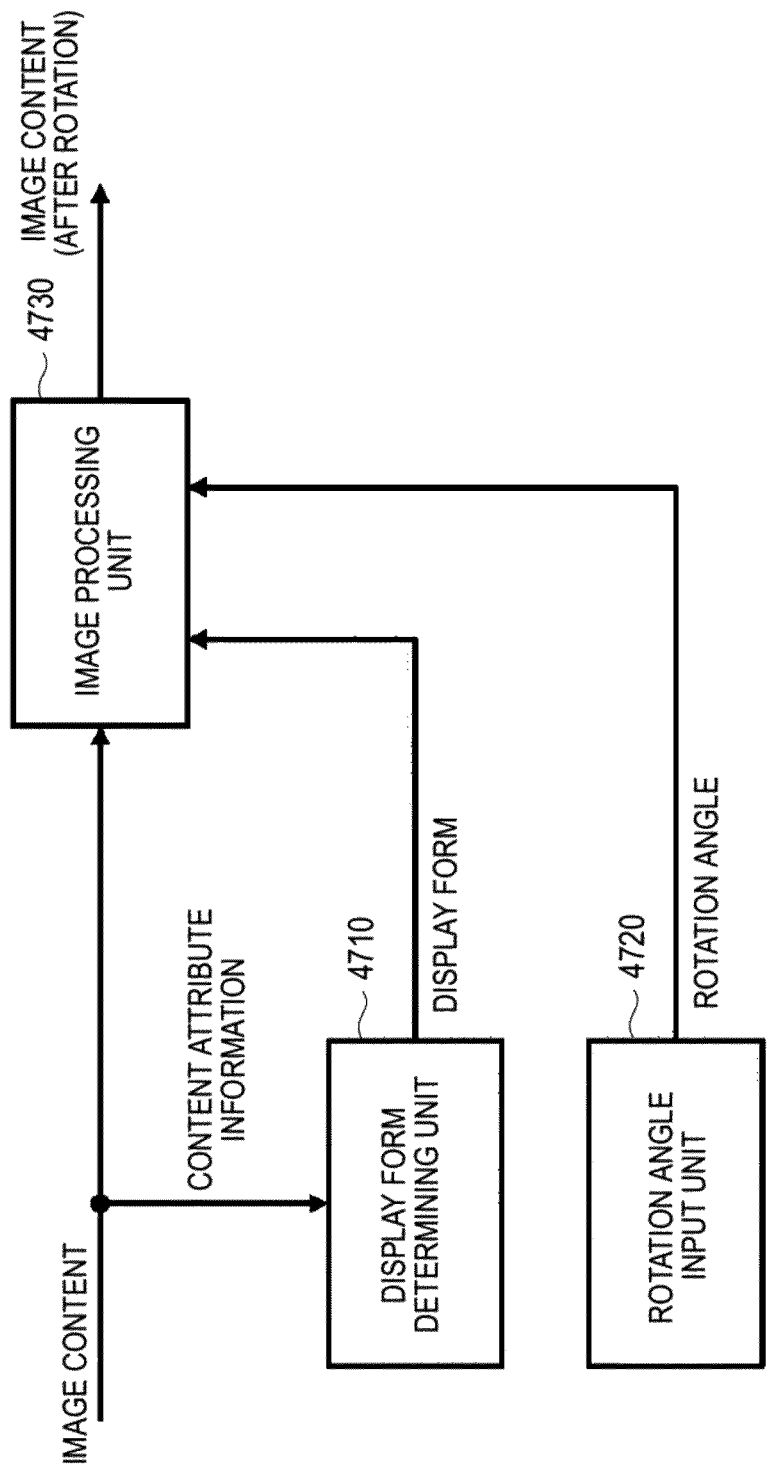

INFORMATION PROCESSING APPARATUS, INFORMATION PROCESSING METHOD, AND COMPUTER PROGRAM

CROSS-REFERENCE TO RELATED APPLICATIONS

The present application is a national phase entry under 35 U.S.C. § 371 of International Application No. PCT/JP2013/000034 filed Jan. 9, 2013, published on Jul. 18, 2013 as WO 2013/105493 A1, which claims priority from Japanese Patent Application JP 2012-005551 filed in the Japan Patent Office on Jan. 13, 2012, the entire contents of which is hereby incorporated by reference.

TECHNICAL FIELD

The present disclosure relates to an information processing apparatus having a display screen also used as an input unit such as a touch panel, an information processing method thereof, and a computer program thereof, and more particularly, to an information processing apparatus including a large screen, capable of being shared by plural users, and allowing plural users to perform a collaborative action through manipulation of a touch panel, an information processing method thereof, and a computer program thereof.

BACKGROUND ART

In recent years, tablet terminals having a display screen also used as an input unit such as a touch panel have spread rapidly. Since a manipulation method of a tablet terminal can be visually easily seen using a widget or a desktop as an interface, the tablet terminal can be more conveniently used by users than a personal computer to which an input manipulation is carried out through the use of a keyboard or a mouse.

A touch sensitive device has been proposed which reads data based on a touch input associated with a multipoint sensing device such as a multipoint touch screen from the multipoint sensing device and which identifies a multipoint gesture on the basis of the data read from the multipoint sensing device (for example, see PTL 1).

In general, plural objects to be manipulated by a user are arranged in various orientations on a screen of a tablet terminal. The individual objects to be manipulated may include reproduction contents such as moving images or still images, E-mails or messages received from another user, and the like. It is necessary for a user to individually rotationally manipulate a tablet terminal body in order to display a desired object to be manipulated to exactly face the user. For example, a tablet terminal having a size of A4 or A5 can be easily rotationally manipulated. However, when a tablet terminal has a large screen of several tens of inches, it is difficult for a single user to rotationally manipulate the tablet terminal whenever manipulating an object.

A utilization form in which plural users manipulate individual objects in a tablet terminal with a large screen at the same time can be considered.

For example, a tablet terminal has been proposed which identifies an area between a right arm and a left arm of a user and which maps the area onto a touch point area of the user when a place where the user is present in lateral edges of a terminal is detected through the use of a proximity sensor (for example, see NPL 1). When plural users are detected, the tablet terminal prohibits a user to manipulate an object manipulated by another user so as to rotate the object to exactly face the user, by setting individual manipulation rights of the users to each object or inhibiting an additional participation of a user in advance.

As a utilization form in which a tablet terminal with a large screen is shared by plural users, a case where users exchange objects to be manipulated and perform a collaborative action can be considered in addition to the case where the users individually manipulate the objects to be manipulated as described above. When touch point areas to be occupied by the users are set and the objects to which a manipulation right is given are manipulated in each area by the users, it is difficult to realize a collaborative action.

When a GUI displayed on a screen of a terminal is constant without being dependent on a distance between a user and the screen or a user state, there is a problem in that a user may be located far away but information displayed on the screen may be too fine to allow the information to be understood well, or a user may be located nearby but there is a small amount of information displayed on the screen. Similarly, when an input unit that allows a user to manipulate the terminal is constant without being dependent on a distance between a user and the screen or a user state, there is a problem in that a user may be located nearby but has no remote controller used to manipulate the terminal, or it may be necessary for a user to approach the terminal in order to manipulate a touch panel.

In an object display system according to the related art, an image of an object actually existing is displayed on a screen without considering information of the real size thereof. Accordingly, there is a problem in that the size of the object to be displayed varies depending on the size of the screen or the resolution (dpi) thereof.

In the display system, when image contents of plural sources are simultaneously displayed on the screen in a parallel or overlapping manner, the size relationship of the images simultaneously displayed is not correct and the sizes or positions of corresponding areas of the images are all different, whereby it is difficult for a user to recognize the images.

When the direction of a screen in a terminal having a rotating mechanism is changed, it is difficult for a user to recognize the image and it is thus necessary to rotate the display screen.

CITATION LIST

Patent Literature

[PTL 1] JP-A-2010-170573

Non Patent Literature

[NPL 1] http://www.autodeskresearch.com/publications/medusa
(Dec. 15, 2011)

SUMMARY

Technical Problem

It is desirable to provide an information processing apparatus that includes a large screen, that can be shared by plural users, and that can allow plural users to suitably perform a collaborative action through manipulation of a touch panel, an information processing method thereof, and a computer program thereof.

It is also desirable to provide an information processing apparatus that gives high convenience to a user's manipulation regardless of a position of a user or a user state, an information processing method thereof, and a computer program thereof.

It is also desirable to provide an information processing apparatus that can normally display images of objects in suitable sizes on a screen without being dependent on the sizes of actual objects or the size or resolution of the screen, an information processing method thereof, and a computer program thereof.

It is also desirable to provide an information processing apparatus that can suitably simultaneously display image contents of plural sources in a parallel or overlapping manner on a screen, an information processing method thereof, and a computer program thereof.

It is also desirable to provide an information processing apparatus that can optimally adjust display forms of image contents at any rotation angle or in the course of change thereof when rotating its body, an information processing method thereof, and a computer program thereof.

Solution to Problem

According to an embodiment of the disclosure, an information processing apparatus may include a control unit to control a user interface based on a determination of (i) a change in position of a user and (ii) a state of the user, by detecting at least one information signal input to the apparatus from outside of the apparatus.

According to an embodiment of the disclosure, an information processing method may include controlling, by a processor, a user interface based on a determination of (i) a change in position of a user and (ii) a state of the user, by detecting at least one information signal input to an information processing apparatus from outside of the apparatus.

According to an embodiment of the disclosure, a non-transitory recording medium may be recorded with a program executable by a computer, where the program may include controlling a user interface based on a determination of (i) a change in position of a user and (ii) a state of the user, by detecting at least one information signal input to an information processing apparatus from outside of the apparatus.

The computer programs according to the embodiments of the present disclosure define computer programs that are described in a computer-readable format so as to implement predetermined processes on a computer. In other words, by installing the computer programs according to the embodiments of the present disclosure in a computer, a collaborative action is carried out on the computer to achieve the same operational advantages as the information processing apparatuses according to other embodiments of the present disclosure.

Advantageous Effect

According to the embodiments of the present disclosure, it is possible to provide an information processing apparatus that includes a large screen, that can be shared by plural users, and that can allow plural users to suitably perform a collaborative action through manipulation of a touch panel, an information processing method thereof, and a computer program thereof.

According to the embodiments of the present disclosure, it is possible to provide an information processing apparatus that gives high convenience to a user by optimizing a display GUI or an input unit depending on a position of a user or a user state, an information processing method thereof, and a computer program thereof.

According to the embodiments of the present disclosure, it is possible to provide an information processing apparatus that can normally display images of objects in suitable sizes on a screen without being dependent on the sizes of actual objects or the size or resolution of the screen, an information processing method thereof, and a computer program thereof.

According to the embodiments of the present disclosure, it is possible to provide an information processing apparatus that can provide a screen which can be easily recognized by a user and in which sizes or positions of corresponding areas of images are matched with each other by performing an image normalizing process when simultaneously displaying image contents of plural sources in a parallel or overlapping manner on the screen, an information processing method thereof, and a computer program thereof.

According to the embodiments of the present disclosure, it is possible to provide an information processing apparatus that can optimally adjust display forms of image contents at any rotation angle or in the course of change thereof when rotating its body, an information processing method thereof, and a computer program thereof.

Other demands, features, or advantages of the present disclosure will become apparent from embodiments to be described later or detailed description with reference to the accompanying drawings.

BRIEF DESCRIPTION OF DRAWINGS

FIG. 23 is a diagram illustrating the internal configuration of the operation unit that performs an optimization process depending on a distance to a user.

FIG. 25A is a diagram illustrating a display example of a screen for randomly displaying various objects to be manipulated and automatically zapping the objects.

FIG. 26 is a diagram illustrating a display example of a screen in a state where a user watches a TV but does not manipulate the TV.

FIG. 28 is a diagram illustrating a table in which input unit optimizing processes, which are performed by an input unit optimizing unit, based on a position of a user and a user state are arranged.

FIG. 29 is a diagram illustrating a table in which distance detection mode switching processes, which are performed by a distance detection mode switching unit, based on a position of a user are arranged.

FIG. 30 is a diagram illustrating a problem of an object display system according to the related art.

FIG. 31 is a diagram illustrating a problem of an object display system according to the related art.

FIG. 34 is a diagram illustrating an example where images of two objects having different real sizes are displayed on the same screen with a correct mutual size relationship.

FIG. 35 is a diagram illustrating an example where an image of an object is displayed in a real size.

FIG. 36 is a diagram illustrating an example where an image of an object displayed in a real size is rotated or changed in posture.

FIG. 41 is a diagram illustrating the internal configuration of the operation unit that performs an image normalizing process.

FIG. 47 is a diagram illustrating the internal configuration of the operation unit that performs a process of adjusting the display form of an image content at any rotation angle of the information processing apparatus body or in the course of transition thereof.

DESCRIPTION OF EMBODIMENTS

Hereinafter, embodiments of the present disclosure will be described in detail with reference to the accompanying drawings.

A. System Configuration

Figure 1:
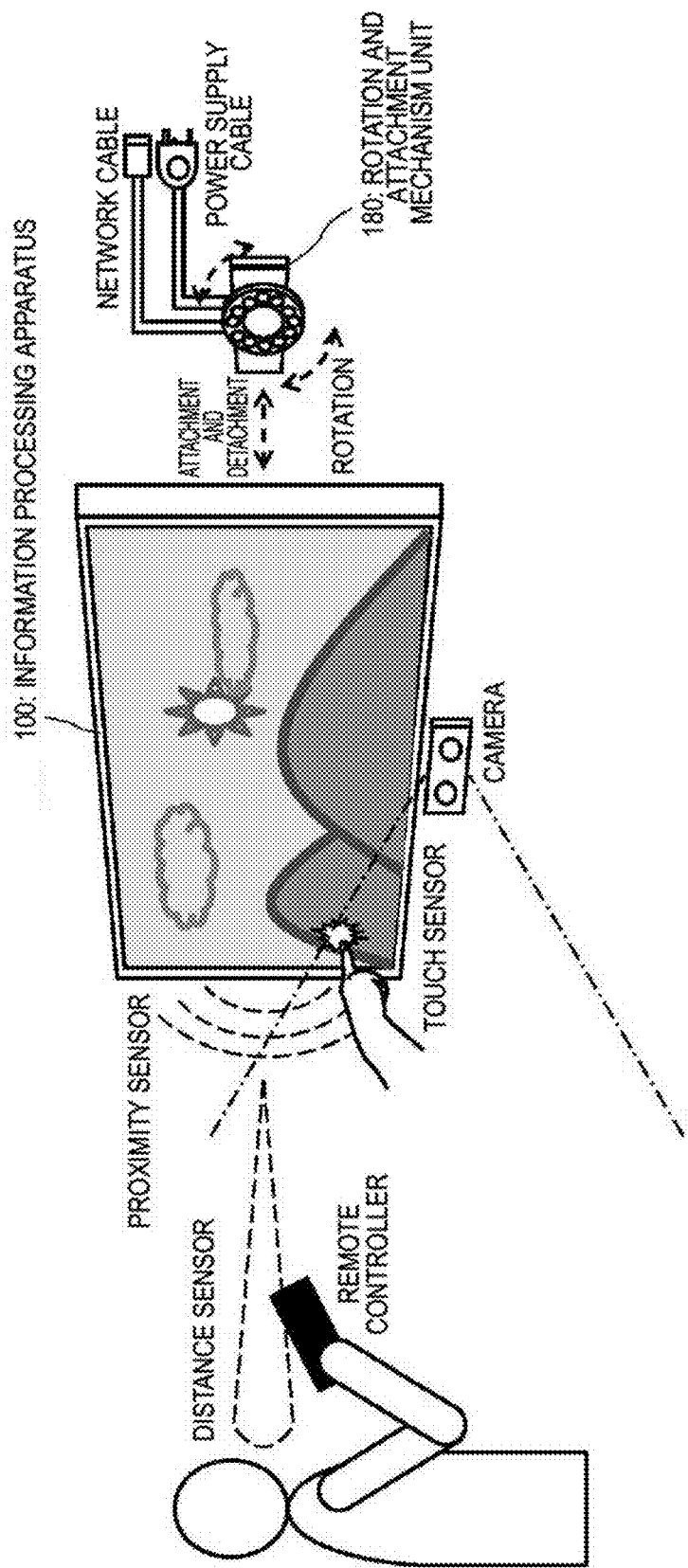
FIG. 1 is a diagram illustrating an example (WALL) of a utilization form of an information processing apparatus having a large screen.
Figure 2:
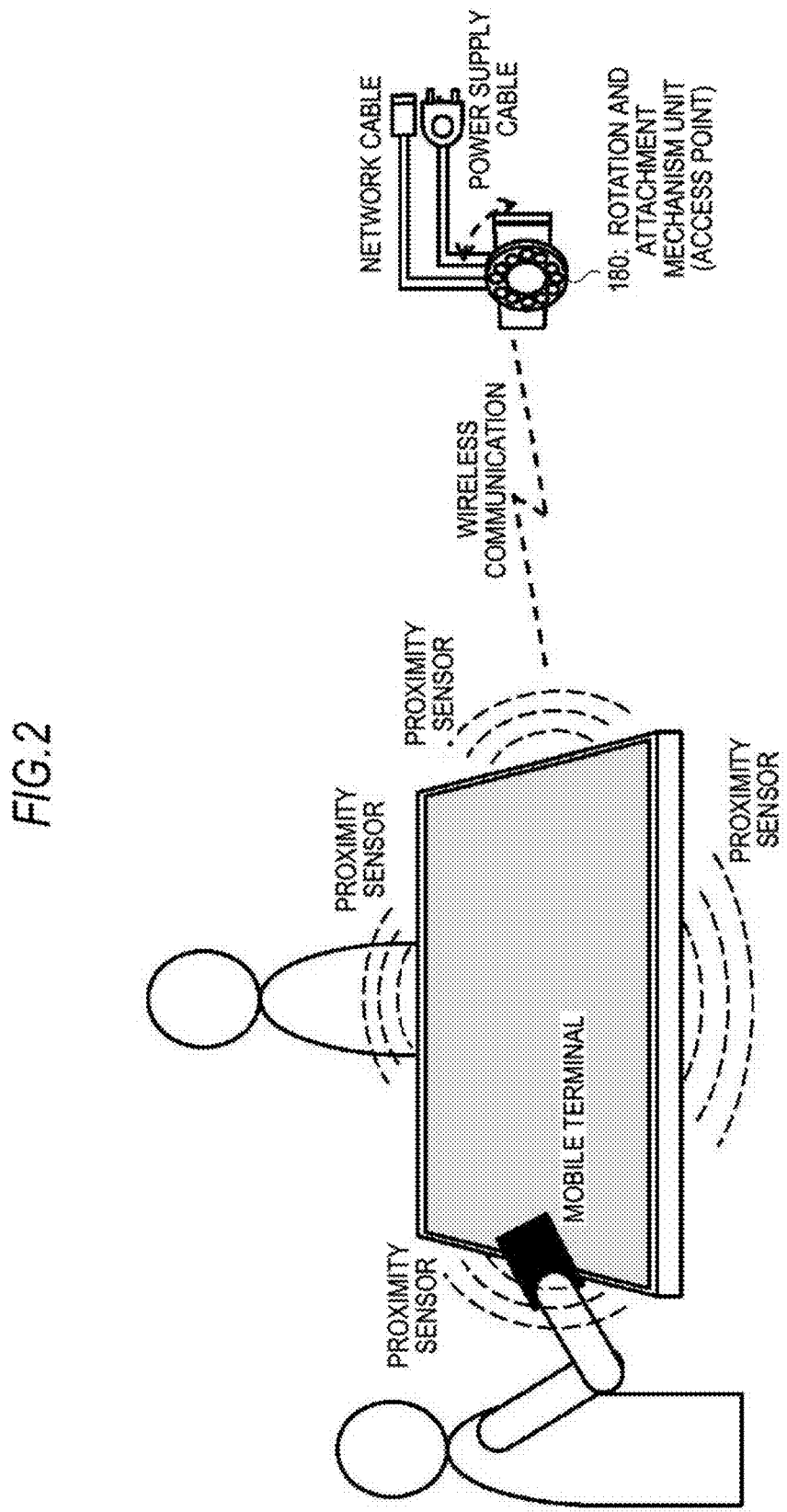
FIG. 2 is a diagram illustrating another example (TABLE-TOP) of the utilization form of the information processing apparatus having a large screen.

An information processing apparatus 100 according to an embodiment has a large screen, and a "WALL" form which is hung on a wall as shown in FIG. 1 and a "TABLETOP" form which is installed on a table as shown in FIG. 2 can be considered as principal utilization forms thereof.

In the "WALL" form shown in FIG. 1, the information processing apparatus 100 is rotatably and detachably attached to a wall, for example, by the use of a rotation and attachment mechanism unit 180. The rotation and attachment mechanism unit 180 also serves as an electrical contact between the information processing apparatus 100 and the outside thereof, and a power supply cable or a network cable (both of which are not shown in the drawings) is connected to the information processing apparatus 100 through the rotation and attachment mechanism unit 180, and the information processing apparatus 100 can receive driving power from a commercial AC power source and can access various servers on the Internet.

As described later, the information processing apparatus 100 includes a distance sensor, a proximity sensor, and a touch sensor and can acquire a position (distance and direction) of a user exactly facing a screen. When a user is detected or in a state where a user is being detected, a wave-like detection indicator (to be described later) or an illumination indicating a detection state can be expressed on the screen to give a visual feedback to the user.

The information processing apparatus 100 automatically selects an optimal interaction based on the position of the user. For example, the information processing apparatus 100 automatically selects or adjusts a GUI (Graphical User Interface) display such as a framework and an information density of an object to be manipulated on the basis of the position of the user. The information processing apparatus 100 can automatically select an input unit out of plural input units such as a touch input with a screen, a proximity input, a gesture using a hand or the like, a remote controller, and an indirect manipulation based on a user state on the basis of the position of the user or the distance to the user.

The information processing apparatus 100 includes one or more cameras and can also recognize a person, an object, or a device from an image captured with the cameras in addition to the position of the user. The information processing apparatus 100 includes a very-short-range communication unit and can also directly and naturally transmit and receive data to and from a device carried by a nearby user close within a very short range.

On a large screen of the WALL form, objects to be manipulated by a user are defined. Each object to be manipulated has a specific display area of a functional module such as a moving image, a still image, a text content, any Internet site, an application, or a widget. The objects to be manipulated include received contents of television broadcast, reproduction contents from recording media, streaming videos acquired through a network, and moving images and still images input from another device such as a mobile terminal carried by a user.

As shown in FIG. 1, when the rotational position of the information processing apparatus 100 hung on a wall is set to place the large screen horizontally, an image can be displayed as an object having a size corresponding to the overall screen almost with a view displayed in the movie.

Figure 3A:
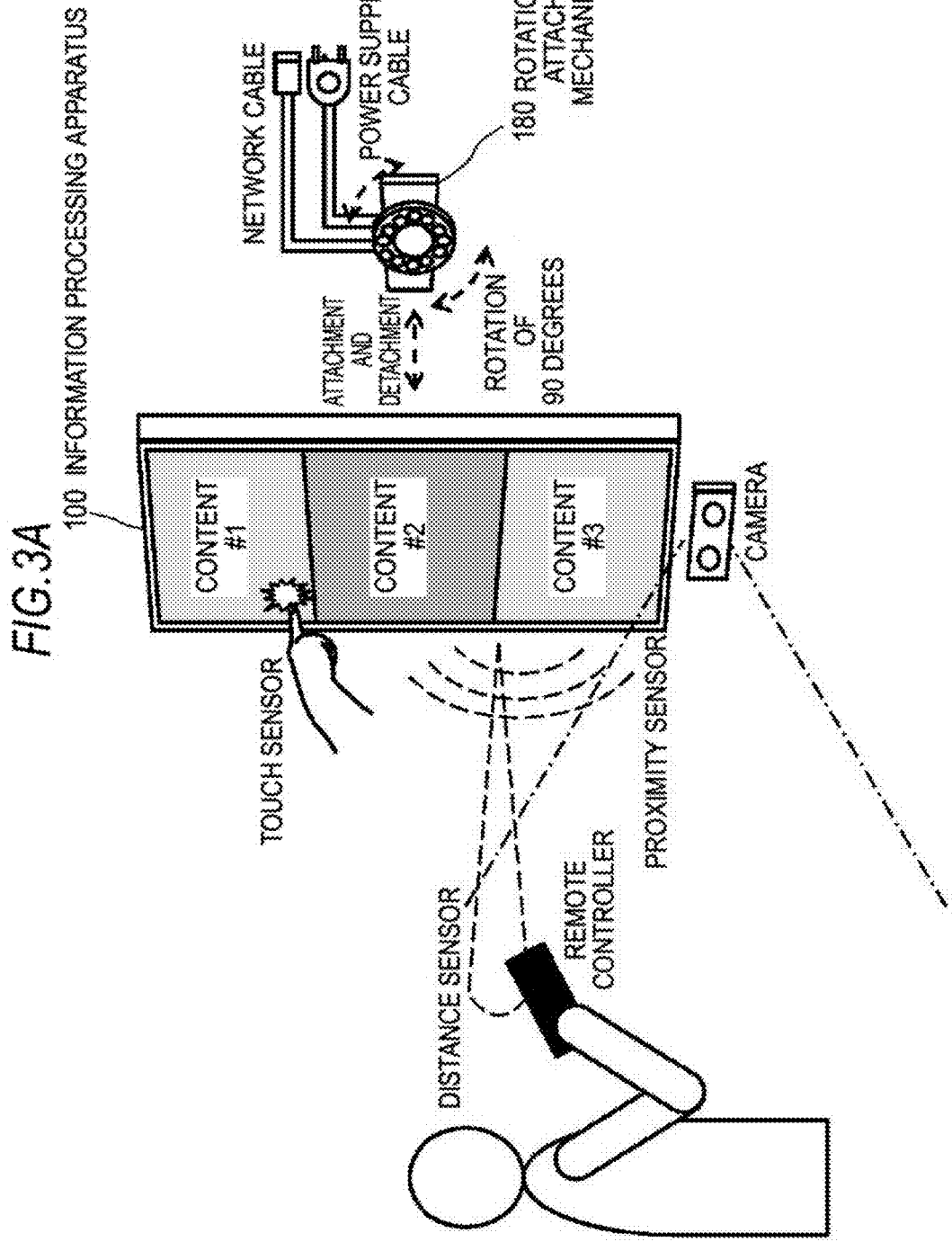
FIG. 3A is a diagram illustrating still another example of the utilization form of the information processing apparatus having a large screen.
Figure 3B:
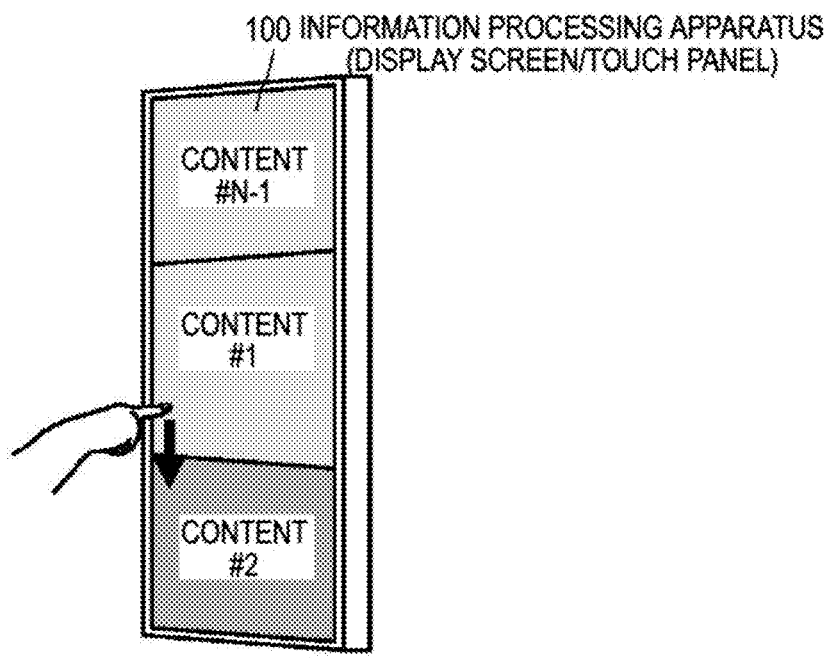
FIG. 3B is a diagram illustrating still another example of the utilization form of the information processing apparatus having a large screen.
Figure 3C:
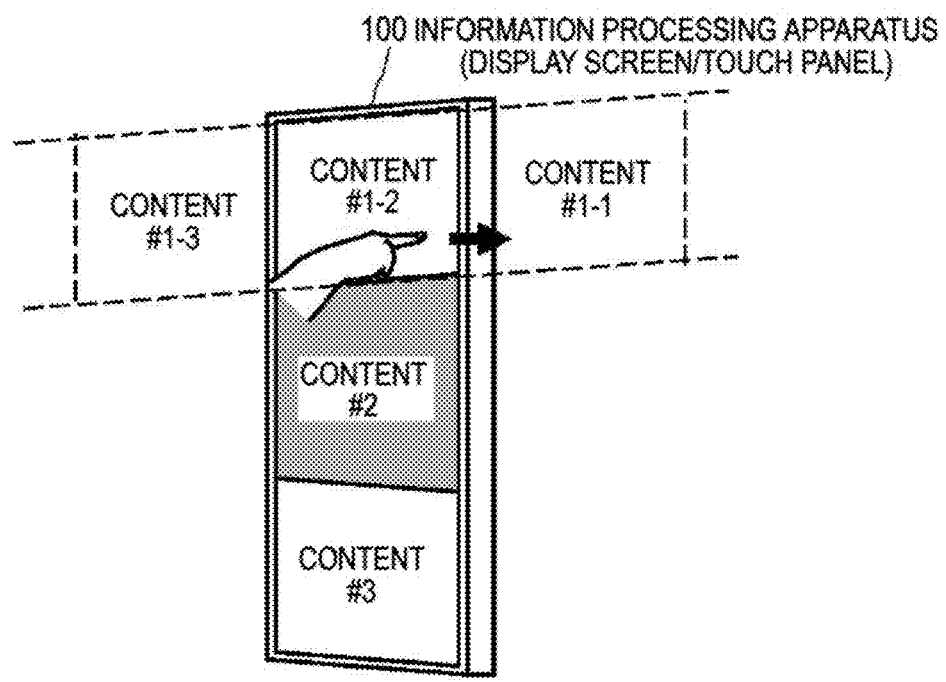
FIG. 3C is a diagram illustrating still another example of the utilization form of the information processing apparatus having a large screen.

Here, when the rotational position of the information processing apparatus 100 hung on a wall is set to place the large screen vertically, three screens with an aspect ratio of 16:9 can be vertically arranged as shown in FIG. 3A. For example, three types of contents #1 to #3 of broadcast contents simultaneously received from different broadcast stations, reproduction contents from recording media, and streaming videos over a network can be simultaneously arranged and displayed. When a user vertically manipulates the screen, for example, using a finger tip, the corresponding content is vertically scrolled as shown in FIG. 3B. When the user horizontally manipulates anyplace of three stages using a finger tip, the screen of the corresponding stage is horizontally scrolled as shown in FIG. 3C.

On the other hand, in the "TABLETOP" form shown in FIG. 2, the information processing apparatus 100 is installed directly on a table. In the utilization form shown in FIG. 1, the rotation and attachment mechanism unit 180 also serves as an electrical contact (as described above). However, in the state where it is installed on a table as shown in FIG. 2, the electrical contact with the information processing apparatus 100 is not visible. Accordingly, in the TABLETOP form shown in the drawing, the information processing apparatus 100 may be constructed to operate with a built-in battery without using a power source. When the information processing apparatus 100 includes a wireless communication unit corresponding to the function of a mobile station of a wireless LAN (Local Area Network) and the rotation and attachment mechanism unit 180 includes a wireless communication unit corresponding to the function of an access point of the wireless LAN, the information processing apparatus 100 can access various servers over the Internet through the wireless communication with the rotation and attachment mechanism unit 180 as an access point even in the TABLETOP form.

On a large screen of the TABLETOP form, plural objects to be manipulated are defined. Each object to be manipulated has a specific display area of a functional module such as a moving image, a still image, a text content, any Internet site, an application, or a widget.

The information processing apparatus 100 includes a proximity sensor detecting presence or a state of a user at each of four edges of the large screen. As described above, a user approaching the large screen may be imaged with a camera and may be recognized as a person. The very-short-range communication unit detects whether or not the user of which the presence is detected carries a device such as a mobile terminal or detects a data transmission and reception request from a terminal carried by the user. When a user or a terminal carried by a user is detected or in a state where a user is being detected, a wave-like detection indicator or an illumination (to be described later) indicating a detection state can be expressed on the screen to give a visual feedback to the user.

When the presence of a user is detected through the use of a proximity sensor or the like, the information processing apparatus 100 uses the detection result to perform a UI control. When a trunk, both hands or legs, a position of a head of a user, or the like in addition to the presence of a user is detected, the detection result may be used for the more detailed UI control. The information processing apparatus 100 includes a very-short-range communication unit and can also directly and naturally transmit and receive data to and from a device carried by a nearby user within a very short range.

Here, as an example of the UI control, the information processing apparatus 100 sets a user-occupied area for each user and a common area shared by the users in the large screen depending on the arrangement of the detected users. A touch sensor input of each user in the user-occupied areas and the common area is detected. The shape of the screen and the pattern in which the area is divided are not limited to a rectangular shape, but may have shapes such as square shapes, annular shapes, and shapes including stereoscopic shapes such as a conical shape.

When the screen of the information processing apparatus 100 is increased in size, a margin of space such that plural users can simultaneously input touches is generated in the TABLETOP form. As described above, by setting the user-occupied areas for the users and the common area in the screen, plural users can comfortably and efficiently enjoy simultaneous manipulations.

The manipulation right to an object placed in a user-occupied area is given to the corresponding user. A user can move the manipulation right to an object to be manipulated to himself or herself by moving the object from the common area or the user-occupied area of another user to his or her own user-occupied area. When the object to be manipulated enters the user-occupied area, the display thereof is automatically changed so that the object exactly faces the user.

When an object to the manipulated moves between the user-occupied areas, the object is moved physically and naturally depending on the touch position at which the moving manipulation is carried out. When users pull one object toward each other, it is possible to divide or copy the object to be manipulated.

Figure 4:
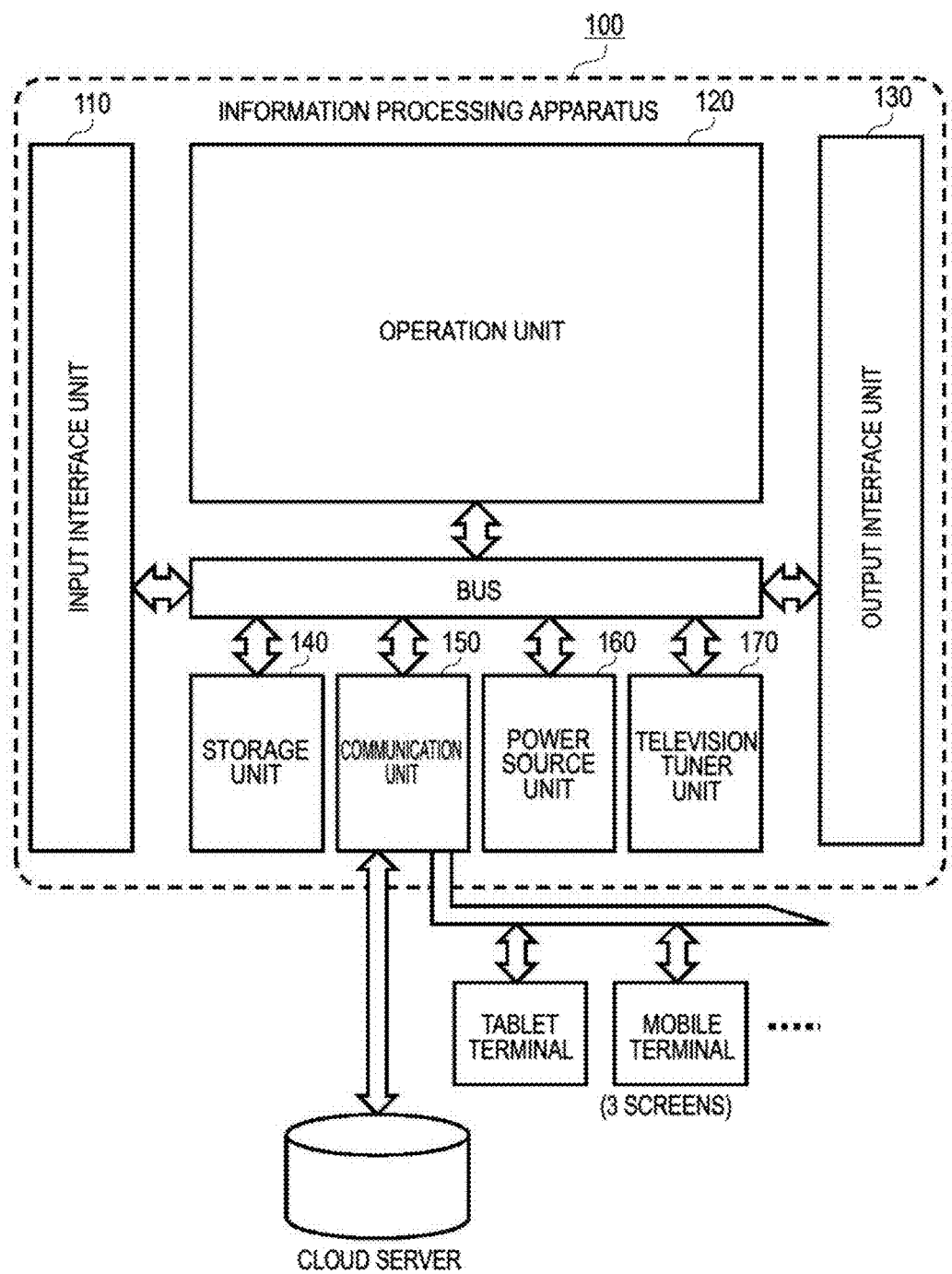
FIG. 4 is a diagram schematically illustrating the functional configuration of the information processing apparatus.

FIG. 4 schematically shows the functional configuration of the information processing apparatus 100. The information processing apparatus 100 includes an input interface unit 110 that receives an information signal from the outside, an operation unit 120 that performs an operating process for the control of a display screen or the like on the basis of the input information signal, an output interface unit 130 that outputs information to the outside on the basis of the operation result, a large-capacity storage unit 140 formed of a hard disk drive (HDD) or the like, a communication unit 150 that is connected to an external network, a power source unit 160 that supplies driving power, and a television tuner unit 170. The storage unit 140 stores various processing algorithms performed by the operation unit 120 and various databases used for the operating process in the operation unit 120.

Figure 5:
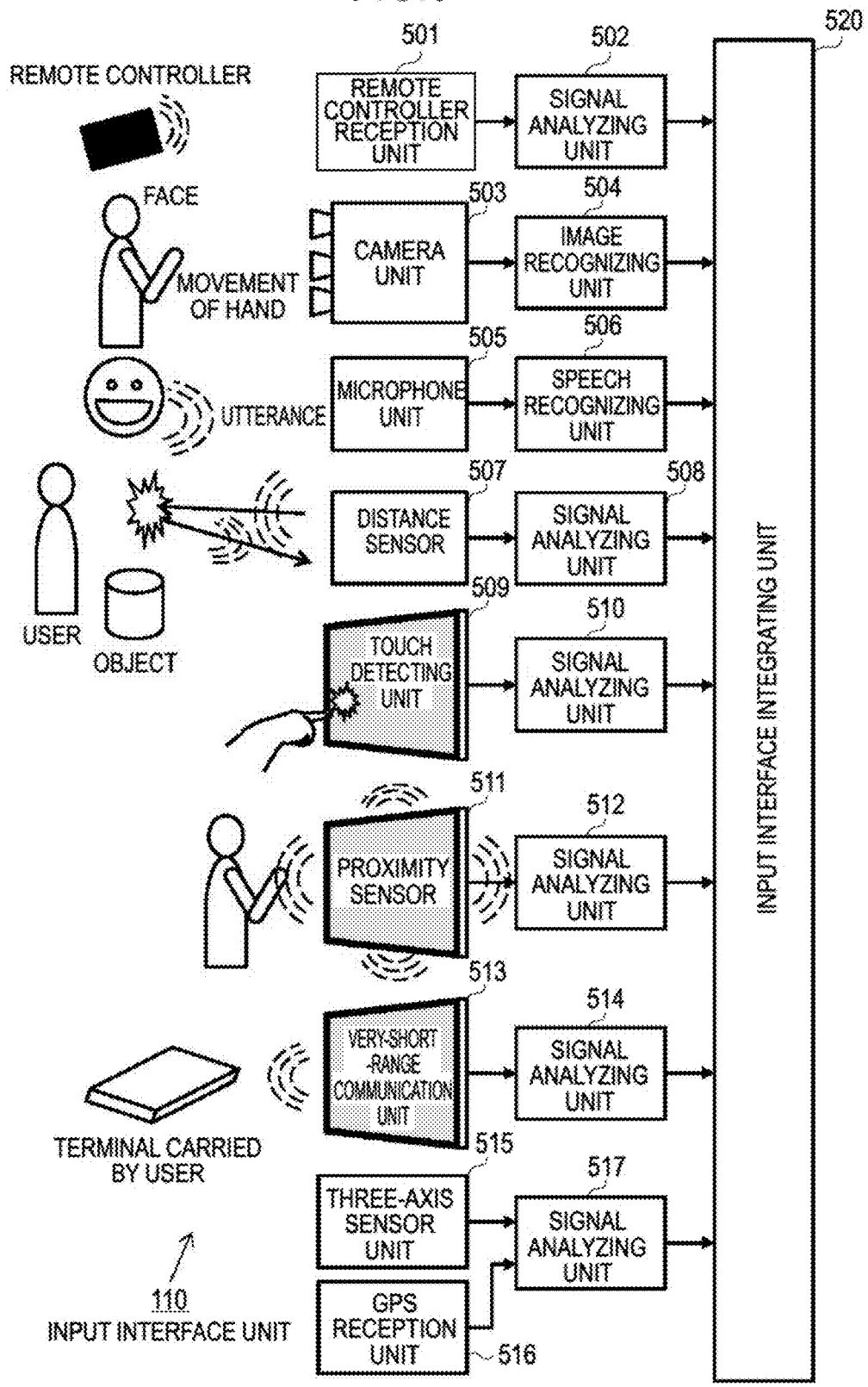
FIG. 5 is a diagram illustrating the internal configuration of an input interface unit.

The principal function of the input interface unit 110 includes detecting the presence of a user, detecting a touch manipulation of the detected user with the screen, that is, a touch panel, detecting a device such as a mobile terminal carried by the user, and a process of receiving transmission data from the device. FIG. 5 shows the internal configuration of the input interface unit 110.

A remote controller reception unit 501 receives a remote controller signal from a remote controller or the mobile terminal. A signal analyzing unit 502 acquires a remote controller command by demodulating and decoding the received remote controller signal.

A camera unit 503 employs a monocular type or one or both of a binocular type and an active type. The camera unit 503 is constructed by an imaging device such as a CMOS (Complementary Metal Oxide Semiconductor) or a CCD (Charge Coupled Device). The camera unit 503 includes a camera controller controlling panning, tilting, zooming, and the like thereof. The camera unit 503 notifies the operation unit 120 of camera information such as panning, tilting, and zooming and the panning, tilting, and zooming of the camera unit 503 can be controlled on the basis of camera control information from the operation unit 120.

An image recognizing unit 504 recognizes an image captured by the camera unit 503. Specifically, the image recognizing unit 504 recognizes a gesture by detecting a face of a user or a motion of a hand by the use of a background difference, recognizes a face of a user included in a captured image, recognizes a trunk, or recognizes a distance to a user.

A microphone unit 505 receives a sound or a speech uttered by a user. A speech recognizing unit 506 recognizes an input speech signal.

A distance sensor 507 is constructed, for example, by a PSD (Position Sensitive Detector) and detects a signal returned from a user or an object. A signal analyzing unit 508 analyzes the detected signal and measures a distance to a user or an object. A pyroelectric sensor or a simple camera in addition to the PSD sensor can be used as the distance sensor 507. The distance sensor 507 normally monitors whether or not a user is present within a radius of, for example, 5 to 10 meters from the information processing apparatus 100. Accordingly, a sensor device having low power consumption can be preferably used as the distance sensor 507.

The touch detecting unit 509 is constructed by a touch sensor superimposed on the screen or the like and outputs a detection signal from a place at which a user's finger tip comes in contact with the screen. A signal analyzing unit 510 analyzes the detection signal and acquires positional information.

A proximity sensor 511 is installed at each of four lateral edges of the large screen and detects that a user's body approaches the screen, for example, by the use of capacitance. A signal analyzing unit 512 analyzes the detection signal.

A very-short-range communication unit 513 receives a non-contact communication signal from a device carried by a user, for example, through NFC (Near Field Communication). A signal analyzing unit 514 acquires reception data by demodulating and decoding the received signal.

A three-axis sensor unit 515 is constructed by a gyro or the like and detects postures of the information processing apparatus 100 about the axes of x, y, and z. A GPS (Global Positioning System) reception unit 516 receives a signal of a GPS satellite. A signal analyzing unit 517 analyzes the signals from the three-axis sensor unit 515 and the GPS reception unit 516 and acquires positional information or posture information of the information processing apparatus 100.

An input interface integrating unit 520 integrates inputs of the information signals and outputs the integrated information signals to the operation unit 120. The input interface integrating unit 520 integrates the analysis results of the signal analyzing units 508, 510, 512, and 514 and acquires and outputs positional information of the user around the information processing apparatus 100 to the operation unit 120.

The principal function of the operation unit 120 includes performing an operating process such as a UI screen generating process based on the user detection result of the input interface unit 110, the screen touch detection result, and the received data from a device carried by a user and outputting the operation result to the output interface unit 130. The operation unit 120 can perform an operating process for each application by loading an application program installed in the storage unit 140 and executing the loaded application program. The functional configuration of the operation unit 120 corresponding to each application will be described later.

Figure 6:
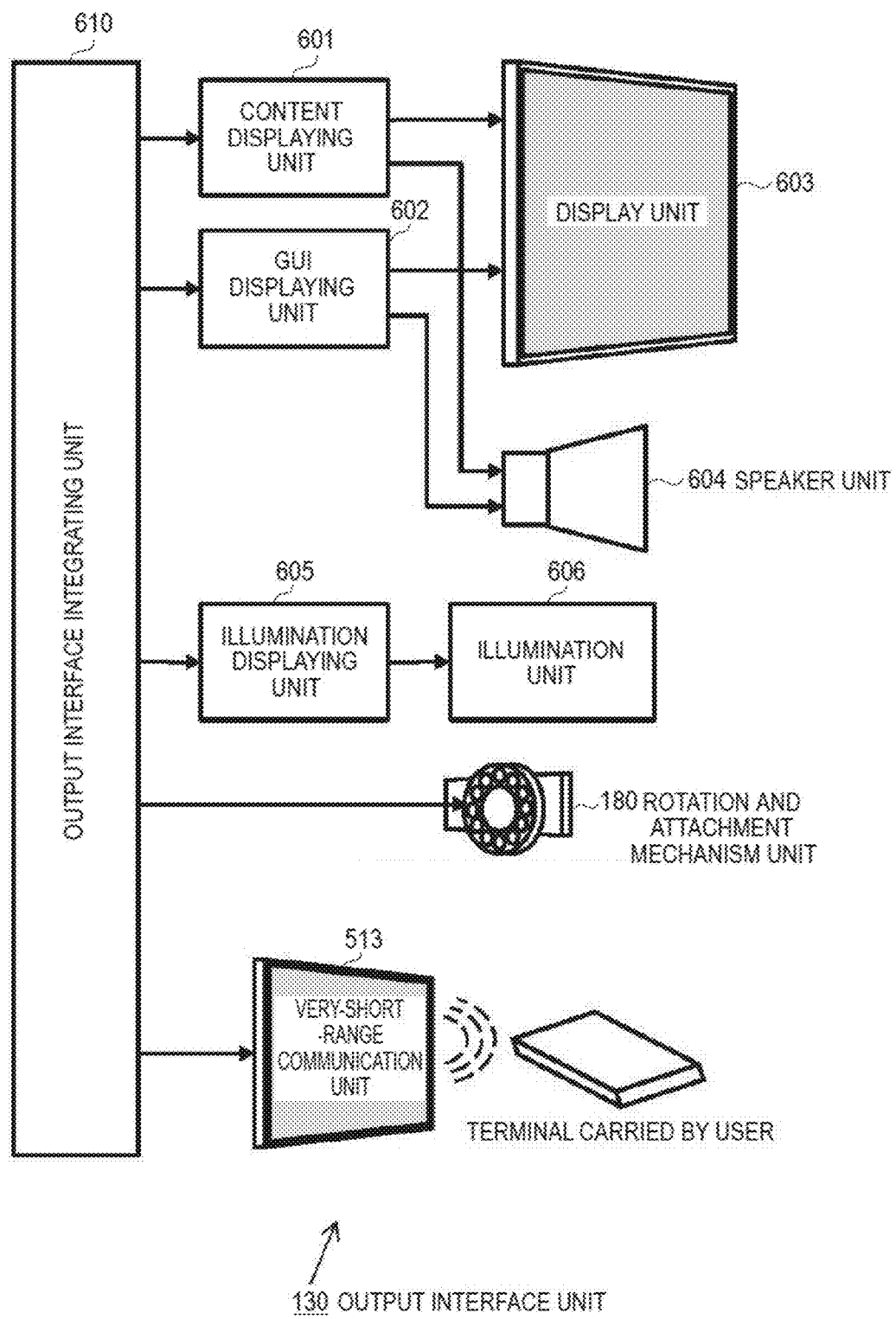
FIG. 6 is a diagram illustrating the internal configuration of an output interface unit.

The principal function of the output interface unit 130 includes displaying a UI on the screen based on the operation result of the operation unit 120 and transmitting data to a device carried by a user. FIG. 6 shows the internal configuration of the output interface unit 130.

An output interface integrating unit 610 integrates and handles information outputs based on the operation results of the monitor dividing process of the operation unit 120, the object optimizing process, and the device interaction data transmitting and receiving process.

The output interface integrating unit 610 instructs a content displaying unit 601 to output an image and a speech of moving image contents or still image contents such as received TV broadcast contents and contents reproduced from recording media such as a Blu-ray Disc to a display unit 603 and a speaker unit 604.

The output interface integrating unit 610 instructs a GUI display unit 602 to display a GUI of objects to be manipulated on the display unit 603.

The output interface integrating unit 610 instructs an illumination displaying unit 605 to output an illumination display indicating the detection state from the illumination unit 606.

The output interface integrating unit 610 instructs the very-short-range communication unit 513 to transmit data to a device carried by a user or the like through a non-contact communication.

The information processing apparatus 100 can detect a user on the basis of the recognition from the image captured by the camera unit 503 or the detection signal of the distance sensor 507, the touch sensor 509, the proximity sensor 511, the very-short-range communication unit 513, or the like. By recognizing a face from the image captured by the camera unit 503 or recognizing a device carried by a user through the use of the very-short-range communication unit 513, the personality of the detected user can be specified. The specified user can log in to the information processing apparatus 100. Accounts which can log in may be limited to specific users. The information processing apparatus 100 appropriately uses the distance sensor 507, the touch sensor 509, and the proximity sensor 511 to receive a user's manipulation depending on the position of the user or the user state.

The information processing apparatus 100 is connected to an external network via the communication unit 150. The connection format to the external network is limited to only one of a wired way and a wireless way. The information processing apparatus 100 can communicate with a mobile terminal such as a smartphone carried by a user or another apparatus such as a tablet terminal. So-called "three screens" can be constructed by combination of three kinds of apparatuses of the information processing apparatus 100, the mobile terminal, and the tablet terminal. The information processing apparatus 100 can provide a UI causing the three screens to interact with each other on a screen which is larger than the other two screens.

For example, in the background of action in which a user touches a screen or brings his or her carried terminal close to the information processing apparatus 100, data such as a moving image, a still image, a text content, and the like, which is a substantial body of the object to be manipulated, is transmitted and received between the information processing apparatus 100 and the corresponding carried terminal. A cloud server or the like may be installed over an external network and the three screens may use the operation capability of the cloud server. That is, it is possible to enjoy benefits of cloud computing through the use of the information processing apparatus 100.

A few applications of the information processing apparatus 100 will be sequentially described below.

B. Simultaneous Manipulation on Large Screen by Plural Users

The information processing apparatus 100 can be simultaneously manipulated by plural users through the use of a large screen. Specifically, since the information processing apparatus includes the proximity sensor 511 detecting the presence of a user or a user state for each of four lateral edges of the large screen and sets user-occupied areas and a common area in the screen depending on the arrangement of plural users, the information processing apparatus can be simultaneously manipulated by the plural users comfortably and efficiently.

When the screen of the information processing apparatus 100 is increased in size, such a margin of space that plural users can simultaneously input touches is generated in the TABLETOP form. As described above, by setting the user-occupied areas for the users and the common area in the screen, plural users can comfortably and efficiently enjoy simultaneous manipulations.

The manipulation right to an object placed in a user-occupied area is given to the corresponding user. A user can move the manipulation right to an object to be manipulated to himself or herself by moving the object from the common area or the user-occupied area of another user to his or her own user-occupied area. When the object to be manipulated enters the user-occupied area of the user, the display thereof is automatically changed so that the object exactly faces the user.

When an object to the manipulated moves between the user-occupied areas, the object is moved physically and naturally depending on the touch position at which the moving manipulation is carried out. When users attract one object to each other, it is possible to divide or copy the object to be manipulated.

Figure 7:
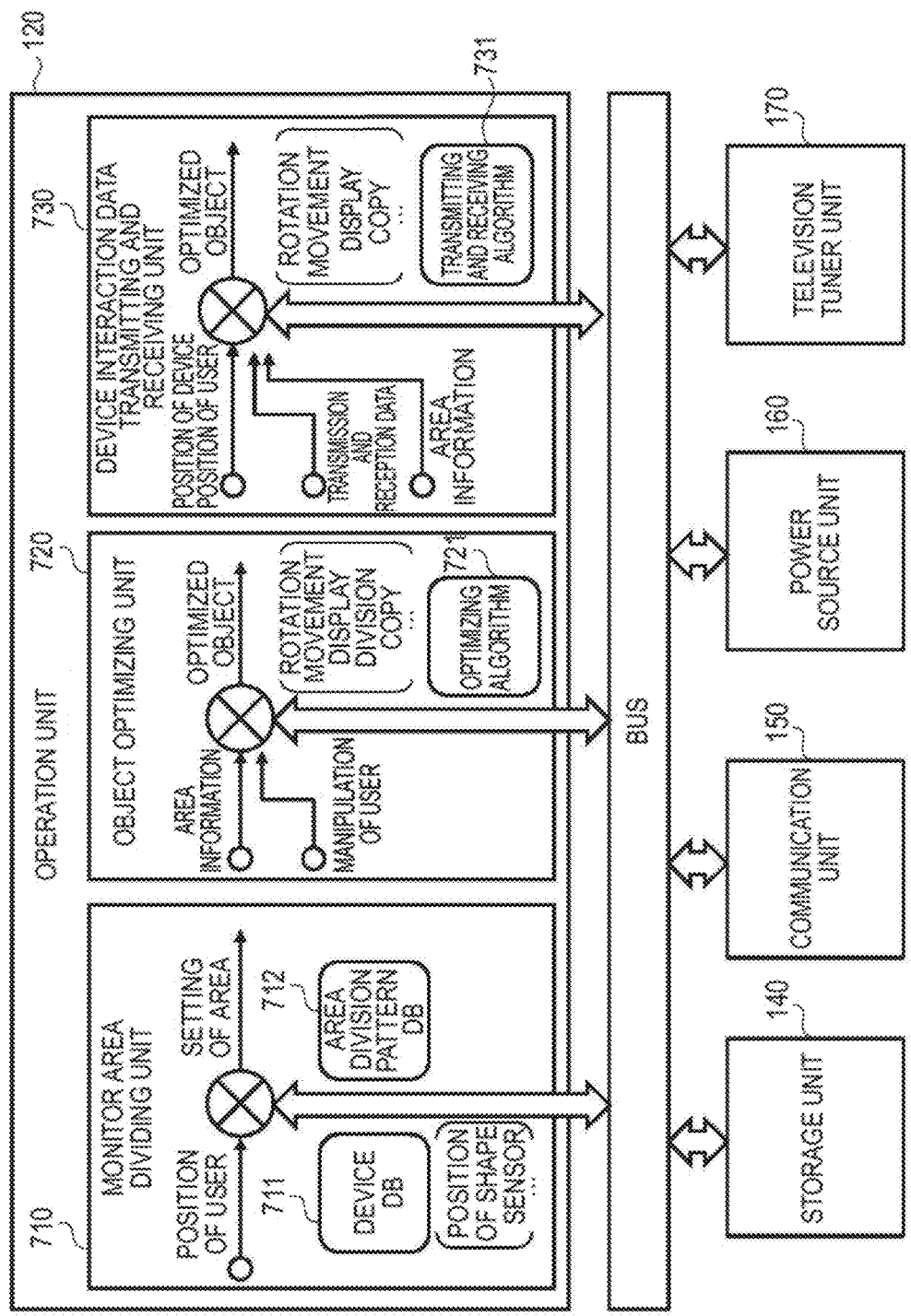
FIG. 7 is a diagram illustrating the internal configuration of an operation unit that processes an object to be manipulated.

The principal function of the operation unit 120 when executing this application program includes optimizing an object and generating a UI on the basis of the user detection result in the input interface unit 110, the screen touch detection result, and the received data from the device carried by a user. FIG. 7 shows the internal configuration of the operation unit 120 for processing an object to be manipulated. The operation unit 120 includes a monitor area dividing unit 710, an object optimizing unit 720, and a device interaction data transmitting and receiving unit 730.

When acquiring the positional information of a user from the input interface integrating unit 520, the monitor area dividing unit 710 sets the user-occupied areas and the common area on the screen with reference to a device database 711 and an area division pattern database 712 relevant to the shape or the sensor arrangement, which are stored in the storage unit 140. The monitor area dividing unit 710 outputs the set area information to the object optimizing unit 720 and the device interaction data transmitting and receiving unit 730. Details of the flow of the monitor area dividing process will be described later.

The object optimizing unit 720 receives information on the manipulation performed on an object to be manipulated on the screen by a user from the input interface integrating unit 520. The object optimizing unit 720 performs the object optimizing process corresponding to the user's manipulation, such as rotating, moving, displaying, dividing, or copying the object manipulated by the user, in accordance with an optimizing algorithm 721 loaded from the storage unit 140, and outputs the optimized object to the screen of the display unit 603. Details of the object optimizing process will be described later.

The device interaction data transmitting and receiving unit 730 receives positional information of a user or a device carried by the user and transmitted and received data with the device from the input interface integrating unit 520. The device interaction data transmitting and receiving unit 730 performs a data transmitting and receiving process through the interaction with the device carried by the user in accordance with a transmitting and receiving algorithm 731 loaded from the storage unit 140. The object optimizing unit 720 optimizes the object corresponding to the data transmitting and receiving process. For example, the object optimizing unit 720 performs the object optimizing process accompanying the data transmitting and receiving process through the interaction with the device carried by the user, such as rotating, moving, displaying, or copying the object associated with the transmitted and received data, and outputs the optimized object to the screen of the display unit 603. Details of the object optimizing process accompanying the interaction with a device will be described later.

Subsequently, the monitor area dividing process will be described in detail. The monitor area dividing process is assumed as a process in the utilization form in which the information processing apparatus 100 is shared by plural users in the TABLETOP form, but may be performed in a utilization form in which the information processing apparatus is shared by plural users in the WALL form.

Figure 8:
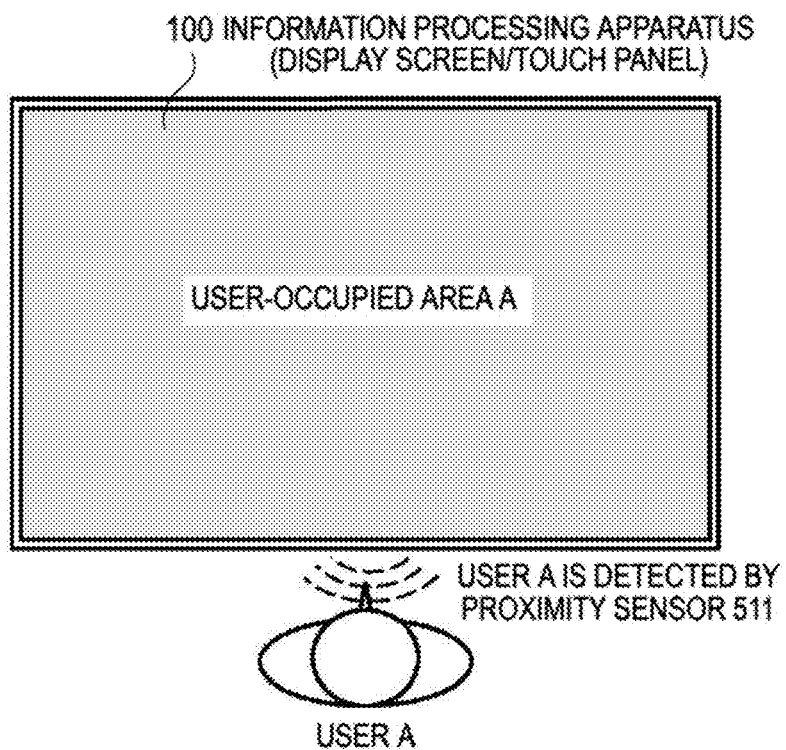
FIG. 8 is a diagram illustrating a state where a user-occupied area is set on a screen.

When the presence of a user is detected through the use of the input interface integrating unit 520, the monitor area dividing unit 710 assigns the user-occupied area of the corresponding user to the screen. FIG. 8 shows a state where the monitor area dividing unit 710 sets user-occupied area A of user A in the screen when the presence of user A is detected on the basis of the detection signal of the proximity sensor 511 (or the distance sensor 507) disposed on the lateral edge of the screen. When the presence of only one user is detected, the overall screen may be set as the user-occupied area of the corresponding user as shown in the drawing.

Figure 9A:
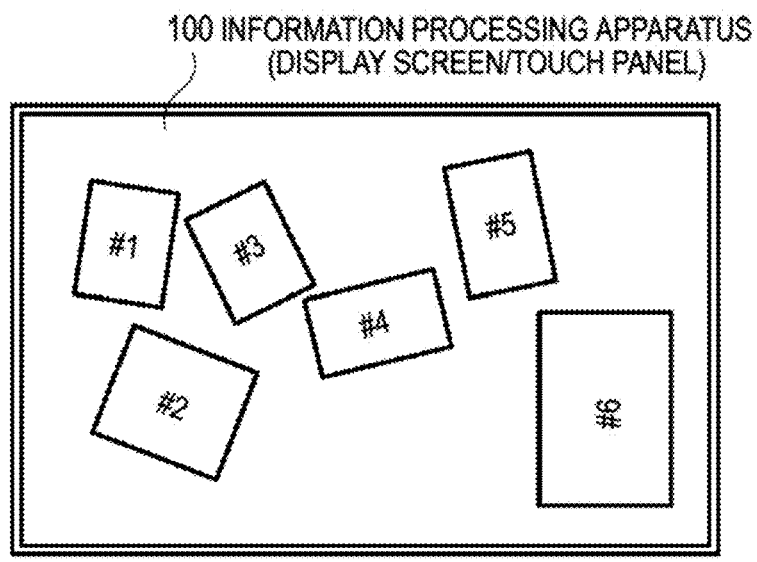
FIG. 9A is a diagram illustrating a state where respective objects #1 to #6 to be manipulated are randomly directed before setting user-occupied area A.
Figure 9B:
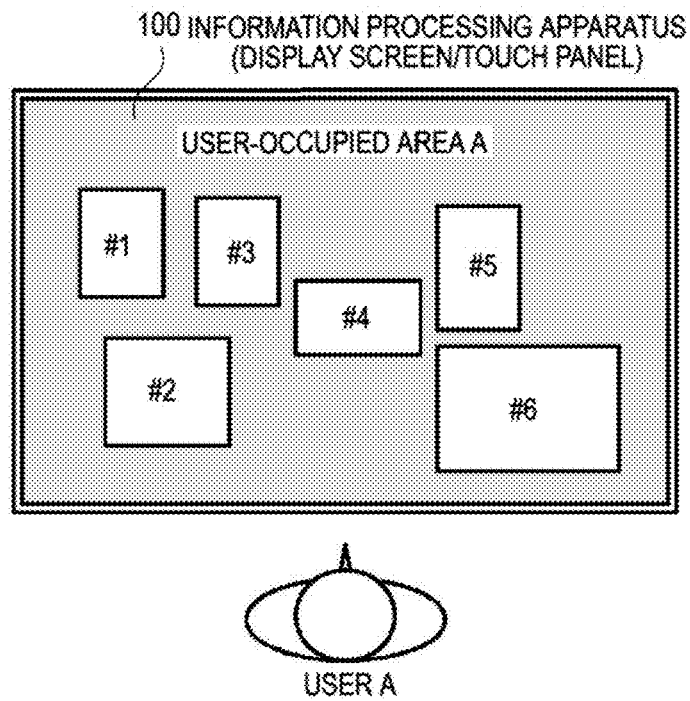
FIG. 9B is a diagram illustrating a state where objects #1 to #6 to be manipulated are changed to exactly face user A by setting user-occupied area A of user A.

Here, when user-occupied area A is set, the object optimizing unit 720 changes the orientations of the objects to be manipulated in user-occupied area A so as to exactly face the user on the basis of the positional information of user A acquired from the input interface integrating unit 520. FIG. 9A shows a state where the objects #1 to #6 are randomly directed before setting user-occupied area A. In the drawing, the slopes of reference signs "#1", "#2", . . . in the objects indicate the orientations of the objects. FIG. 9B shows a state where all the objects #1 to #6 in the area are changed to exactly face user A by setting user-occupied area A of user A.

When the presence of only user A is detected, user-occupied area A of user A may be set to the overall screen. On the contrary, when the presence of two or more users is detected, it is preferable that a common area which can be shared by the users be set to perform a collaborative action between the users.

Figure 10:
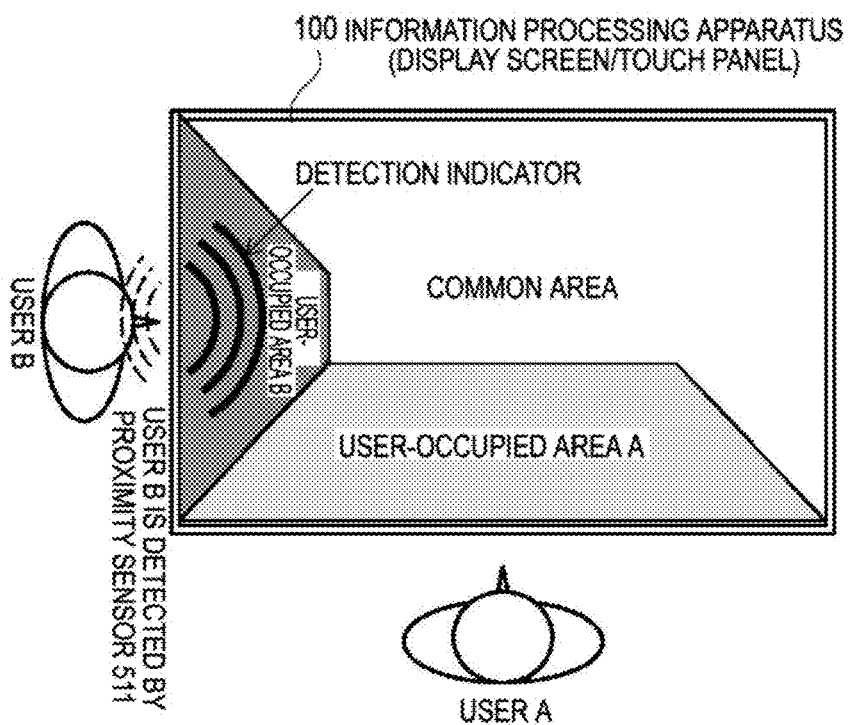
FIG. 10 is a diagram illustrating a state where user-occupied area B of user B and a common area are additionally set on the screen by detecting presence of user B in addition to user A.

FIG. 10 shows a state where the monitor area dividing unit 710 additionally sets user-occupied area B of user B and a common area in the screen when the presence of user B in addition to user A is detected at the neighboring lateral edge of the screen on the basis of the detection signal of the proximity sensor 511 or the distance sensor 507. User-occupied area A of user A degenerates to a place in which user A is located and user-occupied area B of user B appears in the vicinity of a place in which user B is located, on the basis of the positional information of users A and B. When the presence of user B is newly detected, a wave-like detection indicator is displayed in user-occupied area B. The area other than user-occupied area A and user-occupied area B in the screen is all a common area. At the time point where any object in user-occupied area B is firstly touched after user B approaches the information processing apparatus 100 and thus user-occupied area B is newly set in the screen, user-occupied area B may be made to be valid. Although not shown in FIG. 10, the objects to be manipulated in the area which newly becomes user-occupied area B are changed to exactly face user B at the time point when user-occupied area B is set or at the point when user-occupied area B is made to be valid.

Figure 11:
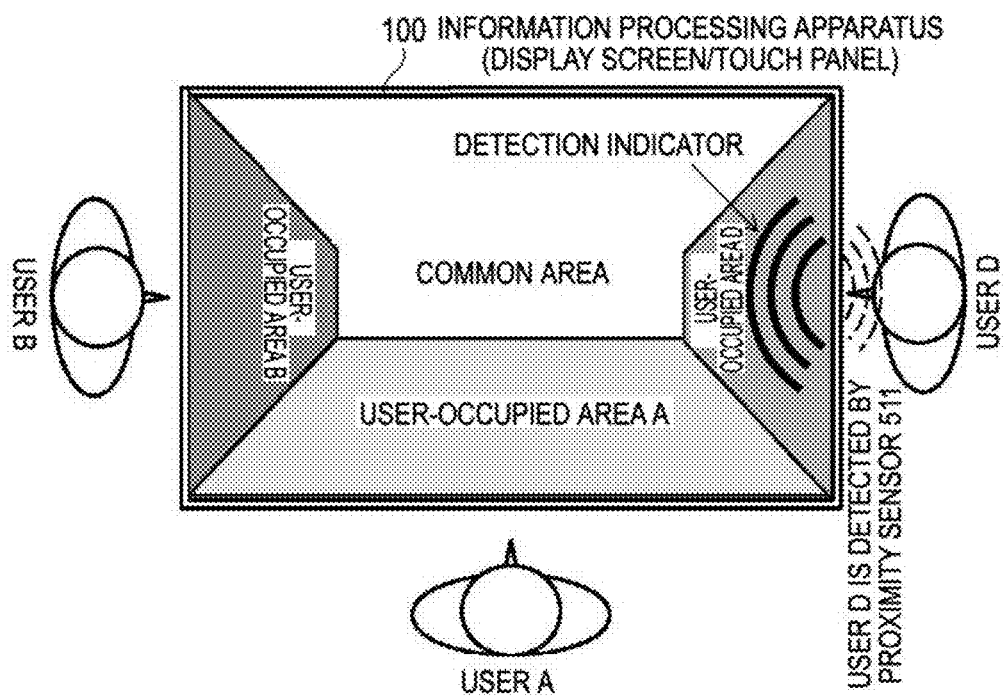
FIG. 11 is a diagram illustrating a state where user-occupied area D of user D and a common area are additionally set on the screen by detecting presence of user D in addition to users A and B.
Figure 12:
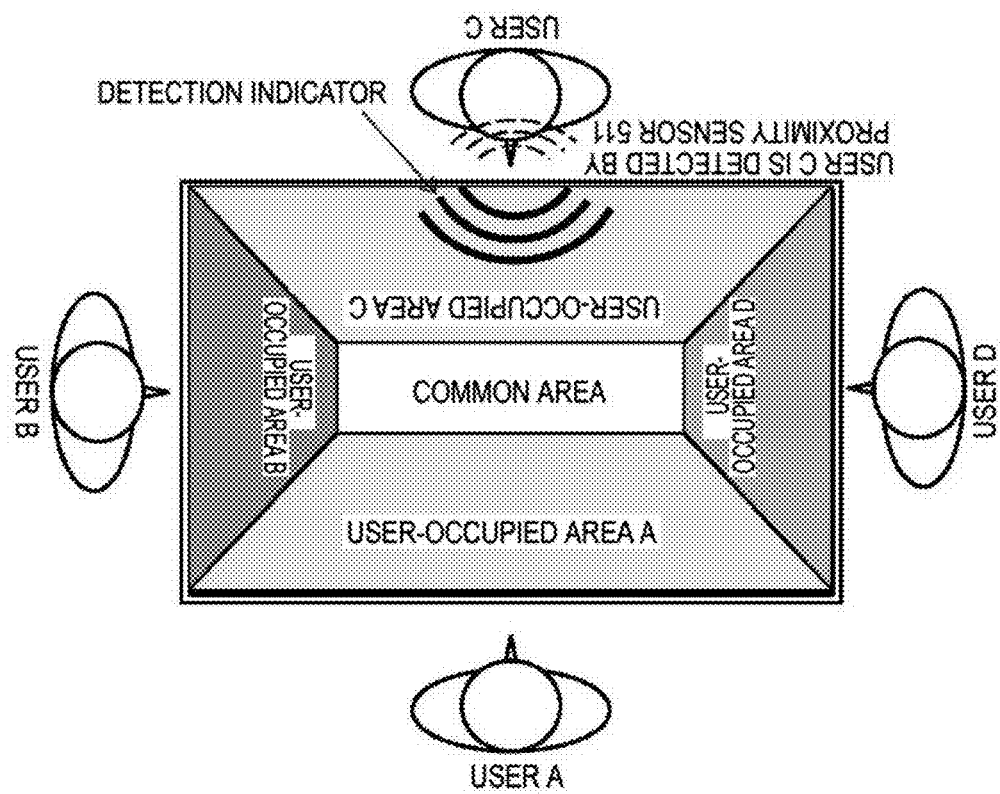
FIG. 12 is a diagram illustrating a state where user-occupied area C of user C and a common area are additionally set on the screen by detecting presence of user C in addition to users A, B, and D.
Figure 13A:
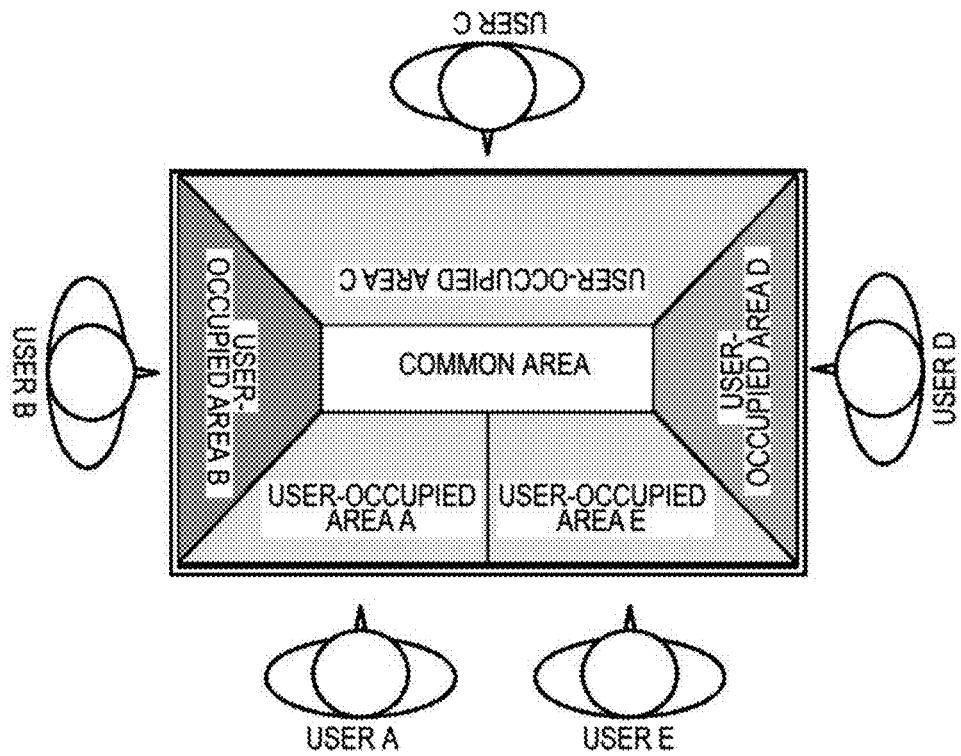
FIG. 13A is a diagram illustrating an area division pattern used to divide the screen into user-occupied areas of the respective users on the basis of the shape or size of the screen and the number of users.
Figure 13B:
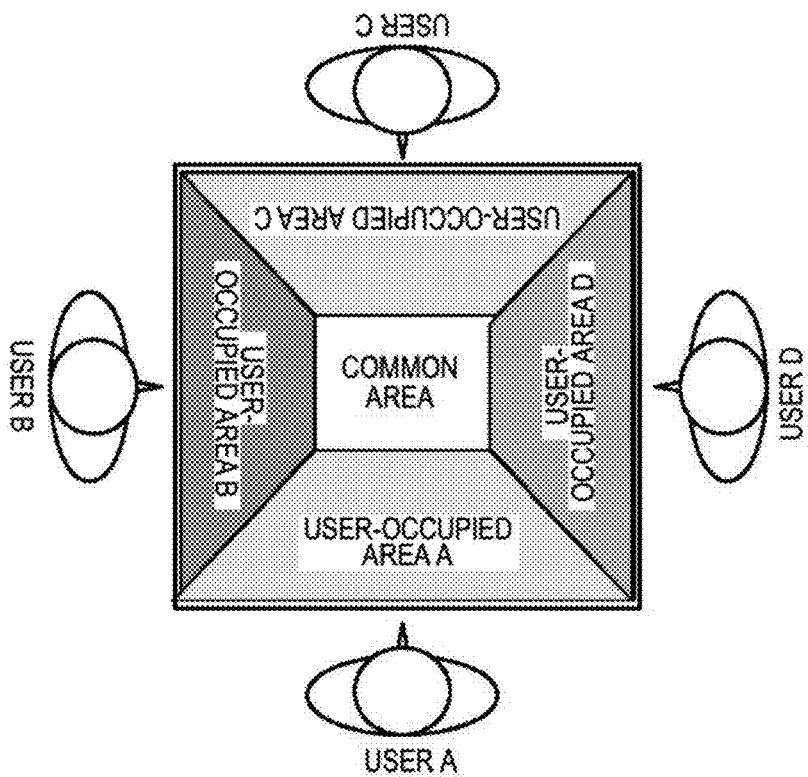
FIG. 13B is a diagram illustrating an area division pattern used to divide the screen into user-occupied areas of the respective users on the basis of the shape or size of the screen and the number of users.
Figure 13C:
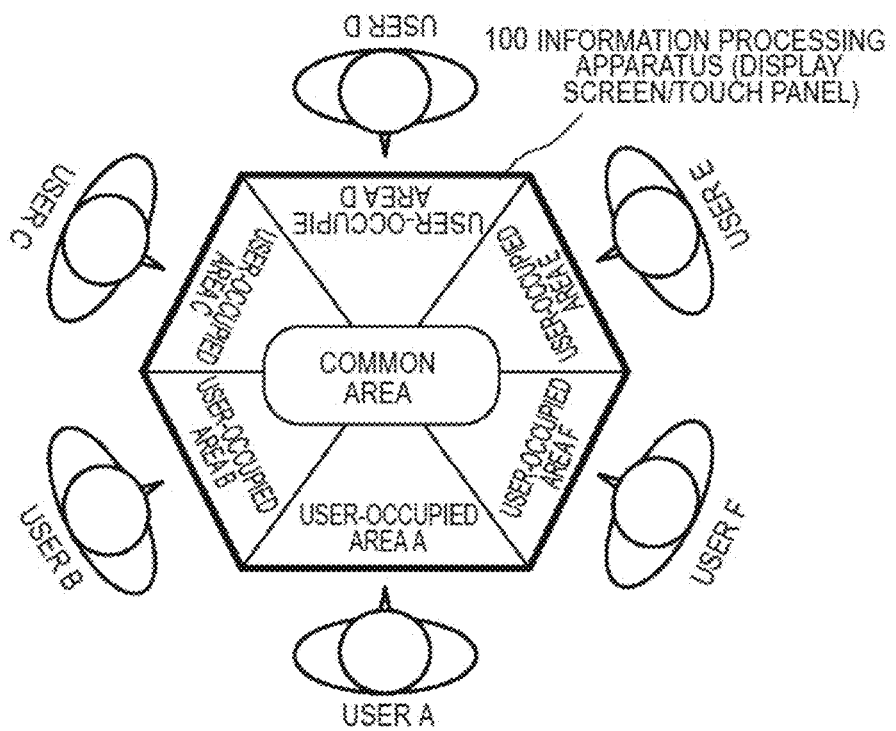
FIG. 13C is a diagram illustrating an area division pattern used to divide the screen into user-occupied areas of the respective users on the basis of the shape or size of the screen and the number of users.
Figure 13D:
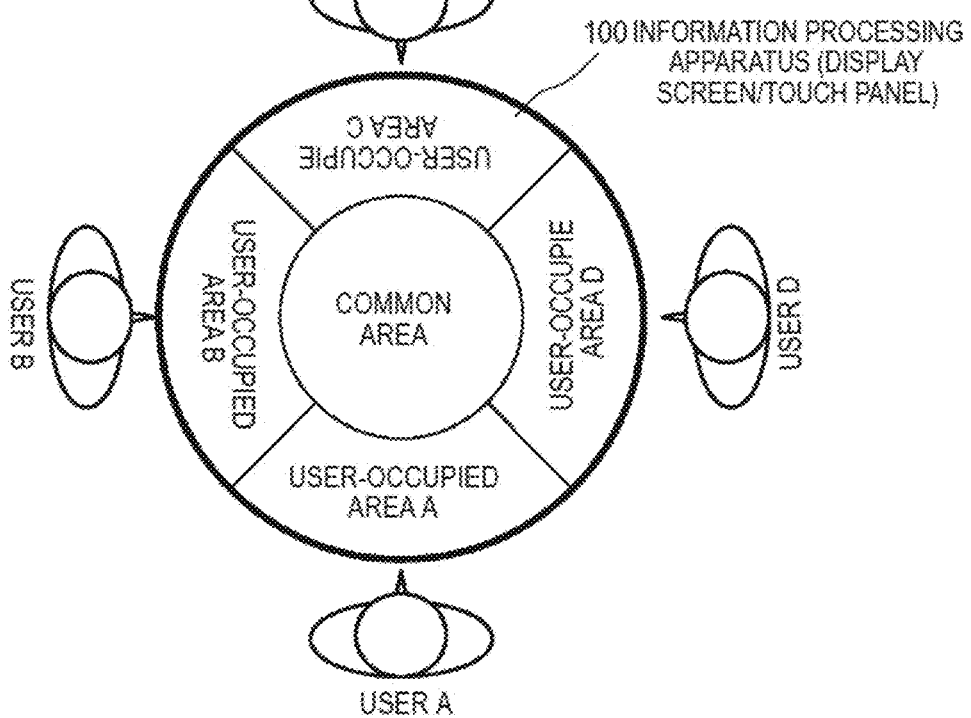
FIG. 13D is a diagram illustrating an area division pattern used to divide the screen into user-occupied areas of the respective users on the basis of the shape or size of the screen and the number of users.
Figure 13E:
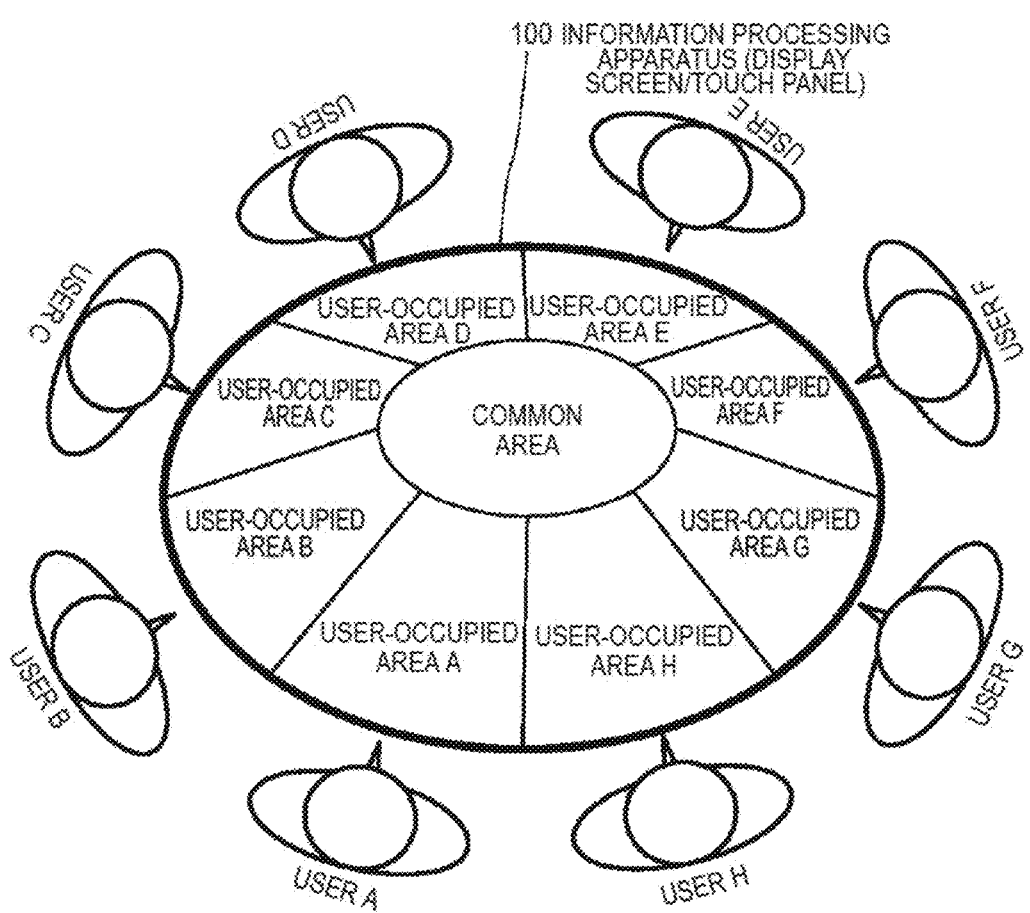
FIG. 13E is a diagram illustrating an area division pattern used to divide the screen into user-occupied areas of the respective users on the basis of the shape or size of the screen and the number of users.

FIG. 11 shows a state where the monitor area dividing unit 710 additionally sets user-occupied area D of user D in the screen in the vicinity of a place where user D is located when the presence of user D in addition to users A and B is detected on another lateral edge of the screen. By displaying a wave-like detection indicator in user-occupied area D, it is expressed that the presence of user D is newly detected. FIG. 12 shows a state where the monitor area dividing unit 710 additionally sets user-occupied area C of user C in the screen in the vicinity of a place where user C is located when the presence of user C in addition to users A, B, and D is detected on another lateral edge of the screen. By displaying a wave-like detection indicator in user-occupied area C, it is expressed that the presence of user C is newly detected.

The area division patterns of the user-occupied areas and the common area shown in FIGS. 8 to 12 are only examples. The area division pattern also depends on the shape of the screen, the number of users of which the presence is detected, and the arrangement thereof. The area division pattern database 712 stores information on the area division patterns corresponding the shape or size of the screen and the number of users. The device database 711 stores information on the shape or size of the screen used in the information processing apparatus 100. When the positional information of the detected user is input from the input interface integrating unit 520, the monitor area dividing unit 710 reads the shape or size of the screen from the device database 711 and refers the corresponding area division pattern to the area division pattern database 712. FIGS. 13A to 13E show area division patterns used to divide the screen into user-occupied areas for the respective users depending on the shape or size of the screen and the number of users.

Figure 14:
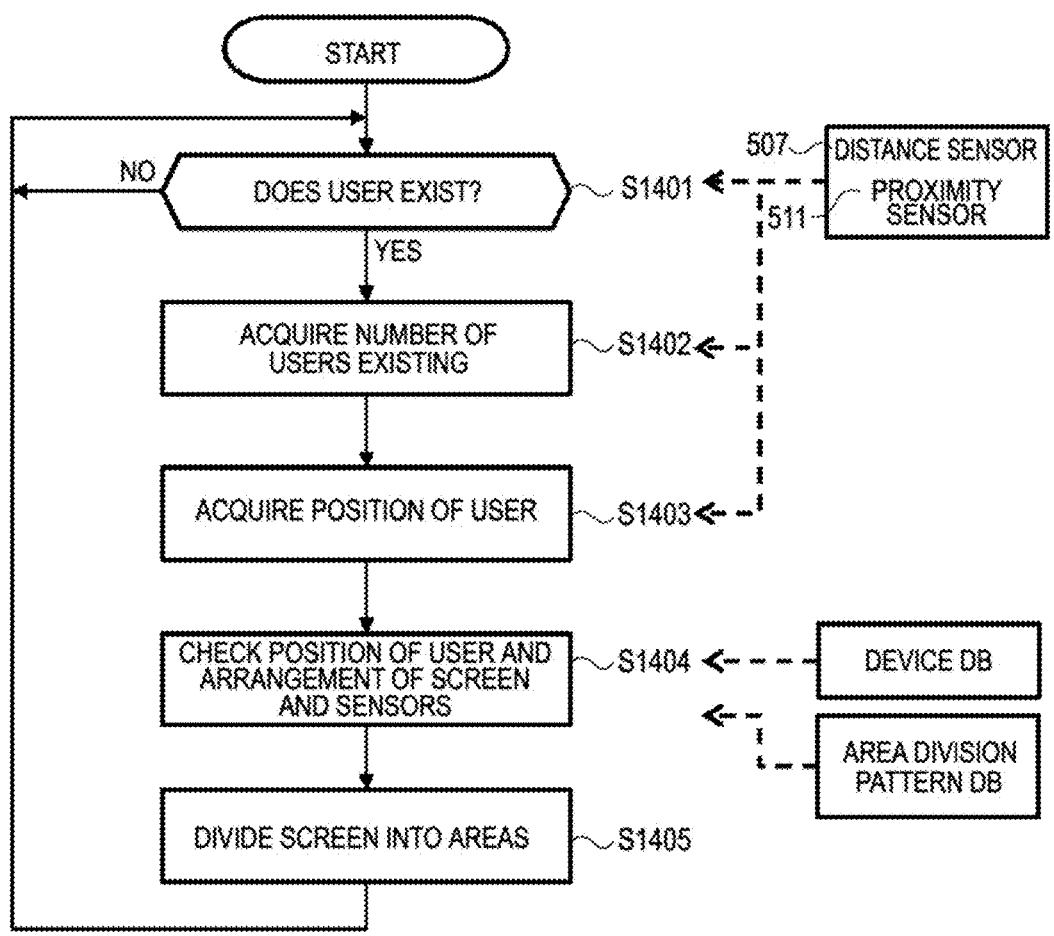
FIG. 14 is a flowchart illustrating the flow of a monitor area dividing process performed by a monitor area dividing unit.

FIG. 14 is a flowchart illustrating the flow of the monitor area dividing process performed by the monitor area dividing unit 710.

The monitor area dividing unit 710 first checks whether a user is present in the vicinity of the screen on the basis of the signal analysis result of the detection signal from the proximity sensor 511 or the distance sensor 507 (step S1401).

When the presence of a user is detected (YES in step S1401), the monitor area dividing unit 710 acquires the number of users present (step S1402) and additionally acquires the positions of the users (step S1403). The processes of steps S1401 to S1403 are performed on the basis of the positional information of the users received from the input interface integrating unit 520.

Subsequently, the monitor area dividing unit 710 acquires device information on the screen shape of the display unit 603 or the arrangement of the proximity sensors 511, which are used in the information processing apparatus 100, with reference to the device database 711 and refers the corresponding area division pattern to the area division pattern database 712 using this information and the positional information of the user (step S1404).

The monitor area dividing unit 710 sets the user-occupied areas of the users and the common area in the screen on the basis of the acquired area division pattern (step S1405) and ends the flow of processes.

Details of the object optimizing process performed by the object optimizing unit 720 will be described below.

When information on the manipulation performed on an object on the screen by a user is input from the input interface integrating unit 520, the object optimizing unit 720 performs a display process such as rotating, moving, displaying, dividing, or copying the object on the screen in response to the manipulation of the user. The processes of rotating, moving, displaying, dividing, and copying an object in response to the dragging or throwing manipulation of the user are similar to GUI manipulations on a screen of a desktop.

In this embodiment, the user-occupied areas and the common area are set in the screen and the object optimizing unit 720 optimizes the display depending on the areas in which the objects to be manipulated are present. A representative example of the optimizing process is a process of changing the directions of the respective objects in each user-occupied area so as to exactly face the corresponding user.

Figure 15:
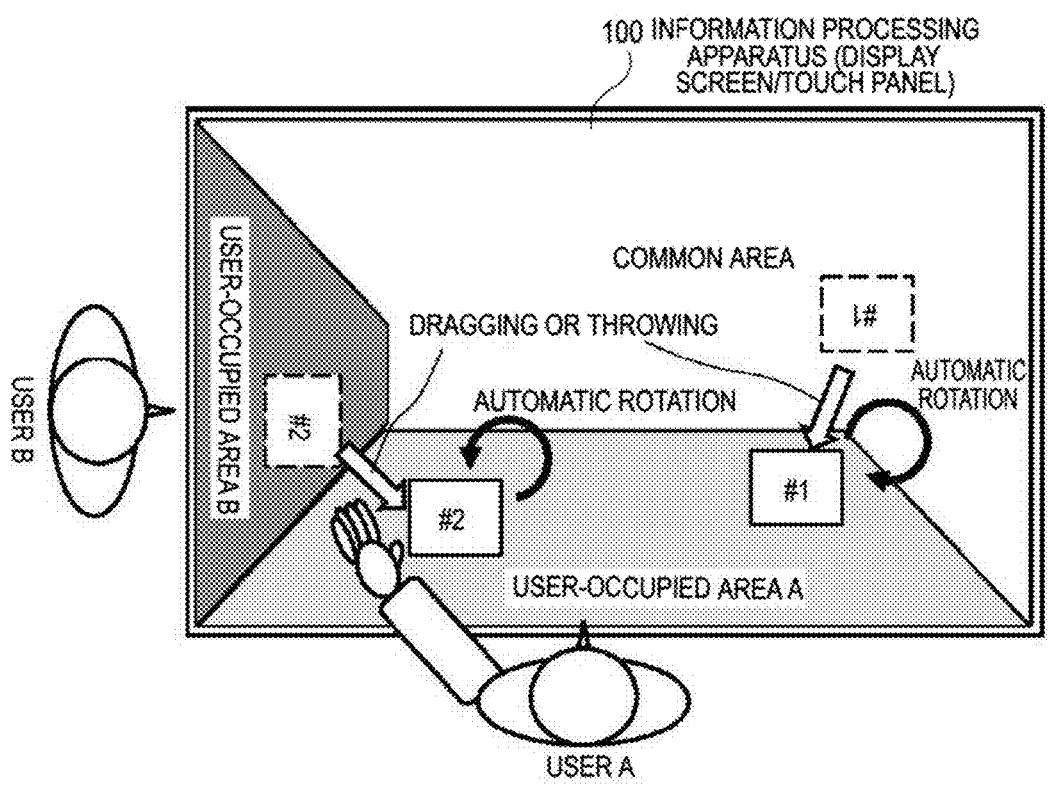
FIG. 15 is a diagram illustrating a state where objects to be manipulated are automatically rotated to exactly face a user by dragging or throwing the objects into a user-occupied area.

FIG. 15 shows a state where the object optimizing unit 720 automatically rotates object #1 so as to exactly face user A at the time point at which object #1 in the common area is dragged or thrown to user-occupied area A of user A and a part or a central coordinate of the object enters user-occupied area A. FIG. 15 also shows a state where the object optimizing unit 720 automatically rotates object #2 so as to exactly face user A at the time point at which object #2 in user-occupied area B of user B is dragged or thrown to user-occupied area A of user A and a part or a central coordinate of the object enters user-occupied area A.

Figure 16A:
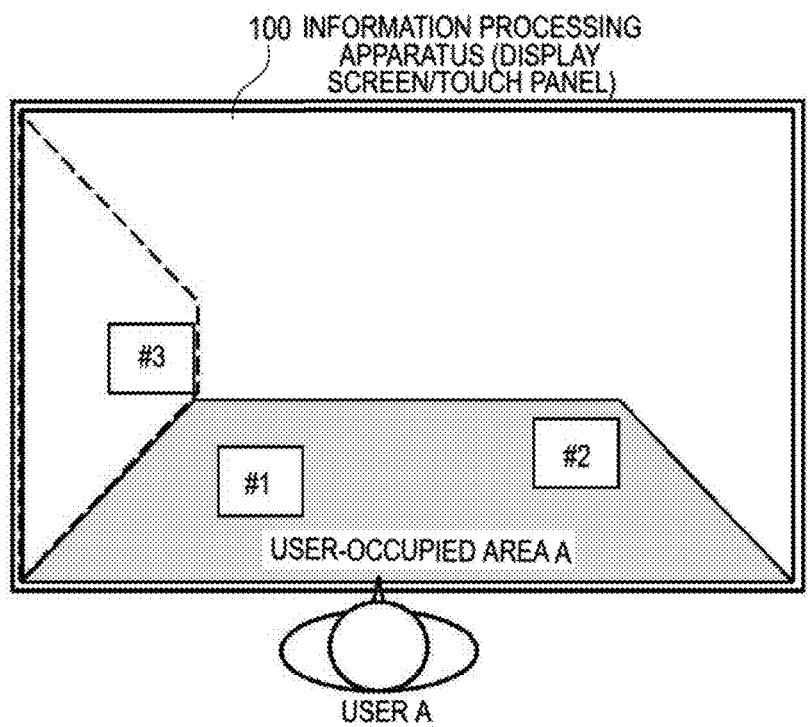
FIG. 16A is a diagram illustrating a state where an object which newly appears in a user-occupied area is automatically rotated to exactly face the user.
Figure 16B:
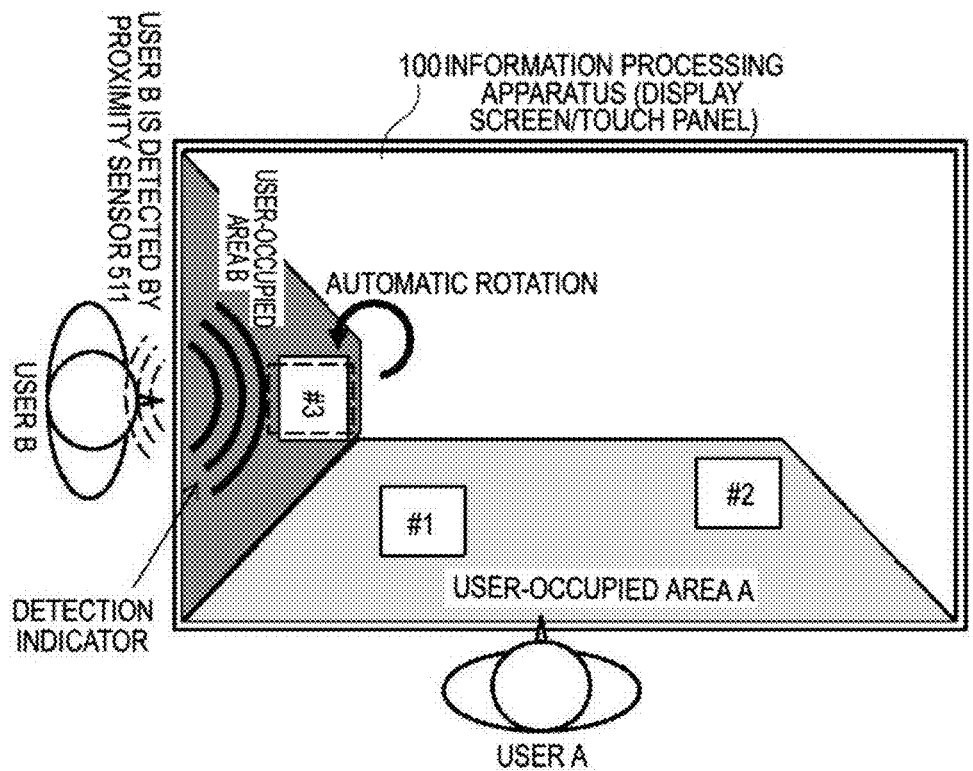
FIG. 16B is a diagram illustrating a state where an object which newly appears in a user-occupied area is automatically rotated to exactly face the user.

As shown in FIG. 10, when user B approaches the information processing apparatus 100, user-occupied area B is newly set in the vicinity of user B on the screen. When object #3 exactly facing user A is present in user-occupied area B and user-occupied area B newly appears as shown in FIG. 16B, the object optimizing unit 720 automatically rotates object #3 so as to exactly face user B at once.

Alternatively, instead of rotating the object at once, user-occupied area B may be made to be valid at the time point at which any object in user-occupied area B is firstly touched after user-occupied area B is newly set by the approaching of user B to the information processing apparatus 100. In this case, at the time point at which user-occupied area B is made to be valid, all the objects in user-occupied area B may be simultaneously rotated to exactly face user B.

Figure 17:
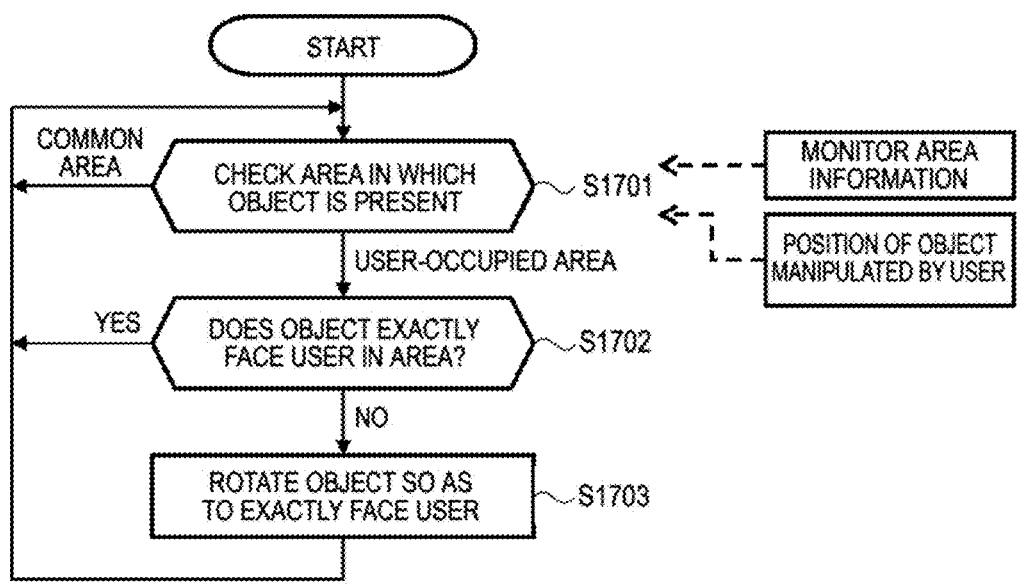
FIG. 17 is a flowchart illustrating the flow of an object optimizing process performed by an object optimizing unit.

The object optimizing unit 720 can perform the process of optimizing the objects on the basis of the manipulation information of a user acquired from the input interface integrating unit 520 and the area information received from the monitor area dividing unit 710. FIG. 17 is a flowchart illustrating the flow of the object optimizing process performed by the object optimizing unit 720.

When the positional information of the object manipulated by a user is received from the input interface integrating unit 520 and the divided monitor area information is acquired from the monitor area dividing unit 710, the object optimizing unit 720 checks the area in which the object manipulated by the user is present (step S1701).

Here, when the object manipulated by the user is present in a user-occupied area, the object optimizing unit 720 checks whether the object is directed to exactly face the user in the user-occupied area (step S1702).

When the object is not directed to exactly face the user (NO in step S1702), the object optimizing unit 720 rotates the object so as to exactly face the user in the corresponding user-occupied area (step S1703).

Figure 18:
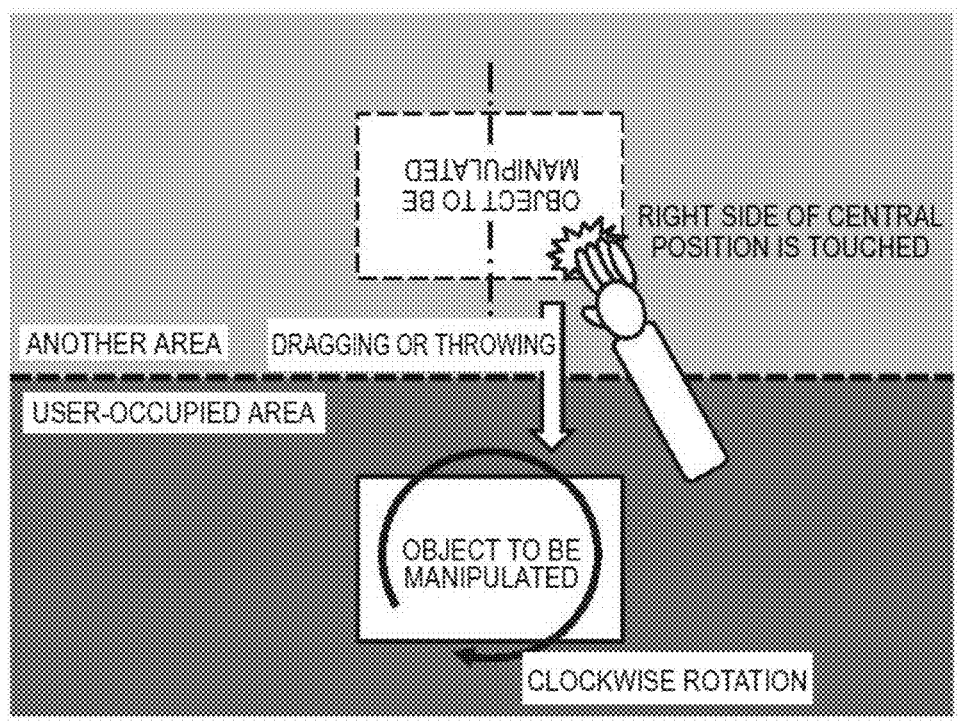
FIG. 18 is a diagram illustrating a state where a rotation direction is controlled depending on the position at which a user touches an object.
Figure 19:
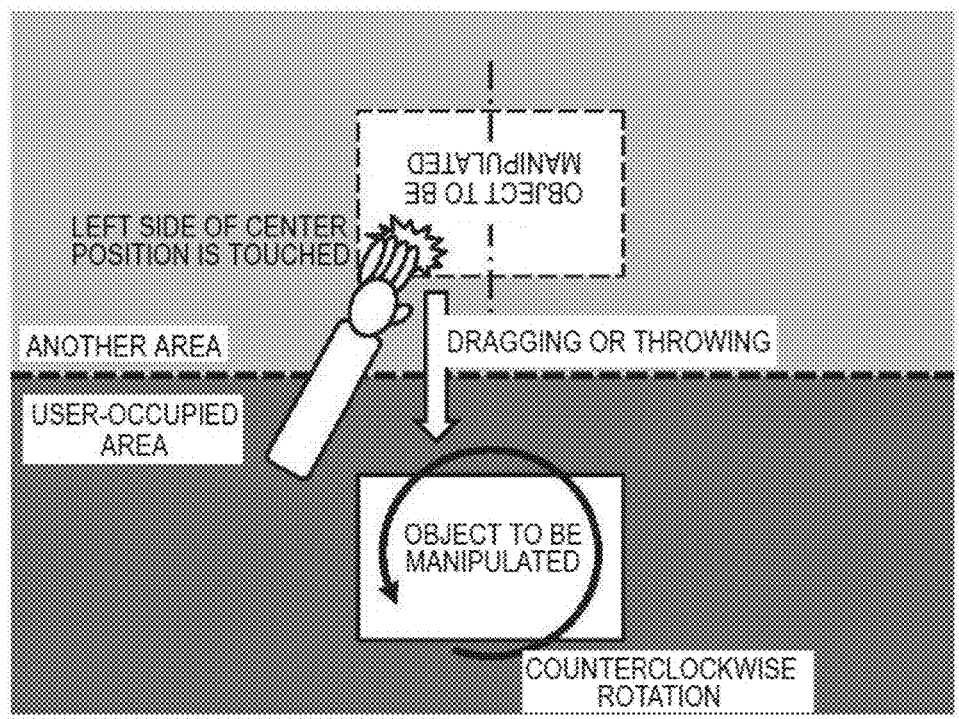
FIG. 19 is a diagram illustrating a state where a rotation direction is controlled depending on the position at which a user touches an object.

When the user drags or throws an object from the common area or the user-occupied area of another user to his or her user-occupied area, the rotation direction may be controlled on the basis of the position at which the user touches the object. FIG. 18 shows a state where an object is rotated clockwise about the position of the center of gravity to exactly face the user at the time point at which the object enters the user-occupied area by allowing the user to touch the right side of the position of the center of gravity in the object and to drag or throw the object. FIG. 19 shows a state where an object is rotated counterclockwise about the position of the center of gravity to exactly face the user by allowing the user to touch the left side of the position of the center of gravity in the object and to drag or throw the object.

As shown in FIGS. 18 and 19, it is possible to give a natural feeling of manipulation to a user by changing the rotation direction of an object about the position of the center of gravity.

Subsequently, a device interaction data transmitting and receiving process performed by the device interaction data transmitting and receiving unit 730 will be described below.

As shown in FIG. 4, the information processing apparatus 100 can communicate with another apparatus such as a mobile terminal carried by a user through the use of the communication unit 150. For example, in the background of action in which a user touches a screen or brings his or her carried terminal close to the information processing apparatus 100, data such as a moving image, a still image, a text content, and the like, which is a substantial body of the object to be manipulated, is transmitted and received between the information processing apparatus 100 and the corresponding carried terminal.

Figure 20:
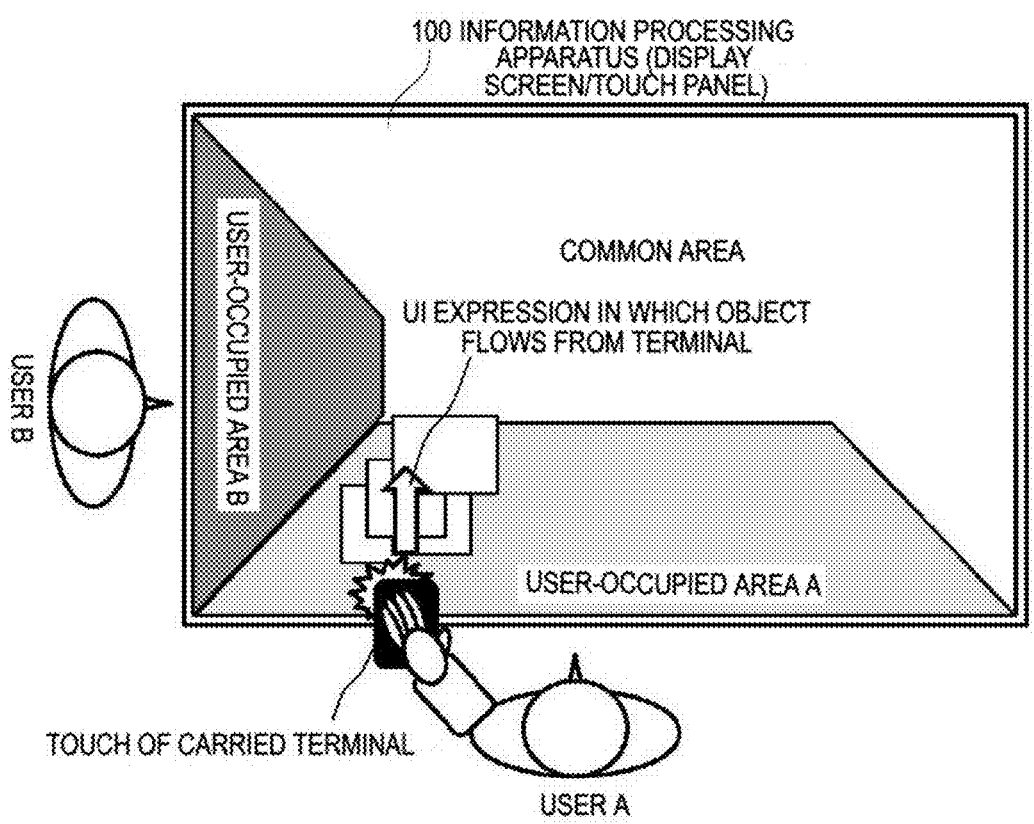
FIG. 20 is a diagram illustrating an example of an interaction of exchanging an object between the information processing apparatus and a terminal carried by a user.

FIG. 20 shows an example of an interaction of giving and taking an object between the information processing apparatus 100 and the terminal carried by a user. In the example shown in the drawing, when user A causes his or her carried terminal to approach the vicinity of user-occupied area A assigned to the user, a UI expression that an object appears from the vicinity of the terminal and flows in user-occupied area A is carried out.

The information processing apparatus 100 can detect that the terminal carried by the user approaches the vicinity of user-occupied area A on the basis of the signal analysis result of the detection signal from the very-short-range communication unit 513 or the recognition result of the captured image of the user from the camera unit 503. The device interaction data transmitting and receiving unit 730 may specify whether data to be transmitted to the information processing apparatus 100 from the user exists and what the data to be transmitted is, through the use of the context between user A and the information processing apparatus 100 (or exchange between user A and another user through the information processing apparatus 100). When the transmission data exists, the device interaction data transmitting and receiving unit 730 transmits and receives data such as a moving image, a still image, and a text content, which is a substantial body of the object to be manipulated, between the information processing apparatus 100 and the corresponding carried terminal in the background of action in which a user brings his or her carried terminal close to user-occupied area A.

In the background, the device interaction data transmitting and receiving unit 730 carries out the UI expression that an object to be manipulated appears from the terminal carried by the user on the screen of the display unit 603 through the use of the object optimizing process in the object optimizing unit 720 while transmitting and receiving data to and from the terminal carried by the user. FIG. 20 shows an example of the UI expression that an object to be manipulated flows in user-occupied area A from the terminal carried by user A.

Figure 21:
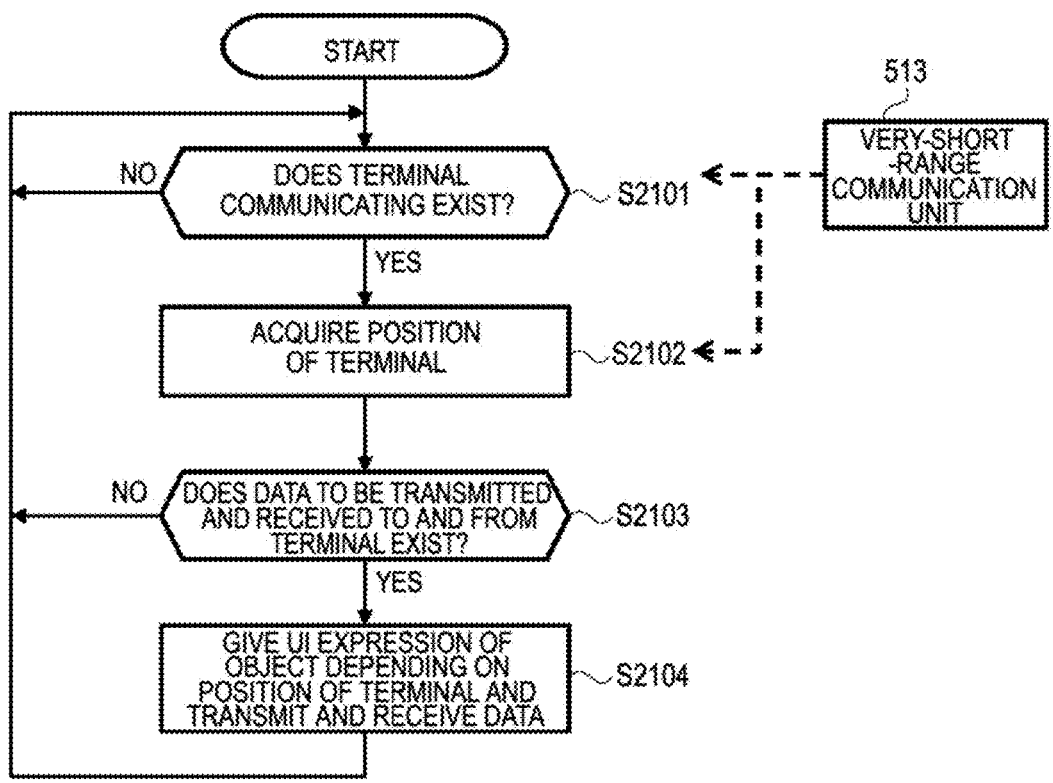
FIG. 21 is a flowchart illustrating the flow of a device interaction data transmitting and receiving process performed by a device interaction data transmitting and receiving unit.

FIG. 21 is a flowchart illustrating the flow of the device interaction data transmitting and receiving process performed by the device interaction data transmitting and receiving unit 730. The process of the device interaction data transmitting and receiving unit 730 is started up when a terminal carried by a certain user approaches the vicinity of his or her user-occupied area on the basis of the signal analysis result of the detection signal from the very-short-range communication unit 513.

The device interaction data transmitting and receiving unit 730 checks whether or not a terminal carried by a user in communication is present on the basis of the signal analysis result of the detection signal from the very-short-range communication unit 513 (step S2101).

When a terminal carried by a user in communication is present (YES in step S2101), the device interaction data transmitting and receiving unit 730 acquires the position of the terminal on the basis of the signal analysis result of the detection signal from the very-short-range communication unit 513 (step S2102).

The device interaction data transmitting and receiving unit 730 checks whether or not data to be transmitted and received to and from the terminal carried by the user exists (step S2103).

When data to be transmitted and received to and from the terminal carried by the user exists (YES in step S2103), the device interaction data transmitting and receiving unit 730 performs a UI display (see FIG. 20) of an object to be manipulated depending on the position of the terminal in accordance with a transmitting and receiving algorithm 731. The device interaction data transmitting and receiving unit 730 transmits and receives data, which is a substantial body of the object, to and from the terminal in the background of the UI display (step S2104).

Figure 22:
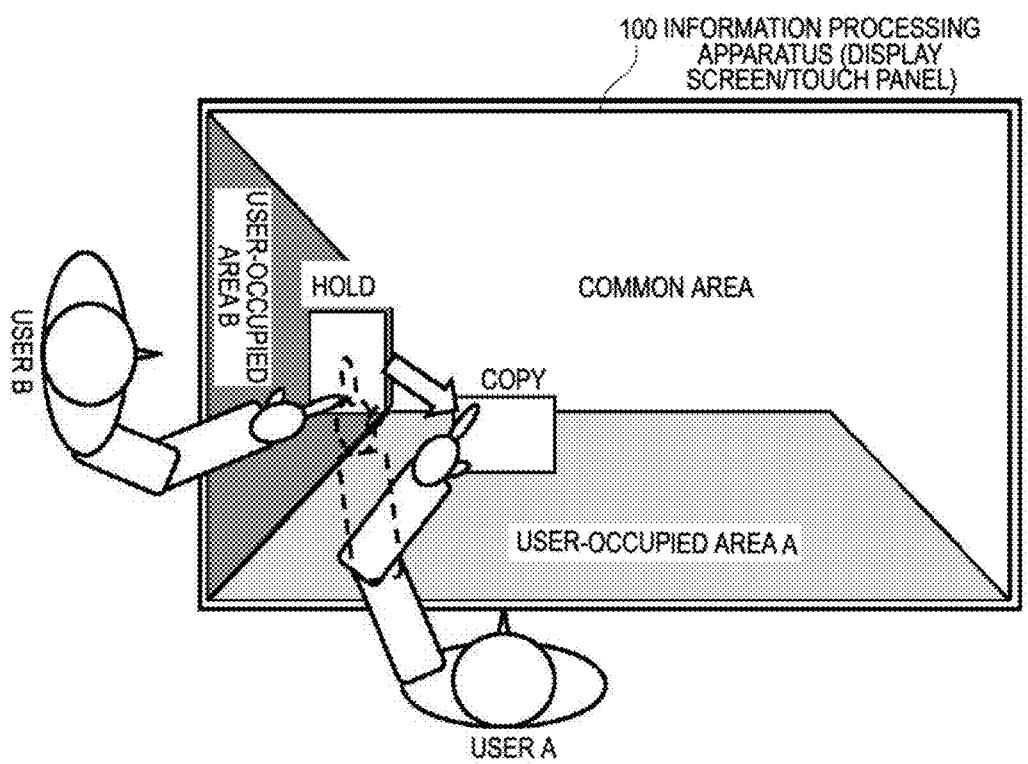
FIG. 22 is a diagram illustrating a state where an object to be manipulated is moved between user-occupied areas to copy the object.

As shown in FIGS. 20 and 21, the object acquired from the terminal carried by the user by the information processing apparatus 100 is disposed in the user-occupied area of the corresponding user. When data is given and taken between users, a manipulation of moving an object between the user-occupied areas has only to be performed. FIG. 22 shows a state where an object held by user B in user-occupied area B is copied to user-occupied area A by user A. Alternatively, the object may be divided instead of copying the object.

When the object copied on the screen is a content such as a moving image or a still image, independent data is simply prepared. When the copied object is a window of an application, another window of the application which can be collaboratively manipulated by the user originally holding the object and a user of a copying destination is prepared.

C. Optimal Selection of Input Unit and Display GUI Depending on Position of User The information processing apparatus 100 includes a the distance sensor 507 and the proximity sensors 511 and can detect the distance from the body of the information processing apparatus 100, that is, the screen, to a user, for example, in the WALL form shown in FIGS. 1 and 3.

The information processing apparatus 100 includes the touch sensor 509, the proximity sensor 511, the camera unit 503, and the remote controller reception unit 501 and can provide plural input units such as a touch with a screen, approaching, a gesture using a hand, a remote controller, and an indirect manipulation depending on a user state to a user. The respective input units have propriety for manipulation depending on the distance from the body of the information processing apparatus 100, that is, the screen, to the user. For example, a user located within 50 cm from the body of the information processing apparatus 100 can surely manipulate an object to be manipulated by directly touching the screen. Since a user located within 2 m from the body of the information processing apparatus 100 is too far to directly touch the screen but can accurately capture a face or a motion of a hand by recognizing an image captured by the camera unit 503, the user can input a gesture. A user located over 2 m from the body of the information processing apparatus 100 can manipulate a remote controller, because the accuracy of image recognition is low but a remote controller signal can be surely input. The optimal GUI display with the framework or information density of objects to be displayed on the screen is changed depending on the distance to the user.

In this embodiment, since the information processing apparatus 100 automatically selects the input unit out of the plural input units depending on the position of the user or the distance to the user and automatically selects or adjusts the GUI display depending on the position of the user, the convenience to the user is improved.

FIG. 23 shows the internal configuration of the operation unit 120 for performing the optimizing process depending on the distance to the user. The operation unit 120 includes a display GUI optimizing unit 2310, an input unit optimizing unit 2320, and a distance detection mode switching unit 2330.

The display GUI optimizing unit 2310 optimizes the optimal GUI display with the framework or information density of objects to be displayed on the screen of the display unit 603 depending on the position of the user and the user state.

Here, the position of the user is acquired through a distance detection mode switched by the distance detection mode switching unit 2330. When the position of the user gets close, a personal authentication is possible through the use of recognition of a face from an image captured by the camera unit 503 or proximity communication with the terminal carried by the user. The user state is specified on the basis of the image recognition from an image captured by the camera unit 503 or the signal analysis in the distance sensor 507. The user state is broadly classified into two states of "a user is present (presence)" and "a user is absent (absence)". The state of "a user is present" is classified into two states of "a user is watching a TV (the screen of the display unit 603) (in watch)" and "a user does not watch a TV (in non-watch)". The state of "a user is watching a TV" is classified into two states of "a user is manipulating a TV (in manipulation)" and "a user does not manipulate a TV (in non-manipulation)".

The display GUI optimizing unit 2310 refers to a device input unit database in the storage unit 140 at the time of determining the user state. A GUI display (framework and density) database and a content database in the storage unit 140 is referred to at the time of optimizing the display GUI depending on the determined position of the user and the user state.

Figure 24A:
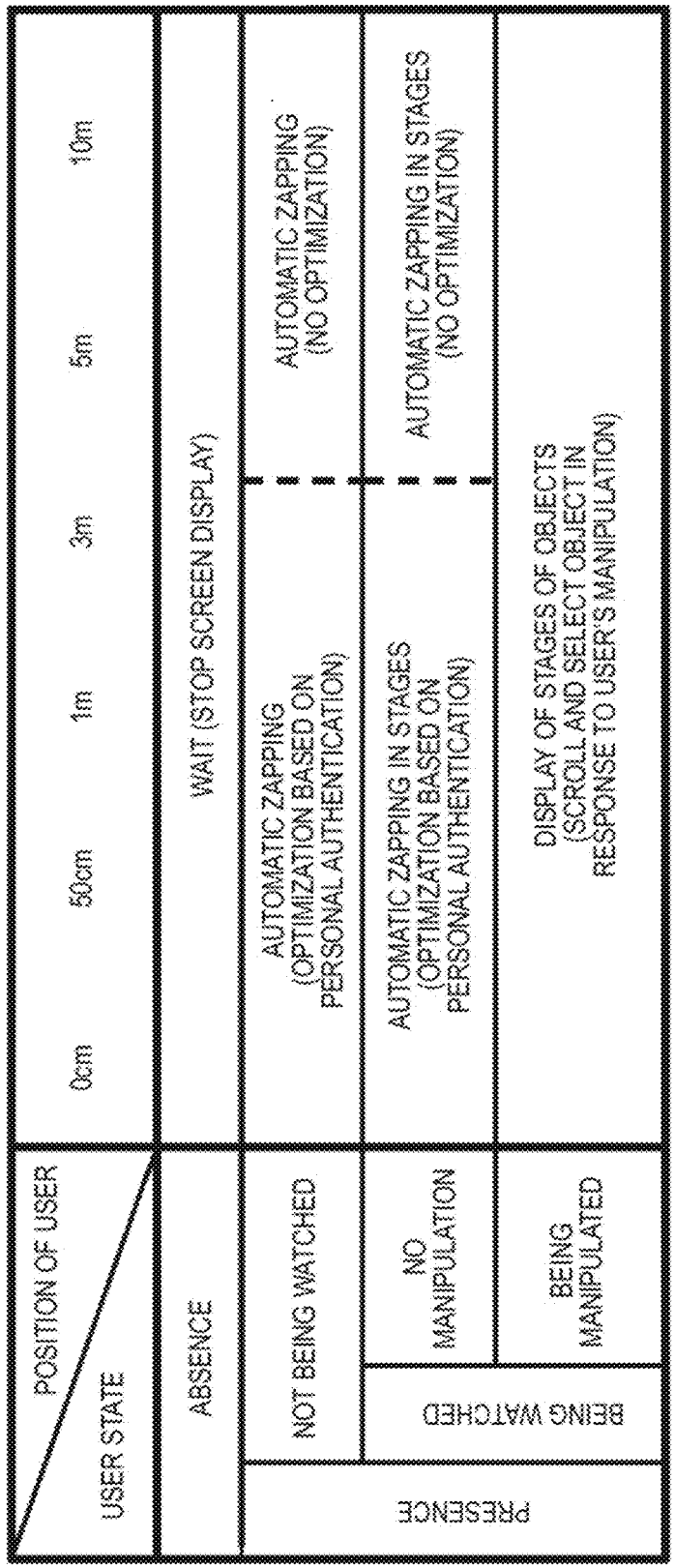
FIG. 24A is a diagram illustrating a table in which GUI display optimizing processes, which are performed by a display GUI optimizing unit, based on a position of a user and a user state are arranged.

FIG. 24A shows a table in which display GUI optimizing processes, which is performed by the display GUI optimizing unit 2310, corresponding to the position of the user and the user state are arranged. FIGS. 24B to 24E show changes of the screen of the information processing apparatus 100 depending on the position of the user and the user state.

Figure 24B:
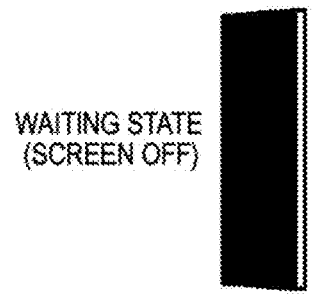
FIG. 24B is a diagram illustrating a change of the screen of the information processing apparatus based on the position of the user and the user state.

In the state of "a user is absent", the display GUI optimizing unit 2310 stops the screen display of the display unit 603 and waits until the presence of a user is detected (see FIG. 24B).

Figure 24C:
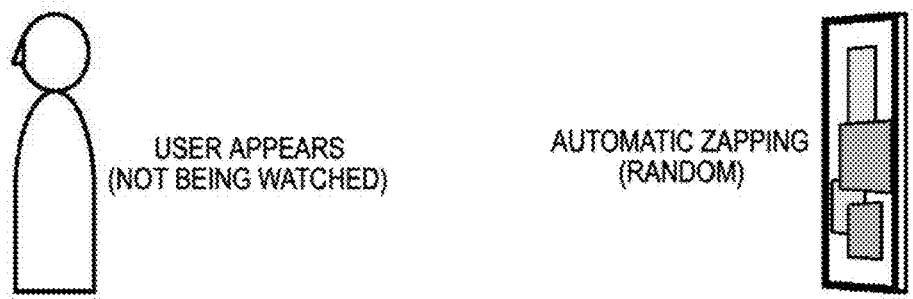
FIG. 24C is a diagram illustrating a change of the screen of the information processing apparatus based on the position of the user and the user state.

In the state of "a user does not watch a TV" of "a user is present", the display GUI optimizing unit 2310 selects "automatic zapping" as the optimal display GUI (see FIG. 24C). The automatic zapping is to randomly display various objects to be manipulated and to attract attention of users to watch a TV. The objects used for the zapping include plural objects selected on the basis of the content database by the display GUI optimizing unit 2310, such as network contents acquired via the Internet from the communication 150 and E-mails or messages from another user, in addition to the program contents of TV broadcast received through the use of the television tuner unit 170.

Figure 25B:
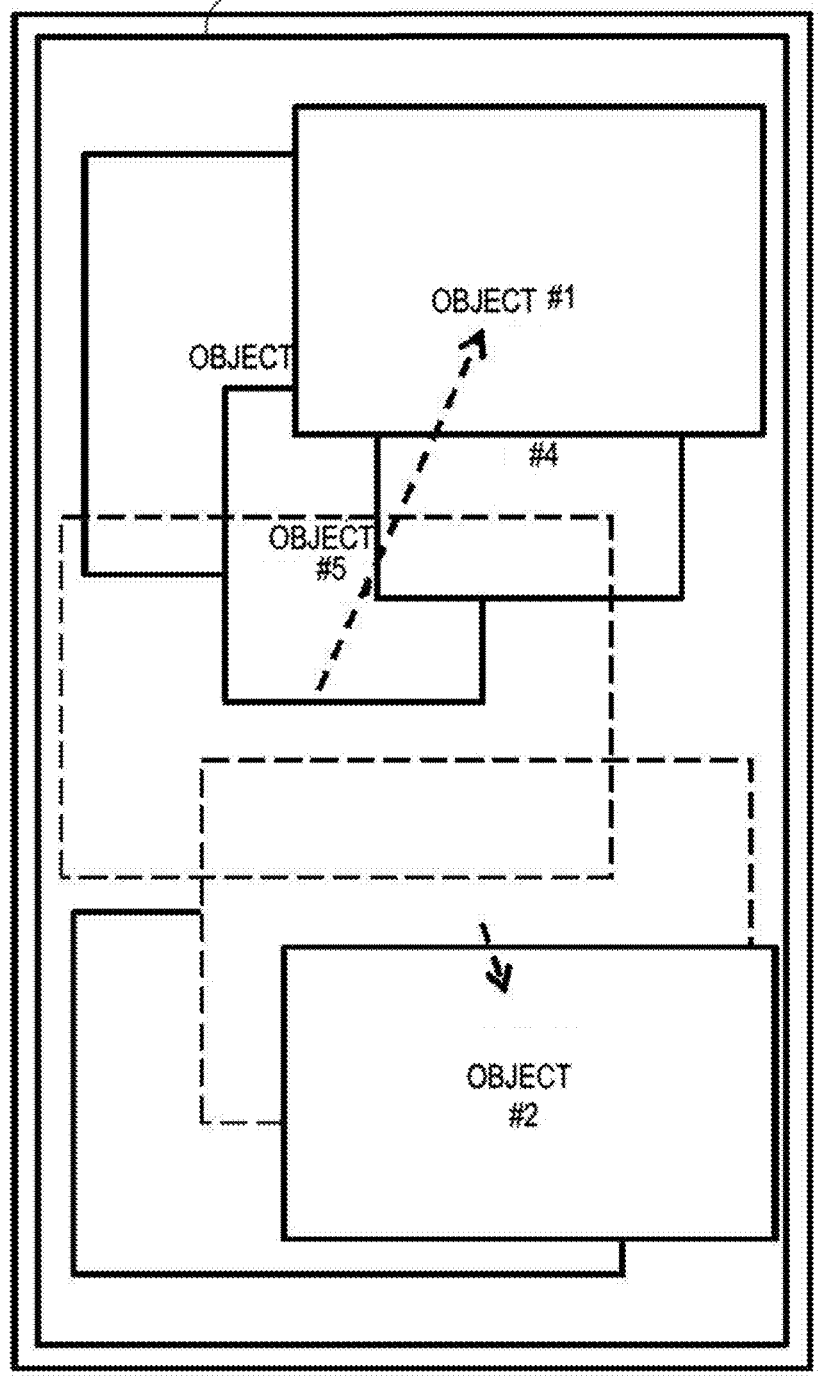
FIG. 25B is a diagram illustrating a display example of a screen in which display positions or sizes of plural objects to be automatically zapped are changed from moment to moment.

FIG. 25A shows an example of the display GUI for the automatic zapping. The display GUI optimizing unit 2310 may change the positions or sizes (that is, the degree of exposure) displayed on the screen from moment to moment as shown in FIG. 25B to act on the user's subconsciousness. When the position of the user gets close and personal authentication gets possible, the display GUI optimizing unit 2310 may select an object to be automatically zapped using the recognized information of the user.

Figure 24D:
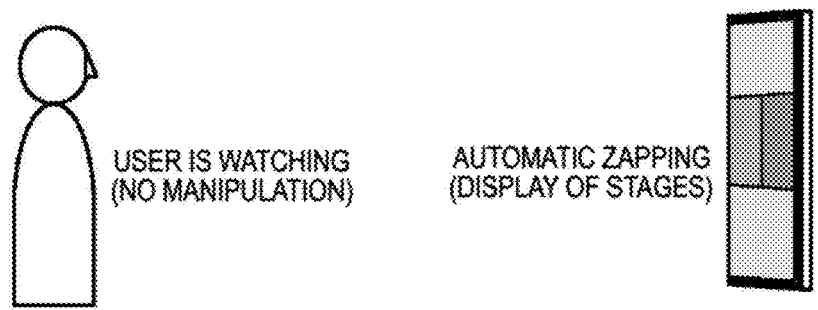
FIG. 24D is a diagram illustrating a change of the screen of the information processing apparatus based on the position of the user and the user state.

In the state of "a user does not manipulate a TV" of "a user is watching a TV", the display GUI optimizing unit 2310 selects "automatic zapping" as the optimal display GUI (see FIG. 24D). Here, unlike the above description, plural objects selected on the basis of the content database may be regularly arranged by dividing the screen into stages or the like as shown in FIG. 26 to facilitate understanding of the display details of the individual objects. When the position of the user gets close and the personal authentication is possible, the display GUI optimizing unit 2310 may select the object to be automatically zapped using the recognized information of the user. The display GUI optimizing unit 2310 may control the information density of the display GUI depending on the position of the user so that the information density of the GUI is lowered when the user is located far and the information density of the GUI is raised when the user gets close.

Figure 24E:
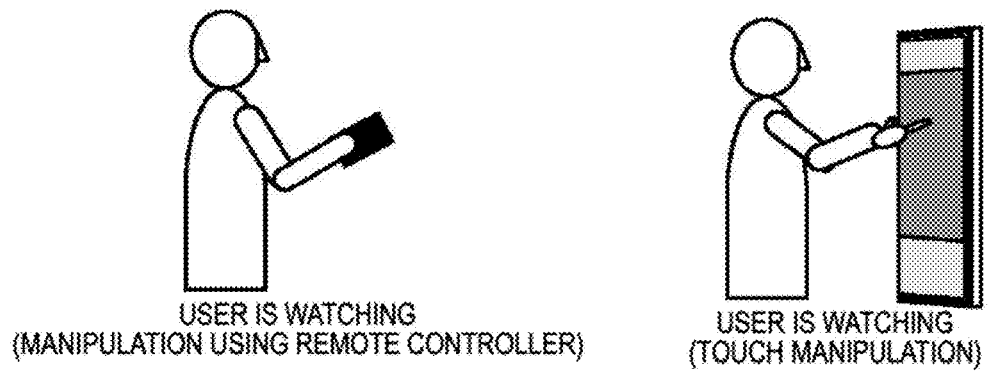
FIG. 24E is a diagram illustrating a change of the screen of the information processing apparatus based on the position of the user and the user state.
Figure 27A:
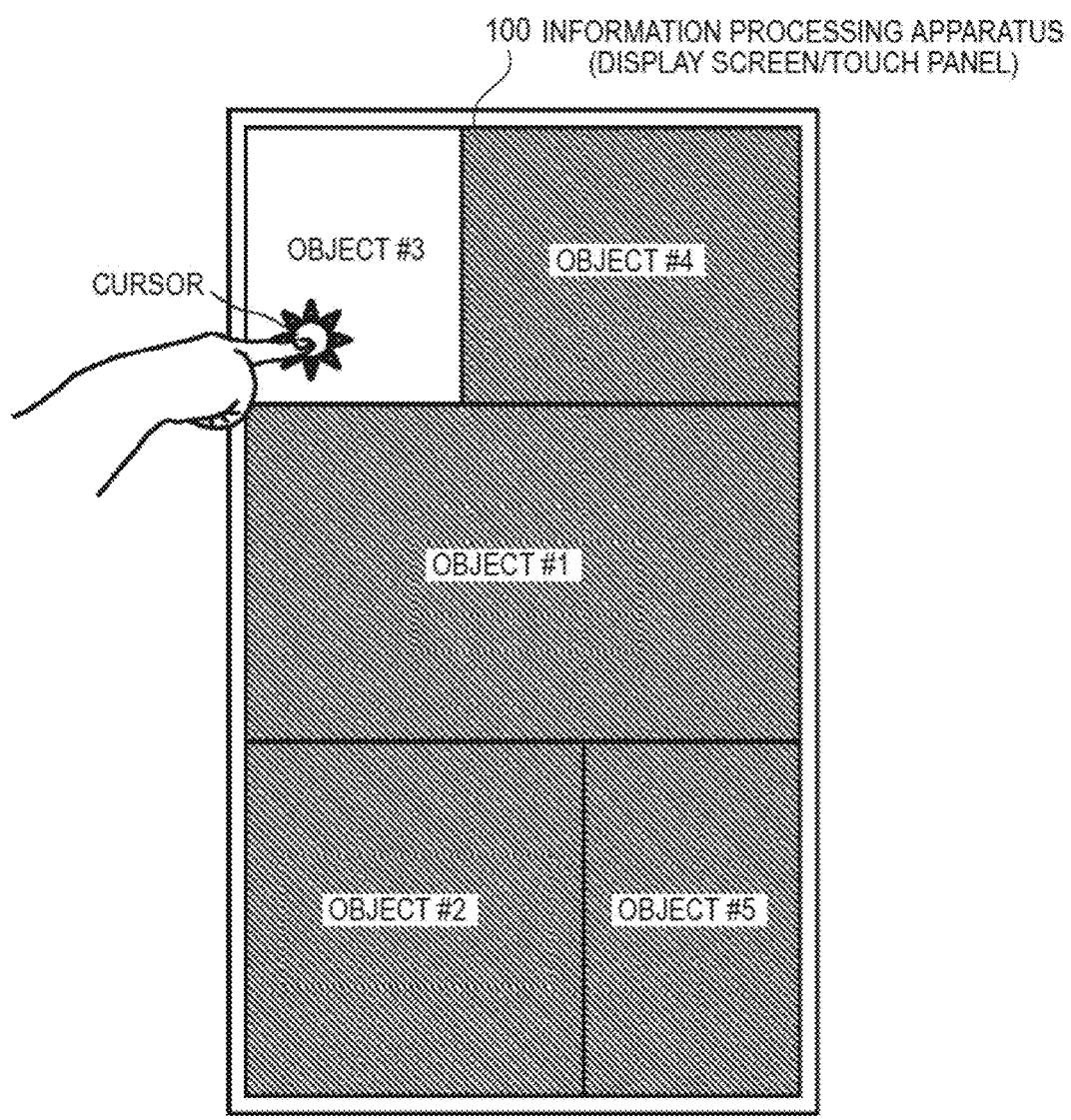
FIG. 27A is a diagram illustrating a display example of a screen in a state where a user is manipulating a TV.
Figure 27B:
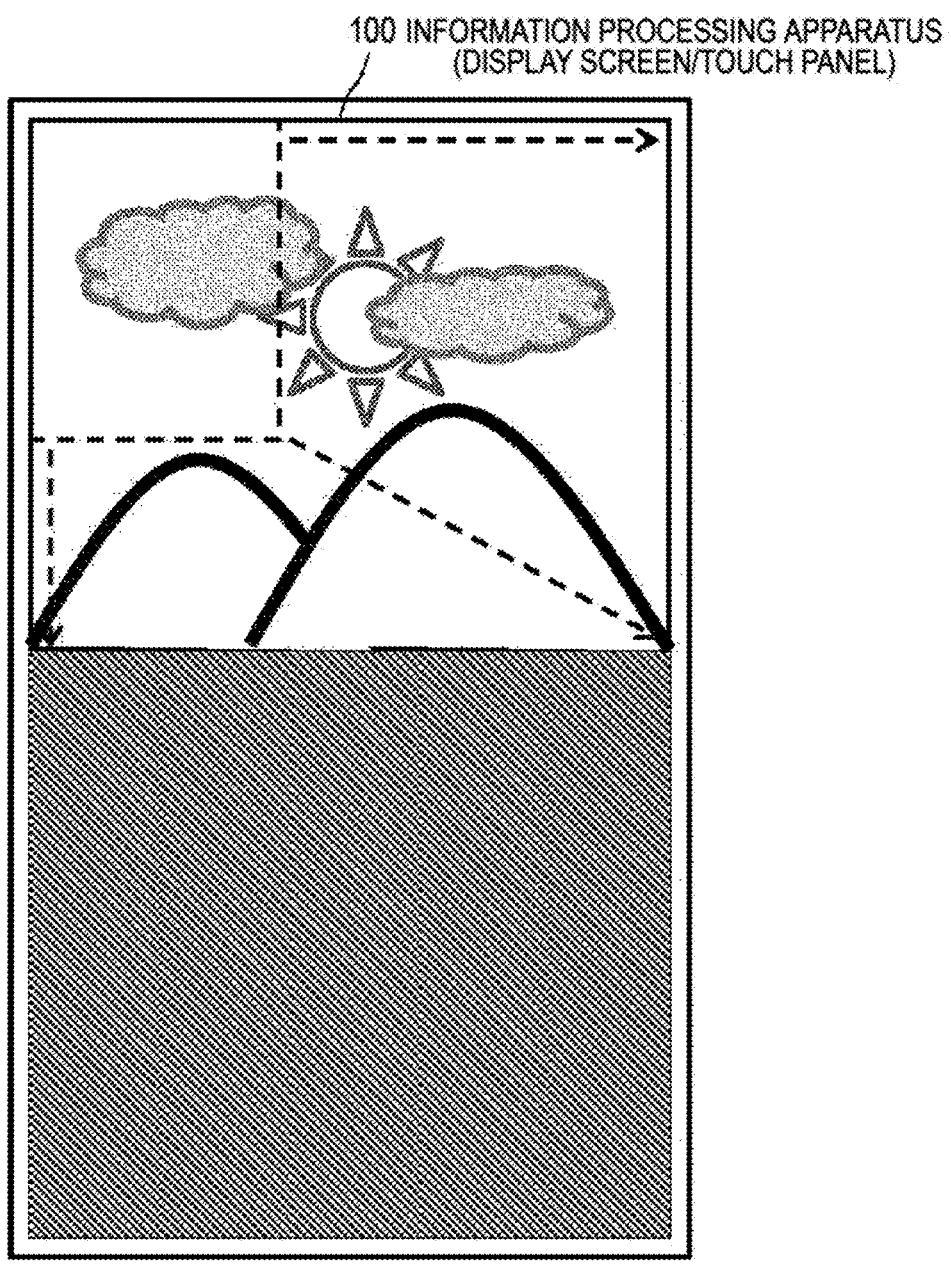
FIG. 27B is a diagram illustrating a display example of a screen in a state where a user is manipulating a TV.

On the other hand, in the state of "a user is manipulating a TV" of "a user is watching a TV", a user manipulates the information processing apparatus 100 using the input unit optimized by the input unit optimizing unit 2320 (see FIG. 24E). In this state, examples of the optimal input unit include an input of a remote controller signal to the remote controller reception unit 501, a gesture input to the camera unit 503, a touch input detected by the touch sensor 509, a speech input to the microphone 505, and a proximity input to the proximity sensor 511. The display GUI optimizing unit 2310 can display the objects in divided stages depending on the user's input manipulation as the optimal display GUI and can scroll or selectively manipulate the objects in response to the user's manipulation. As shown in FIG. 27A, a cursor is displayed at the position on the screen instructed through the use of the input unit. Since the objects on which the cursor is not placed are not interesting the user, the brightness level may be lowered to express the contrast with respect to the object of interest as indicated by hatched lines in the drawing (where the cursor is placed on object #3 touched with a user's finger tip in the drawing). As shown in FIG. 27B, when the user selects the object on which the cursor is placed, the selected object may be displayed in the overall screen (alternatively, may be enlarged and displayed as large as possible) (where selected object #3 is enlarged in the drawing).

The input unit optimizing unit 2320 optimizes the input unit with which the user manipulates the information processing apparatus 100 depending on the position of the user and the user state.

As described above, the position of the user is acquired in the distance detection mode switched by the distance detection mode switching unit 2330. When the position of the user gets close, the personal authentication is possible through the face recognition from the image captured by the camera unit 503 or the proximity communication with the terminal carried by the user. The user state is specified through the image recognition from the image captured by the camera unit 503 or the signal analysis of the distance sensor 507.

The input unit optimizing unit 2320 refers to the device input unit database in the storage unit 140 at the time of determining the user state.

FIG. 28 shows a table in which input unit optimizing processes, which are performed by the input unit optimizing unit 2320, corresponding to the position of the user and the user state are arranged.

In the state of "a user is absent", the state of "a user does not watch a TV" of "a user is present", and the state of "a user does not manipulate a TV" of "a user is watching a TV", the input unit optimizing unit 2320 waits until a user's manipulation is started.

In the state of "a user is manipulating a TV" of "a user is watching a TV", the input unit optimizing unit 2320 optimizes the respective input unit mainly depending on the position of the user. Examples of the input unit include an input of a remote controller signal to the remote controller reception unit 501, a gesture input to the camera unit 503, a touch input detected by the touch sensor 509, a speech input to the microphone 505, and a proximity input to the proximity sensor 511.

The remote controller reception unit 501 is started up for all positions of users (that is, almost normally) and waits until a remote controller signal is received.

The recognition accuracy of the camera unit 503 from the captured image is lowered as a user gets farther. When a user gets excessively close, the figure of the user easily departs from the field of view of the camera unit 503. Therefore, the input unit optimizing unit 2320 receives the gesture input to the camera unit 503 within the range of the user position of several tens of centimeters to several meters.

The touch with the touch panel superimposed on the screen of the display unit 603 is limited to the range which a user's hand reaches. Therefore, the input unit optimizing unit 2320 receives the touch input to the touch sensor 509 within the range of the user position until several tens of centimeters. The proximity sensor 511 can detect a user within several tens of centimeters even without being touched. Accordingly, the input unit optimizing unit 2320 receives the proximity input up to the user position at which the touch input is not possible.

The recognition accuracy of a speech input to the microphone unit 505 is lowered as a user gets farther. Therefore, the input unit optimizing unit 2320 receives the gesture input to the camera unit 503 within the range of the user position of several meters.

The distance detection mode switching unit 2330 performs a process of switching the mode in which the information processing apparatus 100 detects the distance to the user or the position of the user depending on the position of the user.

The distance detection mode switching unit 2330 refers to an area coverage database for each detection mode in the storage unit 140 at the time of determining the user state.

FIG. 29 shows a table in which distance detection mode switching processes, which are performed by the distance detection mode switching unit 2330, corresponding to the position of the user are arranged.

The distance sensor 507 is simply constructed by a sensor device having lower power consumption, such as a PSD sensor or a pyroelectric sensor or a simple camera. In order to normally monitor whether a user is present within a radius of 5 to 10 meters from the information processing apparatus 100, the distance detection mode switching unit 2330 normally turns on the distance sensor 507.

When the camera unit 503 employs a monocular type, the image recognizing unit 504 performs motion recognition, face recognition, and trunk recognition of a user based on a background difference. The distance detection mode switching unit 2330 turns on the recognition (distance detection) function of the image recognizing unit 504 within the range of the user position of 70 centimeters to 6 meters in which satisfactory recognition accuracy from the captured image is obtained.

When the camera unit 503 employs a binocular type or an active type, the image recognizing unit 504 can achieve sufficient recognition accuracy within the slightly closer range of 60 centimeters to 5 meters and the distance detection mode switching unit 2330 turns on the recognition (distance detection) function of the image recognizing unit 504 within the range of the user position.

When a user gets excessively close, the figure of the user easily departs from the field of view of the camera unit 503. Accordingly, the distance detection mode switching unit 2330 may turn off the camera unit 503 and the image recognizing unit 504 when a user gets excessively close.

The touch with the touch panel superimposed on the screen of the display unit 603 is limited to the range which a user's hand reaches. Accordingly, the distance detection mode switching unit 2330 turns on the distance detection function of the touch sensor 509 within the range of the user position of several tens of centimeters. The proximity sensor 511 can detect a user within several tens of centimeters even when without being touched. Accordingly, the distance detection mode switching unit 2330 turns on the distance detection function of the proximity sensor 511 up to the user position at which the touch input is not possible.

As design methodology of the information processing apparatus 100 having plural distance detection modes, since the distance detection mode for detecting a remote position father than several meters or 10 meters is designed to check the presence of a user and thus should be normally turned on, a device having low power consumption is preferably used. On the contrary, since the distance detection mode for detecting a position closer than 1 meter can have recognition functions such as a face recognition function and a trunk recognition function by acquiring information with a high density but consumes large power in the recognition processes, the function thereof is turned off in the distance in which satisfactory recognition accuracy cannot be achieved.

D. Real-Size Display of Object Depending on Monitor Performance

In an object display system according to the related art, an image of an object which actually exists is displayed on the screen without considering of the real size information thereof. Accordingly, the size of the object to be displayed is changed depending on the size or resolution (dpi) of the screen. For example, a lateral width a' when a bag with a lateral width of a centimeters is displayed on a 32-inch monitor is different from a lateral width a" when the bag is displayed on a 50-inch monitor (a≠a'≠a") (see FIG. 30).

When images of plural objects are simultaneously displayed on the same monitor screen, the mutual size relationship of the objects is not correctly displayed without considering the real size information of the objects. For example, when a bag with a lateral width of a centimeters and a pouch with a lateral width of b centimeters are simultaneously displayed on the same monitor screen, the bag is displayed in a' centimeters and the pouch is displayed in b' centimeters, that is, the mutual size relationship thereof is not correctly displayed (a:b≠a':b') (see FIG. 31).

For example, in net-shopping a product, when the sample image thereof cannot reproduce the real size, a user cannot accurately fit the product to his or her own figure and thus may purchase an incorrect product. When plural products are intended to simultaneously purchase through the net shopping and sample images of the products are simultaneously displayed on the screen, but the mutual size relationship of the sample images is not correctly displayed, a user cannot accurately fit the products in combination and thus may purchase the products by an inappropriate combination.

On the contrary, the information processing apparatus 100 according to this embodiment manages the real size information of objects to be displayed and the information on the size and resolution (pixel pitch) of the screen of the display unit 603 and normally displays images of objects in real sizes on the screen even when the size of the objects or the screen is changed.

Figure 32:
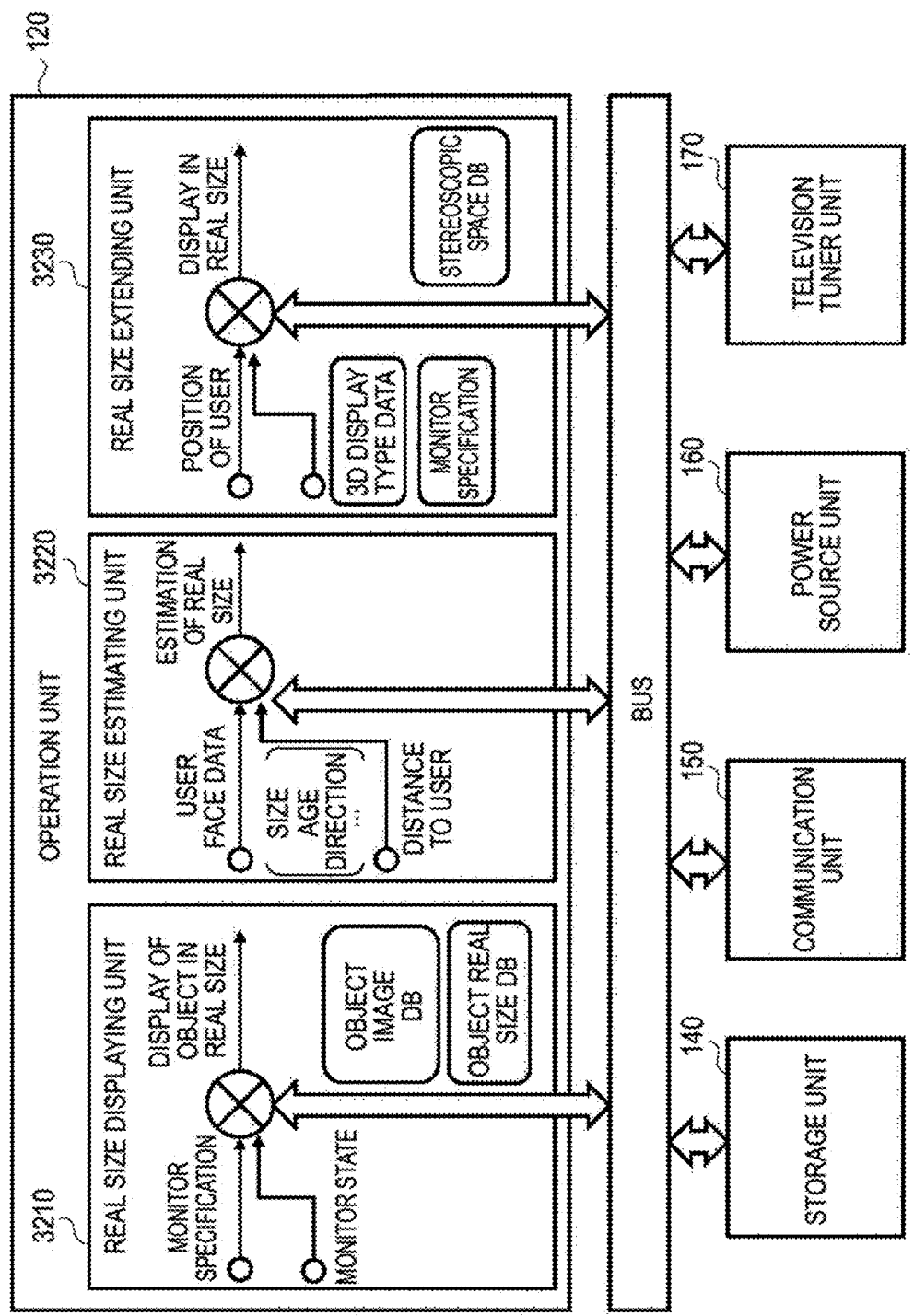
FIG. 32 is a diagram illustrating the internal configuration of the operation unit that performs an object real-size displaying process corresponding to monitor performance.

FIG. 32 shows the internal configuration of the operation unit 120 for performing an object real-size displaying process depending on the monitor performance. The operation unit 120 includes a real size displaying unit 3210, a real size estimating unit 3220, and a real size extending unit 3230. At least one functional block of the real size displaying unit 3210, the real size estimating unit 3220, and the real size extending unit 3230 is also assumed to be embodied over a cloud server connected via the communication unit 150.

The real size displaying unit 3210 normally displays images of objects in real sizes depending on the size and resolution (pixel pitch) of the screen of the display unit 603 by considering the real size information of the objects when simultaneously displaying the images of plural objects on the same monitor screen. The real size displaying unit 3210 correctly displays the mutual size relationship of the objects when simultaneously displaying the images of plural objects on the screen of the display unit 603.

The real size displaying unit 3210 reads monitor specifications such as the size and resolution (pixel pitch) of the screen of the display unit 603 from the storage unit 140. The real size displaying unit 3210 acquires a monitor state such as the direction and slope of the screen of the display unit 603 from the rotation and attachment mechanism unit 180.

The real size displaying unit 3210 reads an image of an object to be displayed from an object image database in the storage unit 140 and reads the real size information of an object from the object real size database. Here, the object image database or the object real size database is assumed to be disposed in a database server connected via the communication unit 150.

Figure 33:
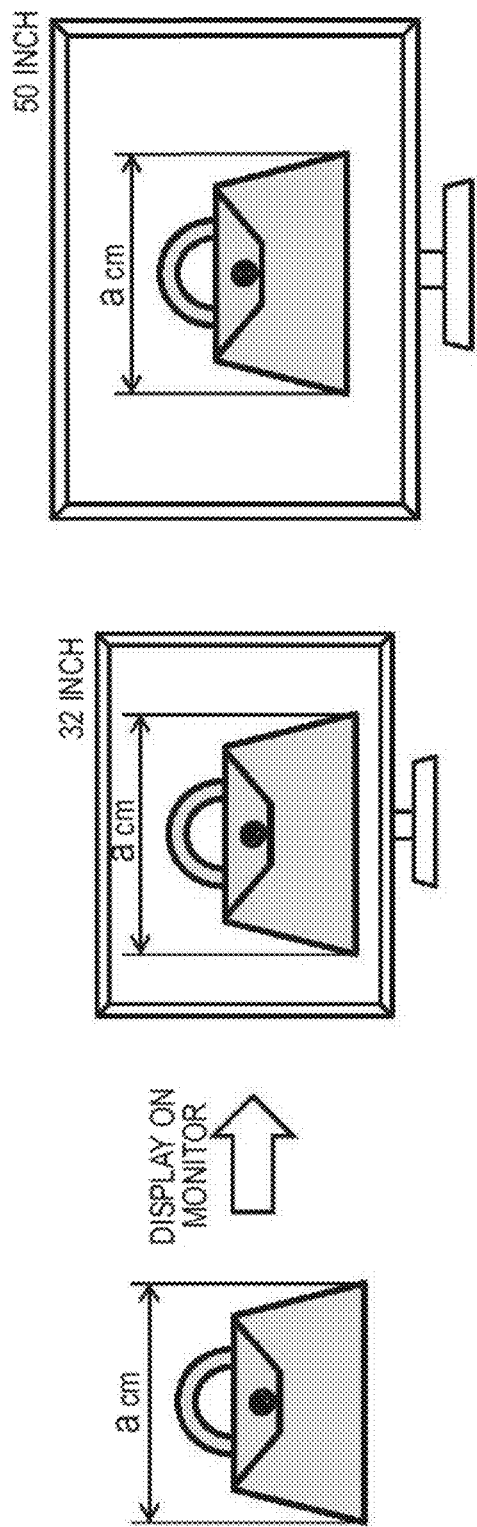
FIG. 33 is a diagram illustrating an example where an image of the same object is displayed in real sizes on screens having different monitor specifications.

The real size displaying unit 3210 converts the images of the objects on the basis of the monitor performance and the monitor state so that the objects to be displayed are displayed in real sizes on the screen of the display unit 603 (alternatively, so that the mutual size relationship of the objects is correct). That is, even when images of the same object are displayed on screens with different monitor specifications, a=a'=a'' is established as shown in FIG. 33.

The real size displaying unit 3210 displays the relationship of a:b=a':b', that is, a correct mutual size relationship, as shown in FIG. 34 when displaying images of two objects having different real sizes on the same screen.

For example, when a user net-shops through the use of the display of sample images, the information processing apparatus 100 can realize the real size display of objects or can display the plural sample images thereof with a correct size relationship as described above. Accordingly, the user can accurately fit the products and thus can reduce erroneous selection of a product.

An example where the real size display of an object image in the real size displaying unit 3210 is applied to a net-shopping application will be additionally described. In response to the touch of a user with an image of a desired product on the display screen of a catalog, the image of the product is switched to a real size display (see FIG. 35). The image displayed in a real size can be rotated or changed in posture in response of the touch of the user and thus can be displayed with the direction of the real-size object changed (see FIG. 36).

The real size estimating unit 3220 performs a process of estimating the real size of an object of which the real size information cannot be obtained in spite of reference to the object real size database, such as a person imaged by the camera unit 503. For example, when the object of which the real size is estimated is a user's face, the real size of the user is estimated on the basis of user face data such as the face size, the age, and the direction of the user obtained by recognizing an image captured by the camera unit 503 through the use of the image recognizing unit 504 and the position of the user obtained in the distance detection mode switched by the distance detection mode switching unit 2330.

The estimated real size information of the user is fed back to the real size displaying unit 3210 and is stored, for example, in the object image database. The real size information estimated from the user face data is used to the subsequent real size display depending on the monitor performance in the real size displaying unit 3210.

Figure 37A:
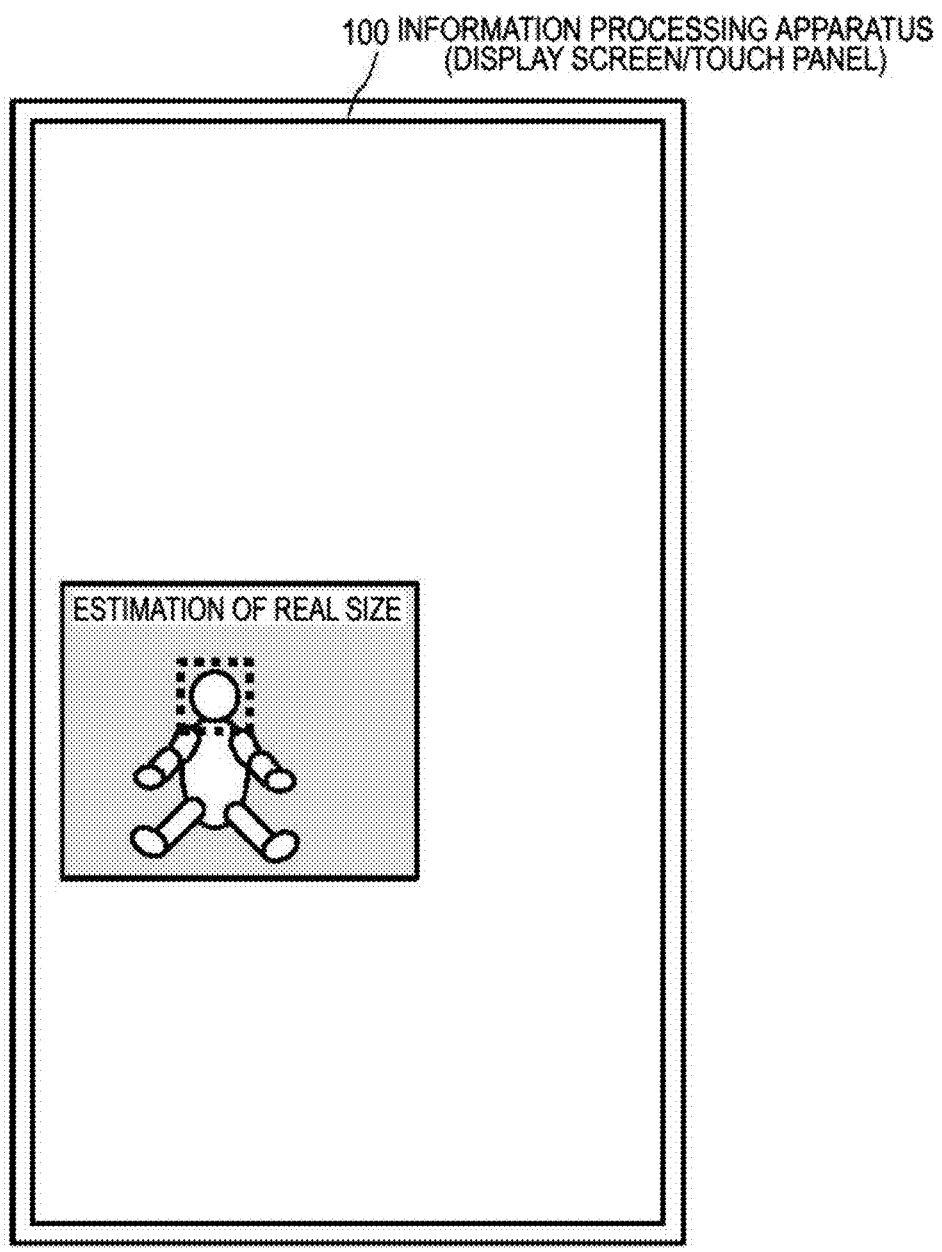
FIG. 37A is a diagram illustrating a state where real size information of a subject is estimated.
Figure 37B:
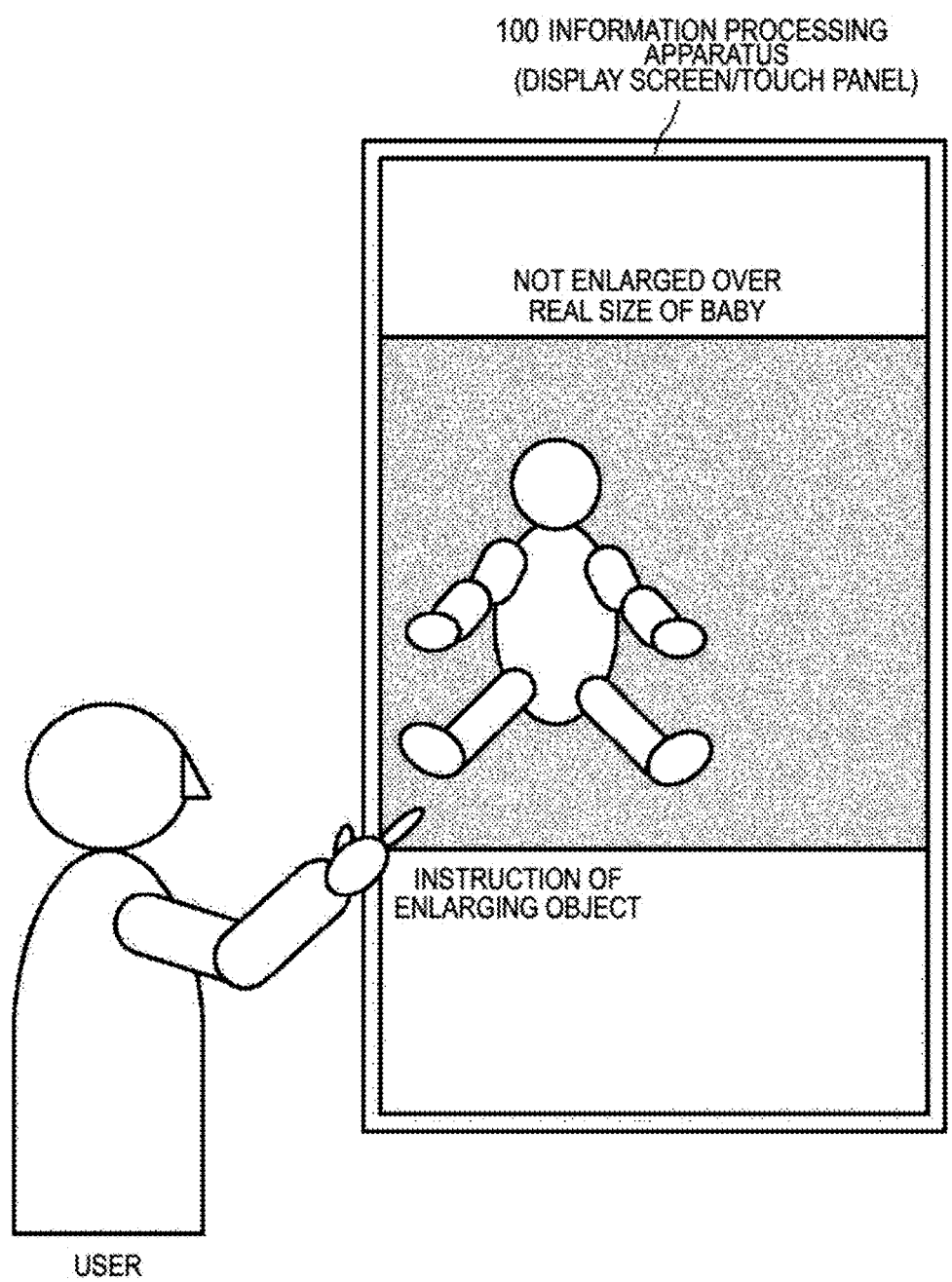
FIG. 37B is a diagram illustrating a state where an object real size displaying process is performed on the basis of the estimated real size information of the subject.

For example, as shown in FIG. 37A, when an object including a captured image of a subject (a baby) is displayed, the real size estimating unit 3220 estimates the real size on the basis of the face data thereof. Thereafter, even when the user enlarges and displays the object through the touching manipulation, the object is not enlarged over the real size of the subject as shown in FIG. 37B. That is, the image of the baby is not unnaturally enlarged and thus the reality of the image is maintained.

When a network content and a content imaged by the camera unit 503 are displayed in a parallel or overlapping manner on the screen of the display unit 603, it is possible to implement the harmonized parallel or overlapping display by normalizing the images of the contents on the basis of the estimated real size.

The real size extending unit 3230 realizes the real size display of objects implemented on the screen of the display unit 603 by the real size displaying unit 3210 in a 3D, that is, to include the depth direction. When an object is displayed in a 3D through a binocular type or a parallax rays reconstruction type only in the horizontal direction, the desired effect is achieved only at a viewing position assumed at the time of generating a 3D image. An object can be displayed in a real size from any position through the parallax rays reconstruction type in all directions.

The real size extending unit 3230 detects a viewpoint position of a user and corrects a 3D image with respect to the detected position also in the binocular type or the parallax rays reconstruction type only in the horizontal direction, whereby the same real size display can be achieved from any position.

For example, commonly owned JP-A-2002-300602, JP-A-2005-149127, and JP-A-2005-142957 can be referred to.

E. Simultaneous Display of Image Group

In a display system, image contents of plural sources may be simultaneously displayed on the same screen in a parallel or overlapping manner. Examples thereof include (1) a case where plural users video-chat with each other, (2) a case where an image of an instructor reproduced from a recording medium such as a DVD (or reproduced in a streaming manner through a network) or an image of a user himself or herself captured by the camera unit 503 are simultaneously displayed at the time of lesson of yoga or the like, and (3) a case where a sample image of a product in net-shopping and an image of a user himself or herself captured by the camera unit 503 are displayed in an overlapping manner for fitting.

Figure 38A:
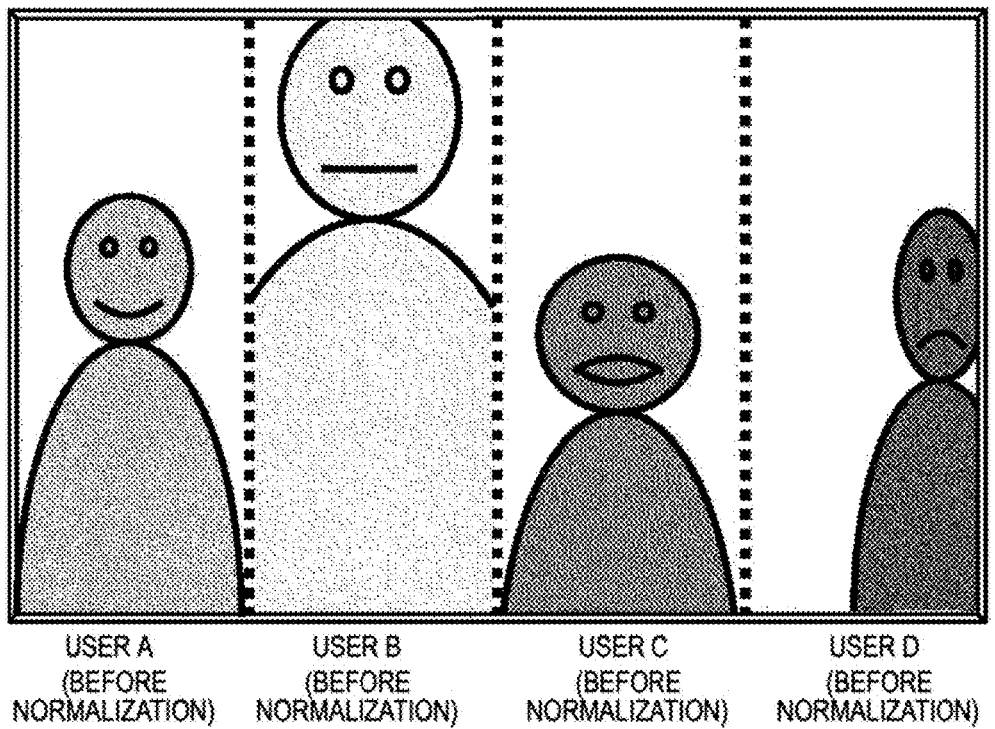
FIG. 38A is a diagram illustrating a state where face sizes or positions of users video-chatting with each other are all different.
Figure 39A:
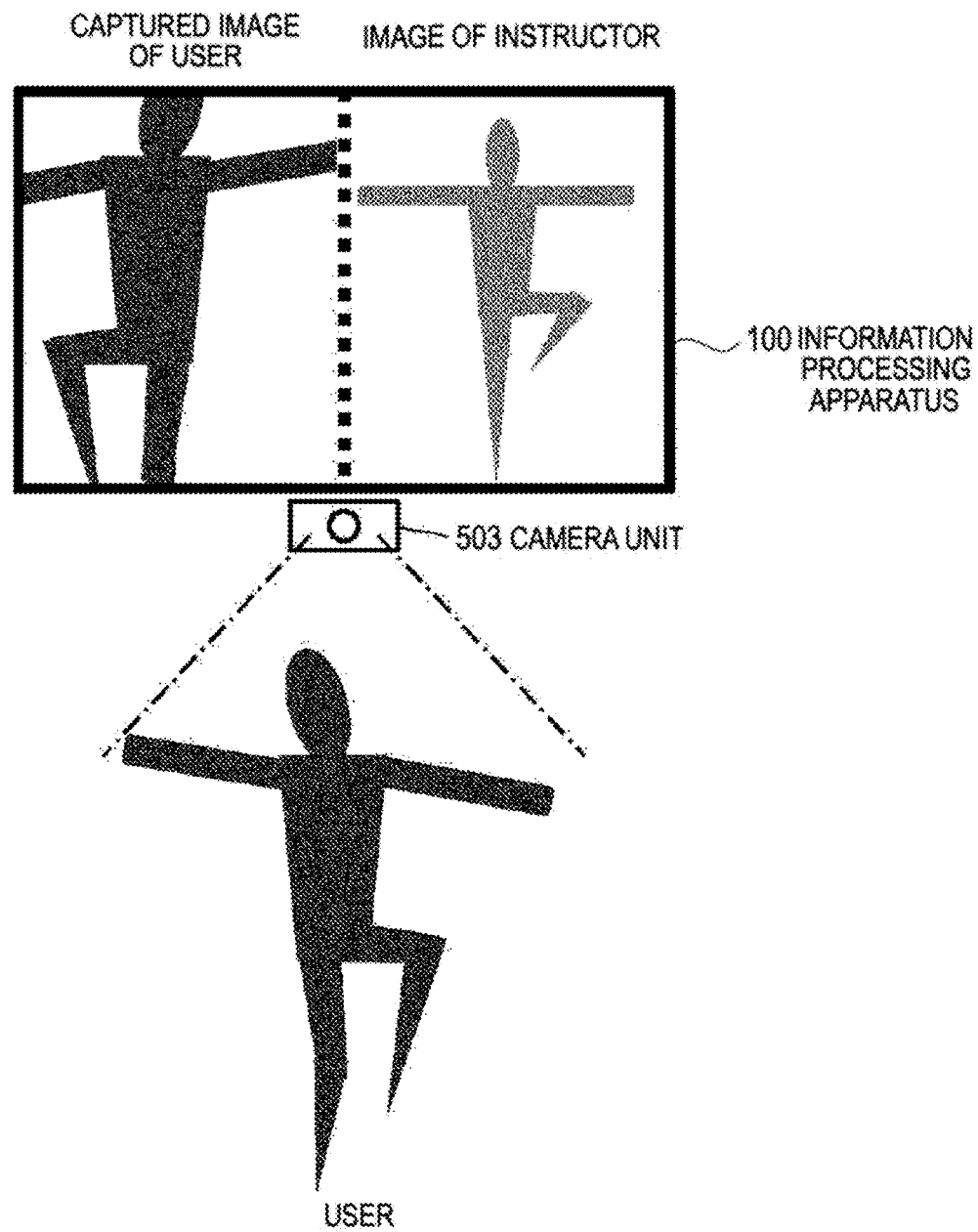
FIG. 39A is a diagram illustrating a state where sizes or positions of a figure of a user and a figure of an instructor displayed in parallel on a screen are not matched with each other.
Figure 40A:
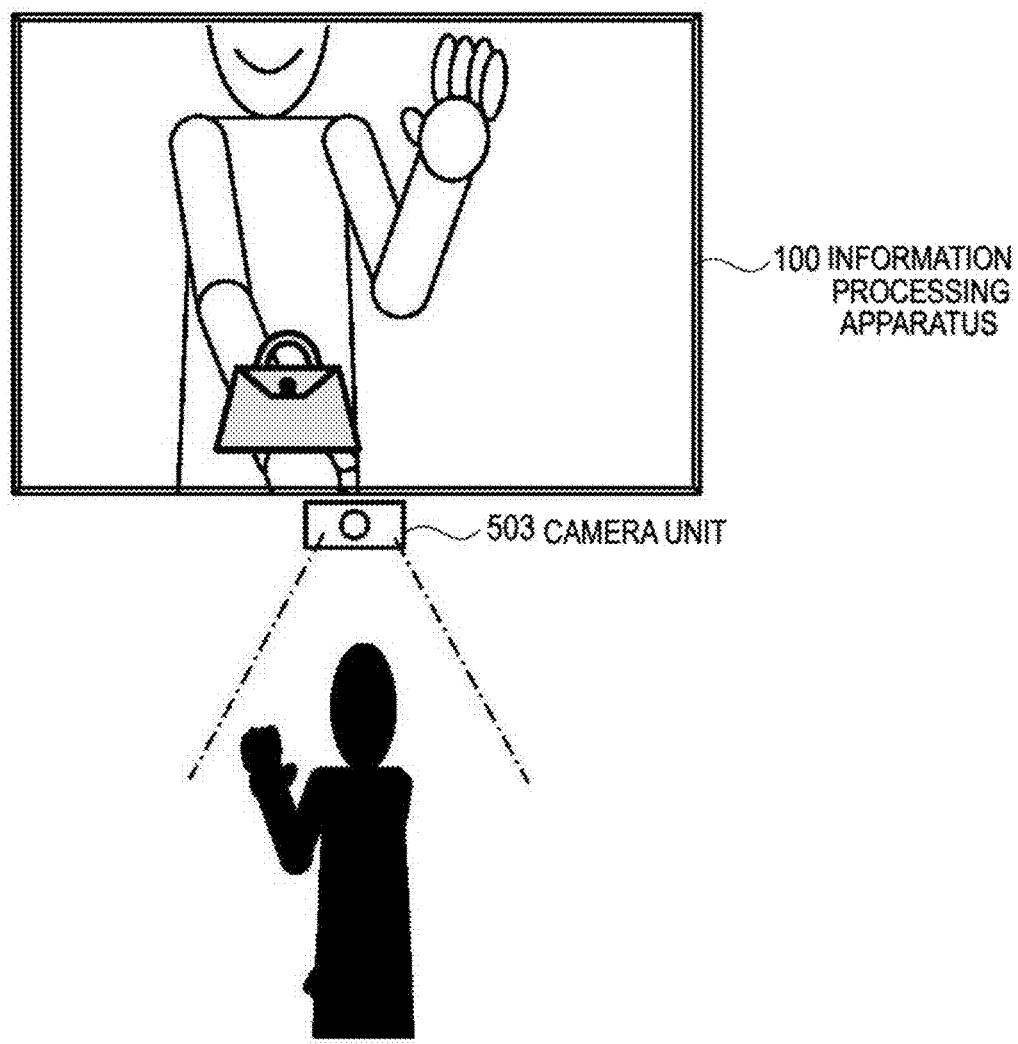
FIG. 40A is a diagram illustrating a state where a sample image of a product does not overlap with an image of a user at an appropriate position with a correct size relationship.

In any case of (1) to (3), when the size relationship of the images simultaneously displayed is not correctly displayed, the user cannot appropriately use the displayed images. For example, when the sizes or positions of faces of users video-chatting with each other are all different (FIG. 38A), the face-to-face contact property with the chatting partners is damaged and thus the conversation is not encouraged. When the sizes or positions of the figure of the user and the figure of the instructor do not match each other (FIG. 39A), the user has a difficulty in checking the difference between his or her motion and the instructor's motion, cannot see any point to be corrected and improved, and thus cannot achieve the satisfactory result of lesson. When a sample image of a product does not overlap with the image of the user taking a pose with the product on his or her hand at an appropriate position with the correct size relationship, the user has a difficulty in determining whether the product goes with the user and thus cannot achieve the accurate fitting (FIG. 40A).

On the contrary, when image contents of plural sources are displayed in a parallel or overlapping manner, the information processing apparatus 100 according to this embodiment normalizes images and displays the normalized images in a parallel or overlapping manner on the basis of the information such as the scale of the images or the corresponding areas. When performing the normalization, the information processing apparatus performs a digital-zooming image processor the like on digital image data such as a still image and a moving image. When one of the parallel or overlapping images is an image captured with the camera unit 503, an optical control such as panning, tilting, and zooming is performed on an actual camera.

Figure 38B:
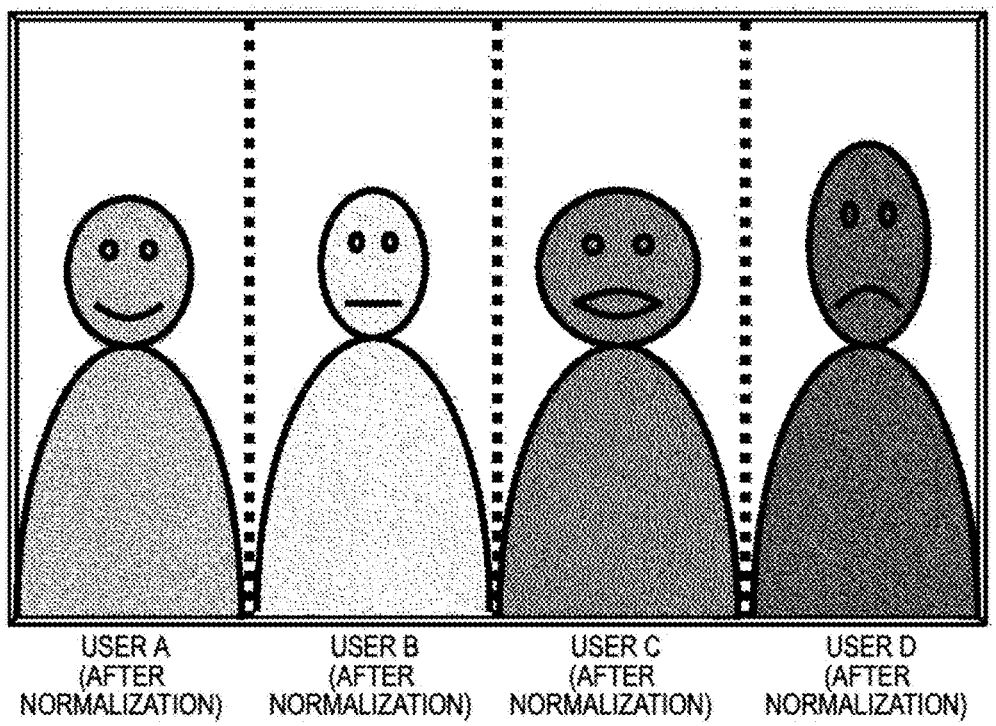
FIG. 38B is a diagram illustrating a state where the face sizes or positions of users video-chatting with each other are matched with each other through a normalization process on plural images.
Figure 39B:
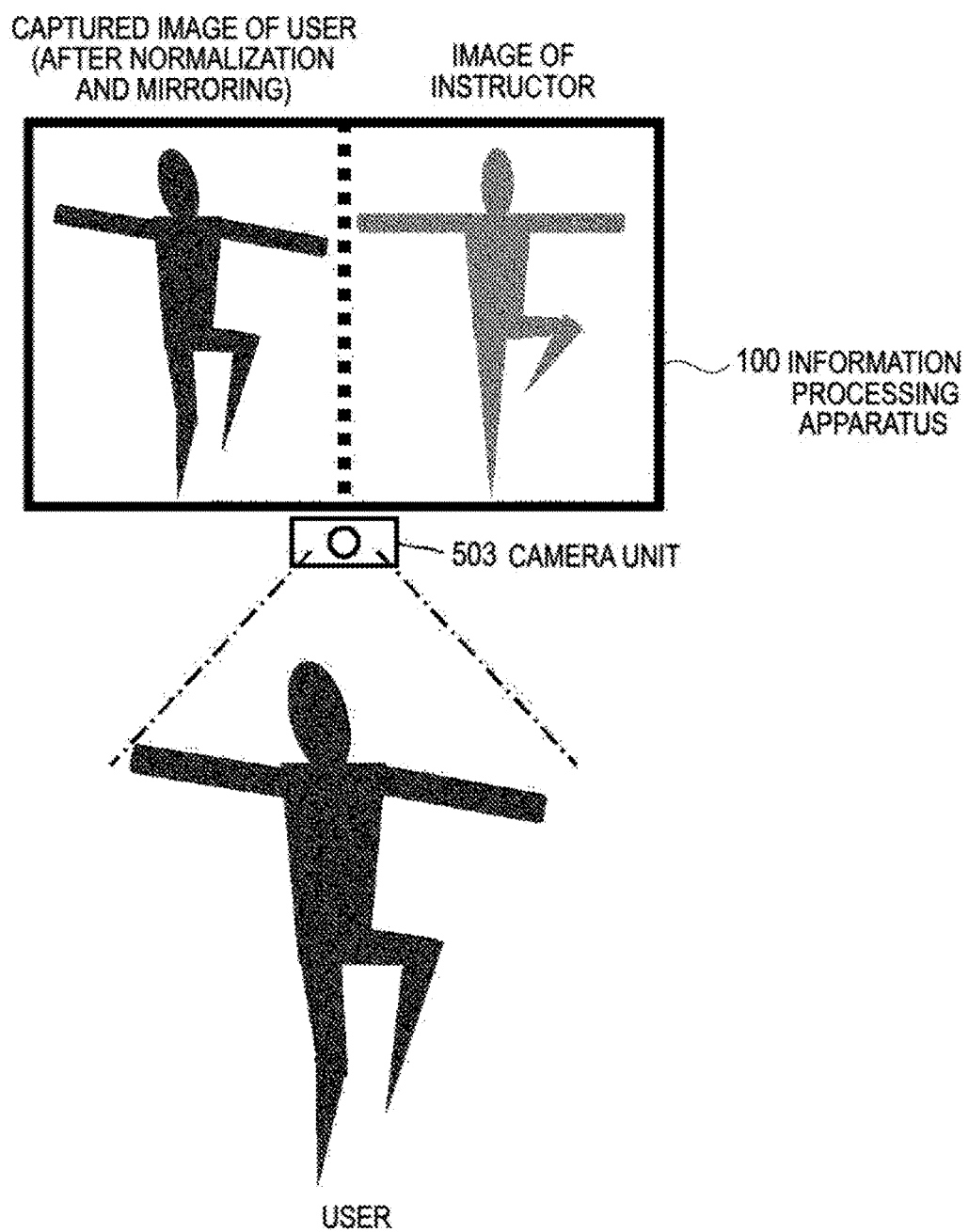
FIG. 39B is a diagram illustrating a state where the sizes or positions of the figure of a user and the figure of an instructor displayed in parallel on the screen are matched with each other through a normalization process on plural images.
Figure 39C:
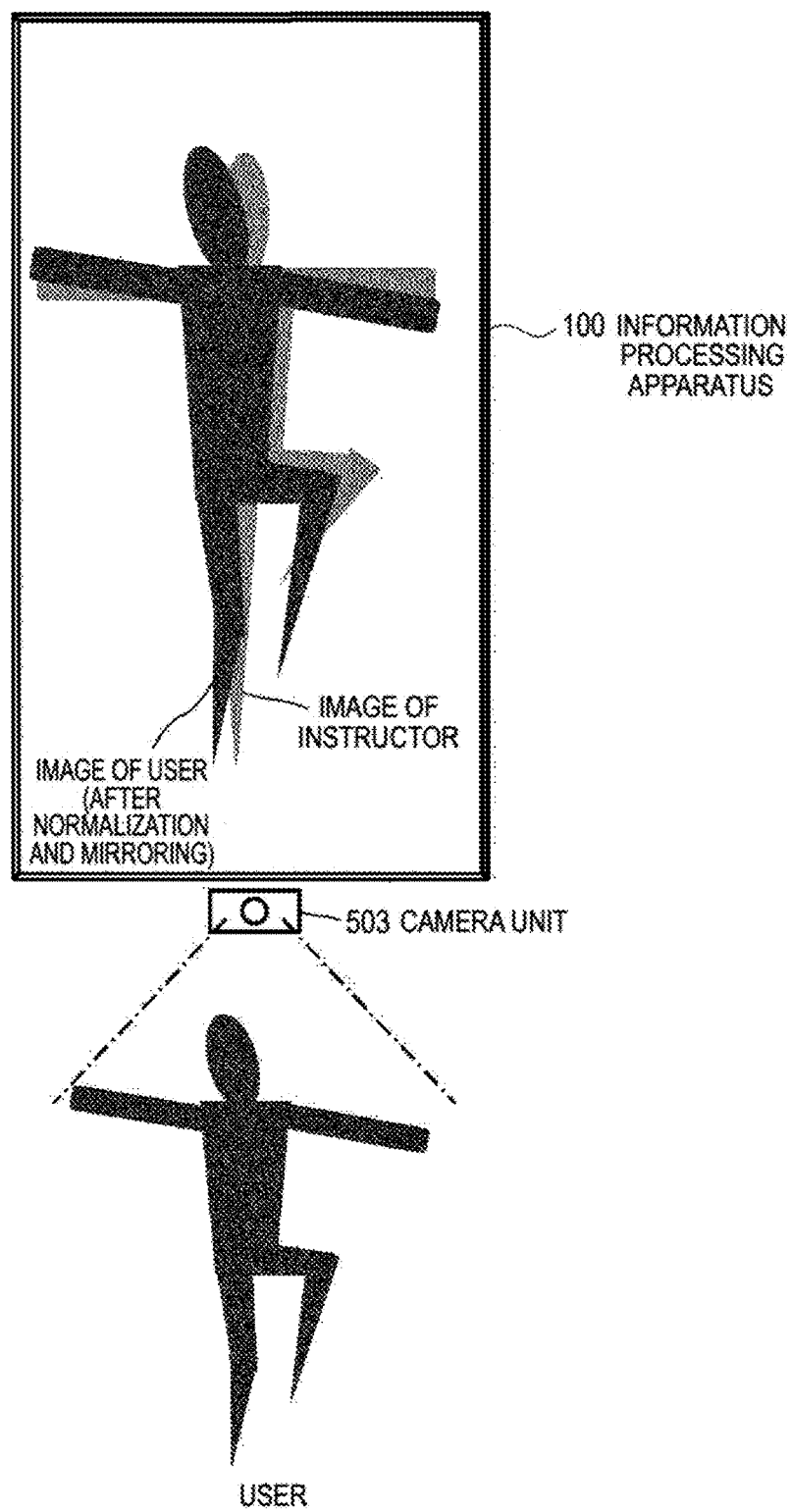
FIG. 39C is a diagram illustrating a state where the figure of the user normalized through the normalization process on plural images is displayed to overlap with the figure of the instructor.
Figure 40B:
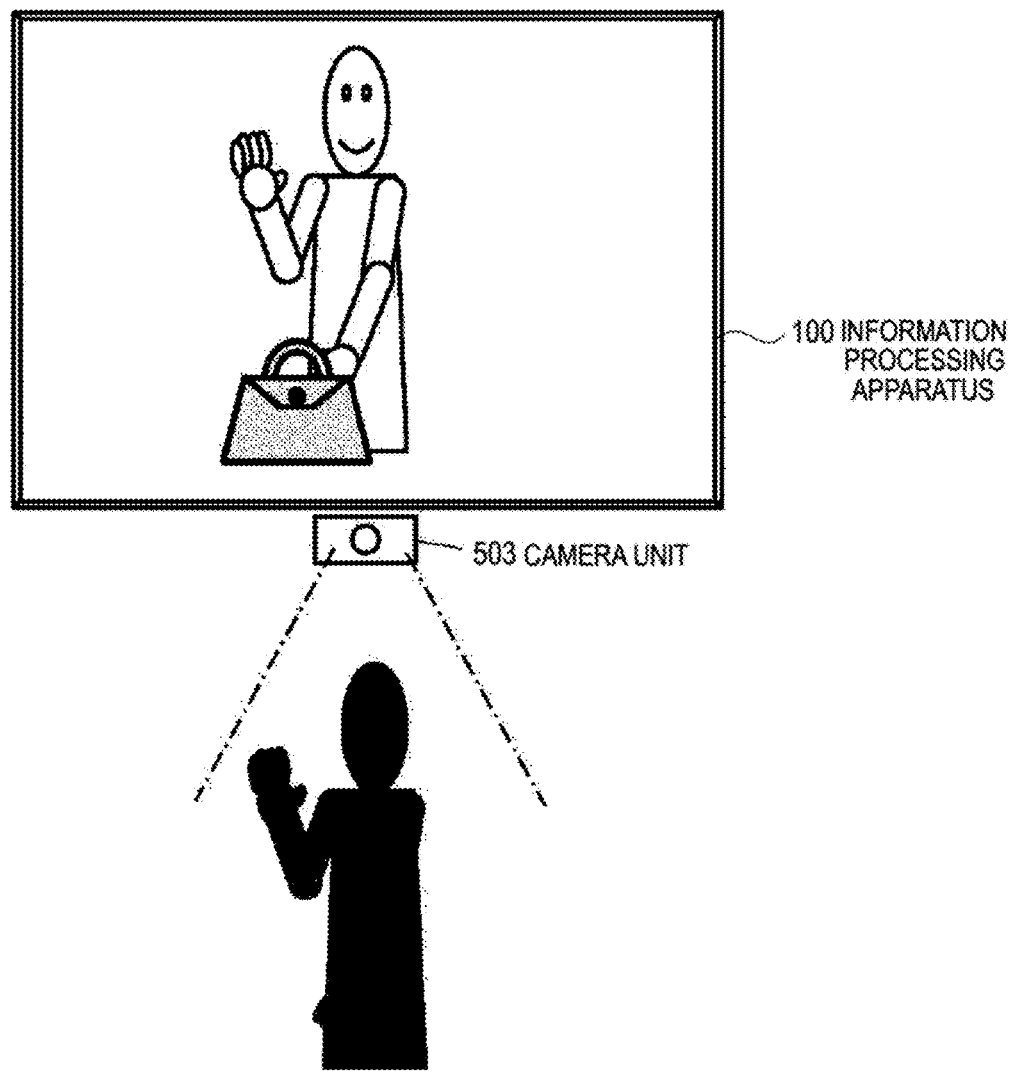
FIG. 40B is a diagram illustrating a state where a sample image of a product is displayed to overlap with the image of the user at an appropriate position with a correct size relationship.

The image normalizing process can be simply embodied using information such as the face size, the age, and the direction obtained through the face recognition or information such as the trunk shape or size obtained through the personal recognition. When plural images are displayed in a parallel or overlapping manner, a mirroring or rotating process is automatically performed on one image to easily match the other image FIG. 38B shows a state where the face sizes or positions of the users video-chatting with each other are matched with each other through the normalization process on the plural images. FIG. 39B shows a state where the sizes or positions of the figure of a user and the figure of the instructor displayed in parallel on the screen are matched with each other through the normalization process on the plural images. FIG. 40B shows a state where the sample image of a product is displayed to overlap with the image of the user taking a pose with the product on his or her hand at an appropriate position with a correct size relationship through the normalization process on the plural images. In FIG. 39B or 40B, a mirroring process is performed in addition to the size normalizing process, in order for the user to easily correct the posture of the user from the image captured with the camera unit 503. A rotating process may be performed if necessary. When the figure of the user and the figure of the instructor can be normalized, the images thereof are not displayed in parallel as shown in FIG. 39B, but may be displayed in an overlapping manner as shown in FIG. 39C, whereby the user can more easily recognize the difference between the posture of the user and the posture of the instructor.

FIG. 41 shows the internal configuration of the operation unit 120 for performing an image normalizing process. The operation unit 120 includes an inter-image normalizing unit 4110, a face normalizing unit 4120, and a real size extending unit 4130. Here, at least one function block of the inter-image normalizing unit 4110, the face normalizing unit 4120, and the real size extending unit 4130 is assumed to be implemented over a cloud server connected via the communication unit 150.

The inter-image normalizing unit 4110 performs a normalization process so that the size relationship between the face image of the user and another object is correctly displayed among plural images.

The inter-image normalizing unit 4110 receives an image of a user captured with the camera unit 503 through the input interface integrating unit 520. At this time, camera information such as panning, tilting, and zooming of the camera unit 503 at the time of imaging the user is also acquired. The inter-image normalizing unit 4110 acquires an image of another object to be displayed in parallel or overlap with the image of the user and acquires a pattern in which the image of the user and the image of another object is displayed in a parallel or overlapping manner from an image database. The image database may be disposed in the storage unit 140 or may be disposed over a database server which is accessed via the communication unit 150.

The inter-image normalizing unit 4110 performs an image process such as enlargement, rotation, and mirroring on the image of the user so that the size relationship or posture with respect to another object is corrected in accordance with a normalization algorithm, and generates camera control information used to control the panning, tilting, zooming, and the like of the camera unit 503 so as to appropriately capture an image of the user. The image of the user is displayed with a correct size relationship with the image of another object through the process of the inter-image normalizing unit 4110, for example, as shown in FIG. 40B.

The face normalizing unit 4120 performs a normalization process so that the face image of the user captured with the camera unit 503 is displayed with a correct size relationship with the face image in another object (for example, the face of the instructor in the image reproduced from a recording medium or the face of the opponent user video-chatting with the user).

The face normalizing unit 4120 receives the image of a user captured with the camera unit 503 through the input interface integrating unit 520. At this time, camera information such as panning, tilting, and zooming of the camera unit 503 at the time of imaging the user is also acquired. The face normalizing unit 4120 acquires a face image of another object to be displayed in parallel or overlap with the captured image of the user through the storage unit 140 or the communication unit 150.

The face normalizing unit 4120 performs an image process such as enlargement, rotation, and mirroring on the image of the user so that the size relationship of the face images is correct, and generates camera control information used to control the panning, tilting, zooming, and the like of the camera unit 503 so as to appropriately capture an image of the user. For example, as shown in FIGS. 38B, 39B, and 39C, the image of the user is displayed with a correct size relationship with the image of another face image through the process of the face normalizing unit 4120.

The real size extending unit 4130 realizes the parallel or overlapping display of objects implemented on the screen of the display unit 603 by the inter-image normalizing unit 4110 in a 3D, that is, to include the depth direction. When an object is displayed in a 3D through a binocular type or a parallax rays reconstruction type only in the horizontal direction, the desired effect is achieved only at a viewing position assumed at the time of generating a 3D image. An object can be displayed in a real size from any position through the parallax rays reconstruction type in all directions.

The real size extending unit 4130 detects a viewpoint position of a user and corrects a 3D image with respect to the detected position also in the binocular type or the parallax rays reconstruction type only in the horizontal direction, whereby the same real size display can be achieved from any position.

For example, commonly owned JP-A-2002-300602, JP-A-2005-149127, and JP-A-2005-142957 can be referred to.

F. Display Method of Image Content on Rotating Screen

As described above, the body of the information processing apparatus 100 according to this embodiment is rotatably and detachably attached to a wall, for example, through the use of the rotation and attachment mechanism unit 180. When the body is rotationally manipulated while the power source of the information processing apparatus 100 is turned on, that is, while an object to be manipulated is displayed on the display unit 603, the object is accordingly rotated so that a user can observe the object with a correct posture.

A method of optimally adjusting a display form of an image content at any rotation angle of the body of the information processing apparatus 100 or in the course of transition thereof will be described below.

Examples of the display form of an image content at any rotation angle of a screen or in the course of transition thereof include three methods of (1) a display form in which an image content is not covered at all at any rotation angle, (2) a display form in which a content of interest among image contents is maximized at any rotation angle, and (3) a display form in which an image content is rotated so as not to generate an invalid area.

Figure 42:
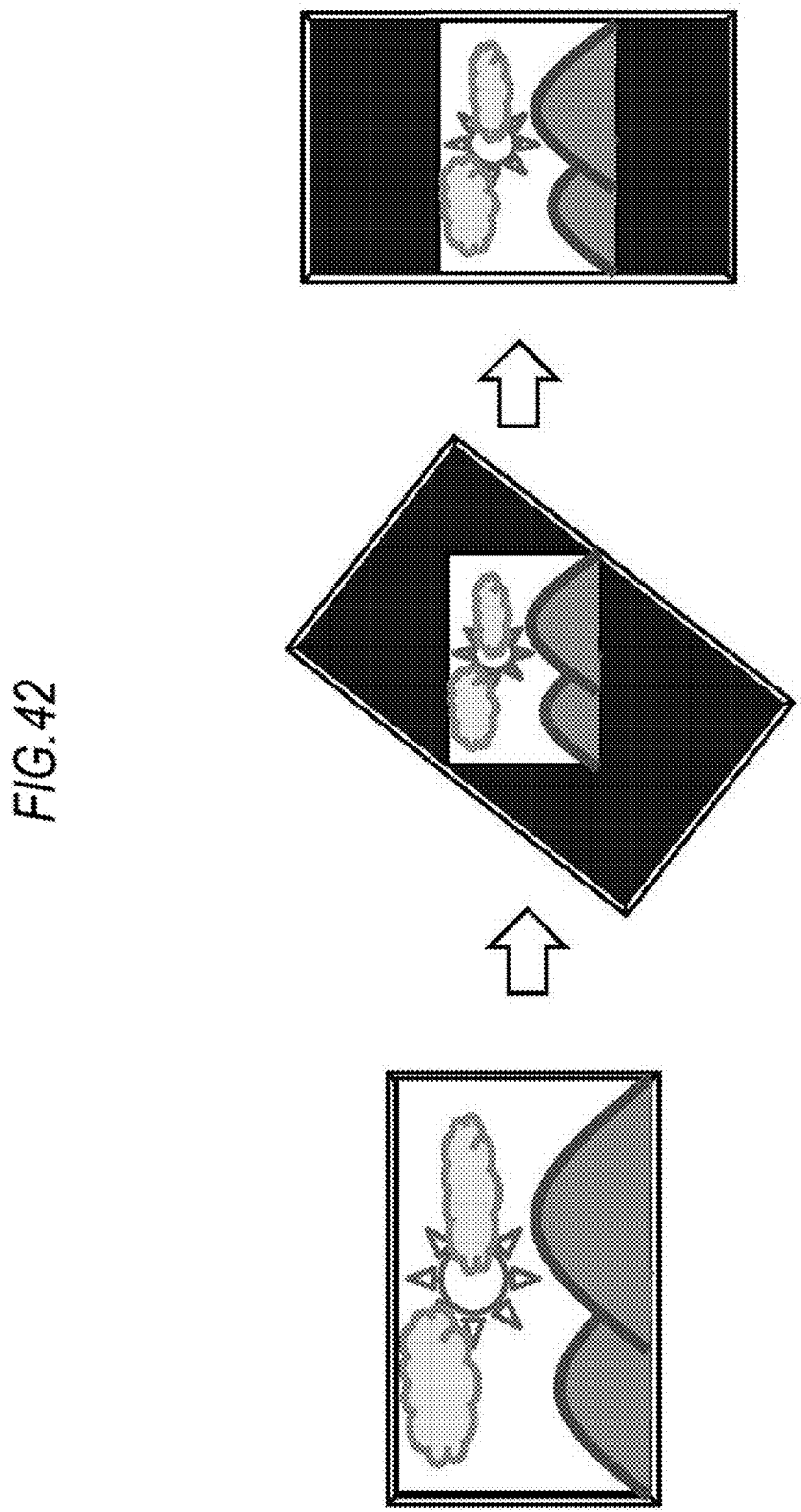
FIG. 42 is a diagram illustrating a display form in which the overall area of an image content is displayed so as not to cover the image content at any rotation angle.

FIG. 42 shows a display form in which the overall area of an image content is displayed so as not to cover the image content at any rotation angle while the information processing apparatus 100 (the screen) is being counterclockwise rotated by 90 degrees. As shown in the drawing, when a horizontally-long image content is displayed on the horizontally-placed screen and the screen is counterclockwise rotated by 90 degrees to be vertically placed, the image content is reduced in size and an invalid area indicated by black appears in the screen. In the course of changing the screen from the horizontally placed state to the vertically-placed state, the image content has the minimum size.

When at least a part of the image content is covered, there is a problem in that the image content as a copyrighted work loses the identity. In the display form shown in FIG. 42, the identity as a copyrighted work is guaranteed at any rotation angle or in the course of transition thereof. That is, this display form is suitable for a protective content.

Figure 43:
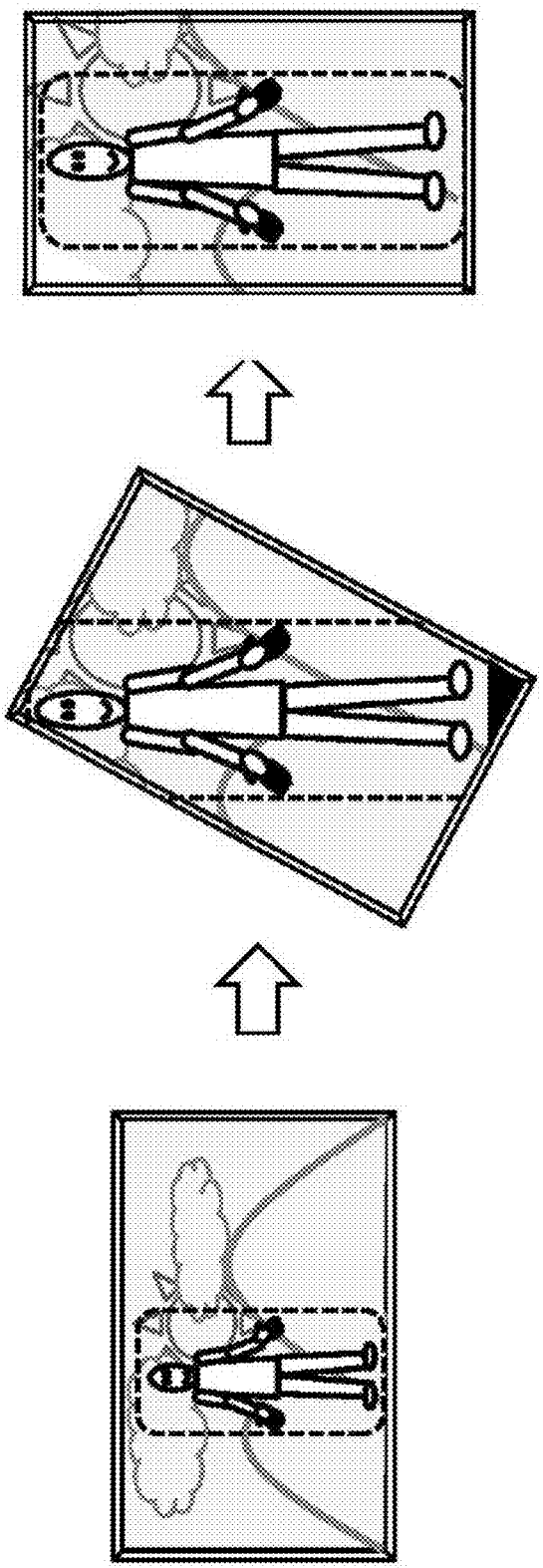
FIG. 43 is a diagram illustrating a display form in which an area of interest in an image content is maximized at any rotation angle.

FIG. 43 shows a display form in which an area of interest in the image content is maximized at any rotation angle in the course of counterclockwise rotating the information processing apparatus 100 (the screen) by 90 degrees. In the drawing, an area including a subject surrounded with a dotted line in an image content is set as an area of interest and this area of interest is maximized at any rotation angle. Since the area of interest is vertically long, the image content is enlarged by changing the screen from the horizontally-placed state to the vertically-placed sate. In the course of transition from the horizontally-placed state to the vertically-placed state, the area of interest is maximally enlarged in the diagonal direction of the screen. In the course of transition from the horizontally-placed state to the vertically-placed state, an invalid area expressed by black appears in the screen.

As a display form in which an area of interest in an image content attracts attention, a modified example where an image content is rotated while keeping the size of the area of interest constant can be considered. With the rotation of the screen, the area of interest seems to be smoothly rotated, but the invalid area is enlarged.

Figure 44:
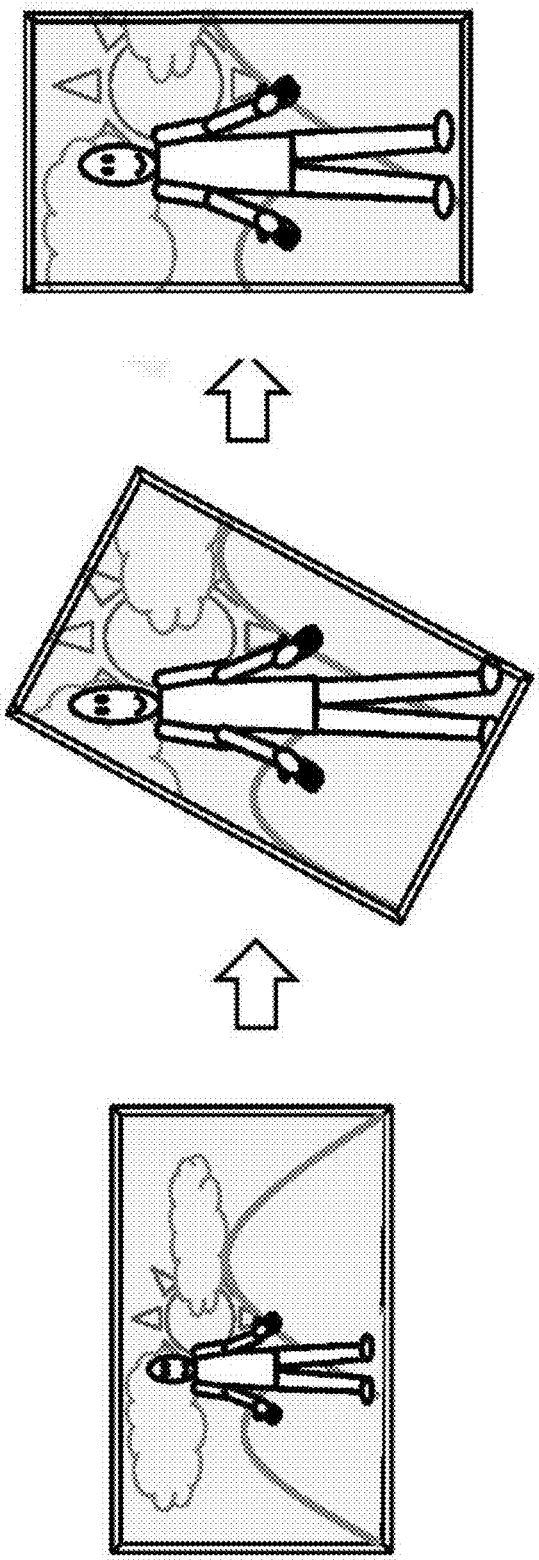
FIG. 44 is a diagram illustrating a display form in which an image content is rotated so as not to display an invalid area.

FIG. 44 shows a display form in which an image content is rotated so as not to generate an invalid area while counterclockwise rotating the information processing apparatus 100 (the screen) by 90 degrees.

Figure 45:
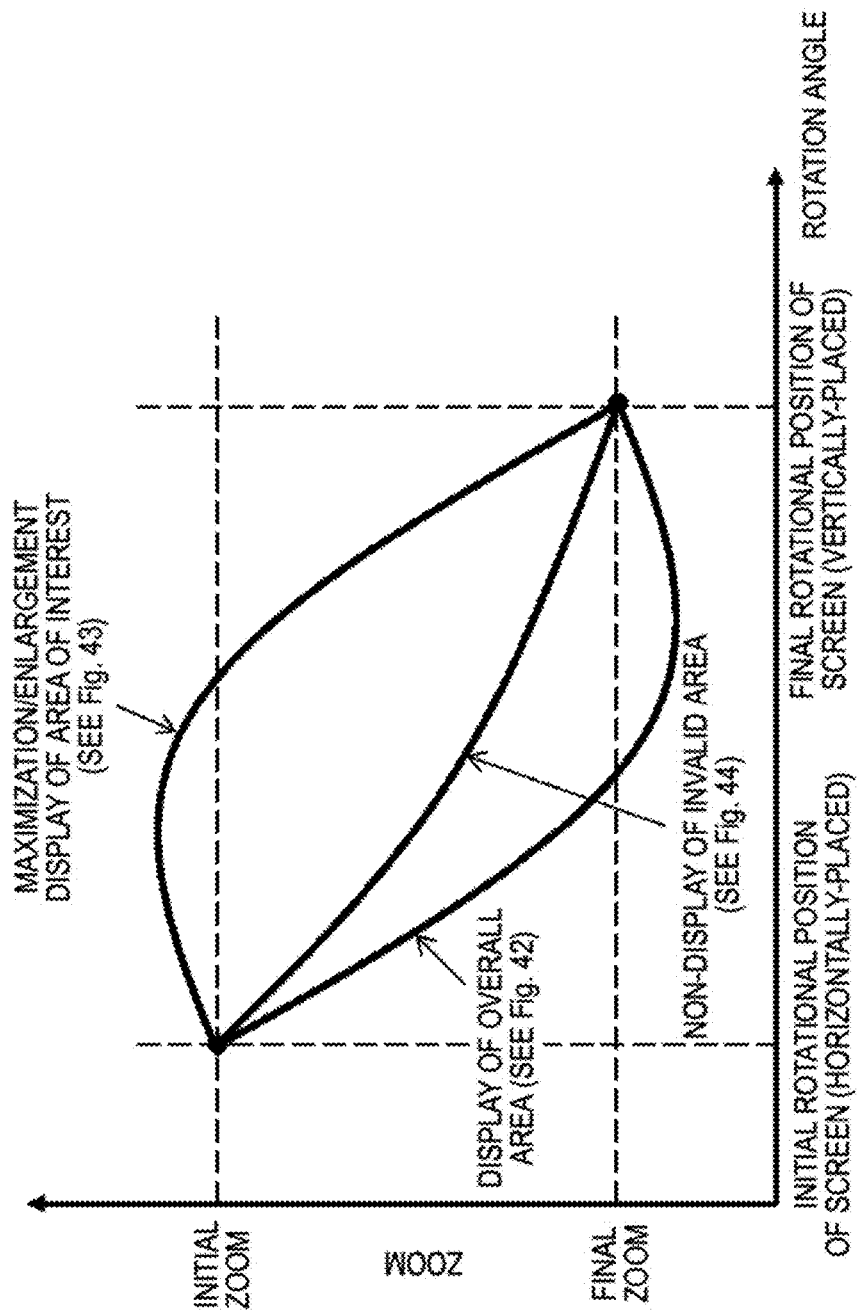
FIG. 45 is a diagram illustrating the relationship of a zoom ratio of an image content with respect to a rotational position in the display forms shown in FIGS. 42 to 44.

FIG. 45 shows the relationship between the rotational position and the zoom ratio of the image content in the display forms shown in FIGS. 42 to 44. In the display form shown in FIG. 42 in which an image content is not covered at all at any rotation angle, the content can be protected but a large invalid area is generated in the course of transition. Since the image is reduced in the course of transition, an unpleasant feeling may be given to the user. In the display form shown in FIG. 43 in which an area of interest in an image content is maximized at any rotation angle, the area of interest can be more smoothly displayed in the course of changing the screen, but an invalid area is generated in the course of transition. In the display form shown in FIG. 44, an invalid area is not generated in the course of transition, the image content is enlarged in the course of transition and thus an unnatural impression may be given to a user observing the image content.

Figure 46:
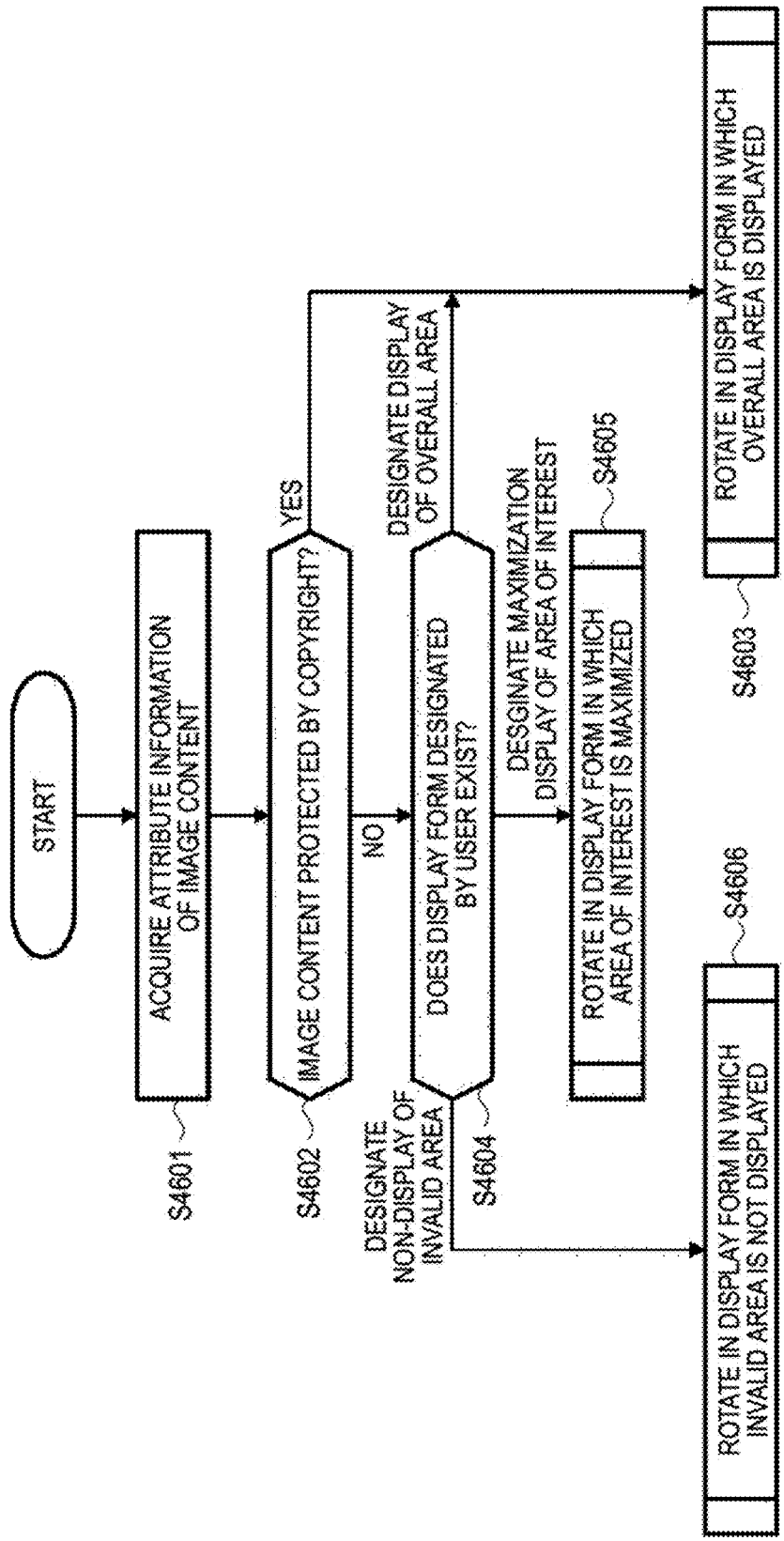
FIG. 46 is a flowchart illustrating the flow of a process of controlling the display form of an image content in the operation unit when rotating the information processing apparatus.

FIG. 46 is a flowchart illustrating the flow of processes of controlling the display form of an image content in the operation unit 120 when rotating the information processing apparatus 100 (the screen of the display unit 603). This flow of processes is started, for example, when the rotation and attachment mechanism unit 180 detects that the body of the information processing apparatus 100 is rotated or when the three-axis sensor 515 detects that the body of the information processing apparatus 100 is changed in rotational position.

When rotating the information processing apparatus 100 (the screen of the display unit 603), the operation unit 120 acquires attribute information of an image content displayed on the screen (step S4601). Then, it is checked whether or not the image content displayed on the screen is a content to be protected by the copyright or the like (step S4602).

Here, when the image content displayed on the screen is a content to be protected by the copyright or the like (YES in step S4602), the operation unit 120 selects a display form of displaying the overall area of the image content so as not to cover the image content at any rotation angle as shown in FIG. 42 (step S4603).

When the image content displayed on the screen is not a content to be protected by the copyright or the like (NO in step S4602), it is checked whether or not a display form designated by the user is present (step S4604).

When the user selects the display form of displaying the overall area of the image content, the flow of processes goes to step S4603. When the user selects the display form of maximally displaying the area of interest, the flow of processes goes to step S4605. When the user selects the display form of not displaying an invalid area, the flow of processes goes to step S4606. When the user does not select any display form, a display form set as a default out of the three display forms is selected.

FIG. 47 shows the internal configuration of the operation unit 120 for performing a process of adjusting the display form of an image content at any rotation angle of the body of the information processing apparatus 100 or in the course of transition thereof. The operation unit 120 includes a display form determining unit 4710, a rotational position input unit 4720, and an image processing unit 4730, and adjusts the display form of an image content reproduced from a received TV broadcast or a recording medium.

The display form determining unit 4710 determines the display form when rotating an image content at any rotation angle of the body of the information processing apparatus 100 or in the course of transition thereof in accordance with the flow of processes shown in FIG. 46.

The rotational position input unit 4720 receives the rotational position of the body of the information processing apparatus 100 (or the screen of the display unit 603) obtained by the rotation and attachment mechanism unit 180 or the three-axis sensor 515 via the input interface integrating unit 520.

The image processing unit 4730 processes the image content reproduced from a received TV broadcast or a recording medium so as to be suitable for the screen of the display unit 603 inclined by the rotational angle input to the rotational position input unit 4720, on the basis of the display form determined by the display form determining unit 4710.

G. Presently Disclosed Technique

The technique disclosed in this specification may have the following configurations.

(1)
An information processing apparatus including:
a control unit to control a user interface based on a determination of (i) a change in position of a user and (ii) a state of the user, by detecting at least one information signal input to the apparatus from outside of the apparatus.

(2)
The apparatus according to (1), wherein the user interface includes a graphical user interface to be displayed on a display unit.

(3)
The apparatus according to (2), wherein the apparatus includes the display unit.

(4)
The apparatus according to (1),
wherein the control unit controls at least one of a framework or an information density of one or more objects to be displayed on a display screen of a display unit and manipulated by a user, based on the change in the position and the state of the user.

(5)
The apparatus according to (1),
wherein the control unit controls at least one of a framework or an information density of one or more objects to be manipulated by a user, based on the change in the position and the state of the user.

(6)
The apparatus according to (1), wherein the control unit controls the user interface depending on whether the user is watching a display screen of a display unit.

(7)
The apparatus according to (6), wherein, when the user is watching the display screen, the control unit selects an automatic zapping process to display at least one object on the display screen.

(8)
The apparatus according to (1), wherein the control unit controls an information density of an object to be displayed on a display screen of a display unit based on the change in the position of the user.

(9)
The apparatus according to (1), wherein the control unit controls selection of an object to be displayed on a display screen of a display unit based on whether a position of the user is a position at which the user can be personally authenticated.

(10)
The apparatus according to (9), wherein, when the position of the user is a position at which the user can be personally authenticated, the control unit controls selection of the object to be displayed on the display screen using recognized information of the user.

(11)
The apparatus according to (1), wherein the control unit optimizes an input unit of the user interface based on the change in the position and the state of the user.

(12)
The apparatus according to (11), wherein the input unit includes at least one of a proximity sensor, a microphone, a touch sensor, a camera unit or a remote controller.

(13)
The apparatus according to (1), wherein the control unit optimizes an input unit of the user interface depending on whether the user is watching a display screen of a display unit.

(14)
The apparatus according to (1), wherein the control unit optimizes an input unit of the user interface based on the change in the position of the user.

(15)
The apparatus according to (1), wherein the control unit optimizes an input unit of the user interface based on whether a position of the user is a position at which the user can be personally authenticated.

(16)
The apparatus according to (1), wherein the control unit controls a process of switching between modes in which a distance from a display screen of a display unit to the user is detected, based on a distance detected.

(17)
The apparatus according to (1), wherein the control unit determines a change in position of the user relative to a display unit.

(18)
The apparatus according to (1), wherein the state of the user is determined based on the change in the position of the user.

(19)
An information processing method including:
controlling, by a processor, a user interface based on a determination of (i) a change in position of a user and (ii) a state of the user, by detecting at least one information signal input to an information processing apparatus from outside of the apparatus.

(20)
A non-transitory recording medium recorded with a program executable by a computer, the program including:
controlling a user interface based on a determination of (i) a change in position of a user and (ii) a state of the user, by detecting at least one information signal input to an information processing apparatus from outside of the apparatus (101)

An information processing apparatus including: a display unit, a user detecting unit that detects a user existing around the display unit, and an operation unit that processes an object to be displayed on the display unit when the user detecting unit detects a user.

(102)

The information processing apparatus according to (101), wherein the user detecting unit includes a proximity sensor disposed in each of four lateral edges of the screen of the display unit and detects a user present in the vicinity of the respective lateral edge.

(103)

The information processing apparatus according to (101), wherein the operation unit sets a user-occupied area for each detected user and a common area shared by the users in the screen of the display unit depending on the arrangement of the users detected by the user detecting unit.

(104)

The information processing apparatus according to (103), wherein the operation unit displays one or more objects to be manipulated by the users on the screen of the display unit.

(105)

The information processing apparatus according to (104), wherein the operation unit optimizes the objects to be manipulated in the user-occupied areas.

(106)

The information processing apparatus according to (104), wherein the operation unit rotates the objects to be manipulated in the user-occupied areas so as to exactly face the corresponding users.

(107)

The information processing apparatus according to (104), wherein the operation unit rotates the object moved from the common area or another user-occupied area to the corresponding user-occupied area so as to exactly face the corresponding user.

(108)

The information processing apparatus according to (107), wherein the operation unit controls the rotation direction in which the object to be manipulated is rotated on the basis of the manipulated position of the user relative to the position of the center of gravity of the object when the user drags and moves the object between the areas.

(109)

The information processing apparatus according to (103), wherein the operation unit displays a detection indicator indicating that a user is newly detected when a user-occupied area of the user newly detected by the user detecting unit is set in the screen of the display unit.

(110)

The information processing apparatus according to (104), further including a data transmitting and receiving unit that transmits and receives data to and from a terminal carried by a user.

(111)

The information processing apparatus according to (110), wherein the data transmitting and receiving unit performs a data transmitting and receiving process with the terminal carried by the user detected by the user detecting unit and the operation unit causes the object corresponding to the data received from the terminal carried by the user to appear in the corresponding user-occupied area.

(112)

The information processing apparatus according to (104), wherein the operation unit copies or divides an object to the user-occupied area as a destination when the object is moved between the user-occupied areas of the users.

(113)

The information processing apparatus according to (112), wherein the operation unit displays the copy of the object prepared as independent data in the user-occupied area as a destination.

(114)

information processing apparatus according to (112), wherein the operation unit displays the copy of the object, which is another window of an application which can be collaboratively manipulated by the users, in the user-occupied area as a destination.

(115)

An information processing method including: detecting a user existing around, and processing an object to be displayed when a user is detected in the detecting of the user.

(116)

A computer-readable computer program causing a computer to serve as: a display unit, a user detecting unit that detects a user existing around the display unit, and an operation unit that processes an object to be displayed on the display unit when the user detecting unit detects a user.

(201)

An information processing apparatus including: a display unit; a user position detecting unit that detects a position of a user with respect to the display unit; a user state detecting unit that detects a user state with respect to a display screen of the display unit; and an operation unit that controls a GUI to be displayed on the display unit on the basis of the position of the user detected by the user position detecting unit and the user state detected by the user state detecting unit.

(202)

The information processing apparatus according to (201), wherein the operation unit controls a framework or an information density of one or more objects to be displayed on the display screen of the display unit and to be manipulated by a user on the basis of the position of the user and the user state.

(203)

The information processing apparatus according to (201), wherein the operation unit controls a framework of an object to be displayed on the display screen depending on whether or not the user is watching the display screen of the display unit.

(204)

The information processing apparatus according to (201), wherein the operation unit controls an information density of an object to be displayed on the display screen of the display unit on the basis of the position of the user.

(205)

The information processing apparatus according to (201), wherein the operation unit controls selection of an object to be displayed on the display screen of the display unit depending on whether or not the user is located at a position at which the user can be personally authenticated.

(206)

The information processing apparatus according to (201), further including one or more input units that allow the user to manipulate an object displayed on the display screen of the display unit, wherein the operation unit controls a framework of an object to be displayed on the display screen depending on whether or not the user is manipulating the object by the use of the input unit.

(207)
An information processing apparatus including: a display unit; one or more input units that allow a user to manipulate an object to be displayed on a display screen of the display unit; a user position detecting unit that detects a position of the user with respect to the display unit; a user state detecting unit that detects a user state with respect to the display screen of the display unit; and an operation unit that optimizes the input unit on the basis of the position of the user detected by the user position detecting unit and the user state detected by the user state detecting unit.

(208)
The information processing apparatus according to (207), wherein the operation unit controls the optimization of the input unit depending on whether or not the user is watching the display screen of the display unit.

(209)
The information processing apparatus according to (207), wherein the operation unit optimizes the input unit on the basis of the position of the user detected by the user position detecting unit in a state where the user is watching the display screen of the display unit.

(210)
An information processing apparatus including: a display unit; a user position detecting unit that detects a position of a user with respect to the display unit; a plurality of distance detection modes of detecting a distance from a display screen of the display unit to the user; and an operation unit that controls switching between the distance detection modes on the basis of the position of the user detected by the user position detecting unit.

(211)
The information processing apparatus according to (210), wherein the operation unit normally turns on the distance detection mode of detecting the distance to the user located far.

(212)
The information processing apparatus according to (210), wherein the operation unit turns on the distance detection mode of detecting the distance to the user located nearby and performing a recognition process only in a distance range in which a sufficient recognition accuracy is obtained.

(213)
An information processing method including: detecting a position of a user with respect to a display screen; detecting a user state with respect to the display screen; and controlling a GUI to be displayed on the display screen on the basis of the position of the user detected in the detecting of the position of the user and the user state detected in the detecting of the user state.

(214)
An information processing method including: detecting a position of a user with respect to a display screen; detecting a user state with respect to the display screen; and optimizing one or more input units that allow the user to manipulate an object displayed on the display screen on the basis of the position of the user detected in the detecting of the position of the user and the user state detected in the detecting of the user state.

(215)
An information processing method including: detecting a position of a user with respect to a display screen; and controlling switching between a plurality of distance detection modes of detecting a distance from a display screen of the display unit to the user on the basis of the position of the user detected in the detecting of the position of the user.

(216)
A computer-readable computer program causing a computer to serve as: a display unit; a user position detecting unit that detects a position of a user with respect to the display unit; a user state detecting unit that detects a user state with respect to a display screen of the display unit; and an operation unit that controls a GUI to be displayed on the display unit on the basis of the position of the user detected by the user position detecting unit and the user state detected by the user state detecting unit.

(217)
A computer-readable computer program causing a computer to serve as: a display unit; one or more input units that allow a user to manipulate an object to be displayed on a display screen of the display unit; a user position detecting unit that detects a position of the user with respect to the display unit; a user state detecting unit that detects a user state with respect to the display screen of the display unit; and an operation unit that optimizes the input unit on the basis of the position of the user detected by the user position detecting unit and the user state detected by the user state detecting unit.

(218)
A computer-readable computer program causing a computer to serve as: a display unit; a user position detecting unit that detects a position of a user with respect to the display unit; a plurality of distance detection modes of detecting a distance from a display screen of the display unit to the user; and an operation unit that controls switching between the distance detection modes on the basis of the position of the user detected by the user position detecting unit.

(301)
An information processing apparatus including: a display unit; an object image acquiring unit that acquires an image of an object to be displayed on a screen of the display unit; a real size acquiring unit that acquires information on a real size of the object to be displayed on the screen of the display unit; and an operation unit that processes the image of the object on the basis of the real size of the object acquired by the real size acquiring unit.

(302)
The information processing apparatus according to (301), further including a display performance acquiring unit that acquires information on display performance including a size and a resolution of the screen of the display unit, wherein the operation unit processes the image of the object to be displayed in a real size on the screen of the display unit on the basis of the real size of the object acquired by the real size acquiring unit and the display performance acquired by the display performance acquiring unit.

(303)
The information processing apparatus according to (301), wherein when images of a plurality of objects acquired by the object image acquiring unit are simultaneously displayed on the screen of the display unit, the operation unit processes the images of the plurality of objects so as to correctly display the mutual size relationship of the images of the plurality of objects.

(304)
The information processing apparatus according to (301), further including: a camera unit; and a real size estimating unit that estimates the real size of an object included in an image captured by the camera unit.

(305)
The information processing apparatus according to (301), further including: a camera unit; an image recognizing unit that recognizes a face of a user included in an image captured by the camera unit and acquires face data; a distance detecting unit that detects a distance to the user; and a real size estimating unit that estimates the real size of the face of the user on the basis of the face data of the user and the distance to the user.

(306)
An information processing method including: acquiring an image of an object to be displayed on a screen; acquiring information on a real size of the object to be displayed on the screen; and processing the image of the object on the basis of the real size of the object acquired in the acquiring of the information on the real size of the object.

(307)
A computer-readable computer program causing a computer to serve as: a display unit; an object image acquiring unit that acquires an image of an object to be displayed on a screen of the display unit; a real size acquiring unit that acquires information on a real size of the object to be displayed on the screen of the display unit; and an operation unit that processes the image of the object on the basis of the real size of the object acquired by the real size acquiring unit.

(401)
An information processing apparatus including: a camera unit; a display unit; and an operation unit that normalizes an image of a user captured by the camera unit when displaying the image of the user on a screen of the display unit.

(402)
The information processing apparatus according to (401), further including: an object image acquiring unit that acquires an image of an object to be displayed on the screen of the display unit; and a parallel or overlapping pattern acquiring unit that acquires a parallel or overlapping pattern in which the image of the user and the image of the object are displayed on the screen of the display unit in a parallel or overlapping manner, wherein the operation unit normalizes the image of the user and the object so as to correct the size relationship and the positions of the image of the user and the object and displays the normalized image of the user and the normalized object in a parallel or overlapping manner on the basis of the acquired parallel or overlapping pattern.

(403)
The information processing apparatus according to (402), wherein the operation unit controls the camera unit to normalize the image of the user captured by the camera unit.

(404)
The information processing apparatus according to (401), further including a user face data acquiring unit that acquires face data of the user imaged by the camera unit; and an intra-object face data acquiring unit that acquires face data in the object to be displayed on the screen of the display unit, wherein the operation unit performs a normalization process so as to correct the size relationship and the positions of the face data of the user and the intra-object face data.

(405)
The information processing apparatus according to (404), wherein the operation unit controls the camera unit to normalize the image of the user captured by the camera unit.

(406)
An information processing method including: acquiring an image of an object to be displayed on a screen; acquiring a parallel or overlapping pattern in which the image of the user captured by the camera unit and the image of the object are displayed on the screen of the display unit in a parallel or overlapping manner, normalizing the image of the user and the object so as to correct the size relationship and the positions of the image of the user and the object; and processing the normalized image of the user and the normalized object in a parallel or overlapping manner on the basis of the acquired parallel or overlapping pattern.

(407)
An information processing method including: acquiring face data of the user imaged by the camera unit; acquiring face data in the object to be displayed on the screen; and performing a normalization process so as to correct the size relationship and the positions of the face data of the user and the intra-object face data.

(408)
A computer-readable computer program causing a computer to serve as: a camera unit; a display unit; and an operation unit that normalizes an image of a user captured by the camera unit when displaying the image of the user on a screen of the display unit.

(501)
An information processing apparatus including: a display unit that displays an image content on a screen; a rotation angle detecting unit that detects a rotation angle of the screen; a display form determining unit that determines a display form of the image content at any rotation angle of the screen or in the course of transition thereof; and an image processing unit that processes the image content on the basis of the display form determined by the display form determining unit so as to be suitable for the screen inclined by the rotation angle detected by the rotation angle detecting unit.

(502)
The information processing apparatus according to (501), wherein the display form determining unit determines the display form out of a plurality of display forms including three display forms of a display form in which the image content is not covered at all at any rotation angle, a display form in which a content of interest in the image content is maximized at any rotation angle, and a display form in which the image content is rotated so as not to generate an invalid area.

(503)
The information processing apparatus according to (501), wherein the display form determining unit determines the display format any rotation angle of the screen or in the course of transition thereof on the basis of attribute information of the image content.

(504)
The information processing apparatus according to (501), wherein the display form determining unit determines the display form in which the image content is not covered at all at any rotation angle for a protected image content.

(505)
An information processing method including: detecting a rotation angle of a screen on which an image content is displayed; determining a display form of the image content at any rotation angle of the screen or in the course of transition thereof; and processing the image content on the basis of the display form determined in the determining of the display form so as to be suitable for the screen inclined by the rotation angle detected in the detecting of the rotation angle.

(506)
A computer-readable computer program causing a computer to serve as: a display unit that displays an image content on a screen; a rotation angle detecting unit that detects a rotation angle of the screen; a display form determining unit that determines a display form of the image content at any rotation angle of the screen or in the course of transition thereof; and an image processing unit that processes the image content on the basis of the display form determined by the display form determining unit so as to be suitable for the screen inclined by the rotation angle detected by the rotation angle detecting unit.

The present disclosure has been described hitherto with reference to the specific embodiments. However, it is obvious to those skilled in the art that the embodiments may be modified or substituted without departing from the concept of the present disclosure.

In this specification, a TV receiver set having a large screen is exemplified as the information processing apparatus 100 to which the present disclosure is applied, but the concept of the present disclosure is not limited to the example. The present disclosure can be similarly applied to information processing apparatuses such as personal computers or tablet terminals other than the TV receiver set or information processing apparatus having a small screen size.

While the present disclosure has been described with reference to the above-mentioned examples, the description of the present disclosure should not be analyzed in a limited way. The concept of the present disclosure should be determined with reference to the appended claims.

It should be understood by those skilled in the art that various modifications, combinations, sub-combinations and alterations may occur depending on design requirements and other factors insofar as they are within the scope of the appended claims or the equivalents thereof.

EXPLANATION OF REFERENCE

100: INFORMATION PROCESSING APPARATUS
110: INPUT INTERFACE UNIT
120: OPERATION UNIT
130: OUTPUT INTERFACE UNIT
140: STORAGE UNIT
150: COMMUNICATION UNIT
160: POWER SOURCE UNIT
170: TELEVISION TUNER UNIT
180: ROTATION AND ATTACHMENT MECHANISM UNIT
501: REMOTE CONTROLLER RECEPTION UNIT
502: SIGNAL ANALYZING UNIT
503: CAMERA UNIT
504: IMAGE RECOGNIZING UNIT
505: MICROPHONE UNIT
506: SPEECH RECOGNIZING UNIT
507: DISTANCE SENSOR
508: SIGNAL ANALYZING UNIT
509: TOUCH SENSOR
510: SIGNAL ANALYZING UNIT
511: PROXIMITY SENSOR
512: SIGNAL ANALYZING UNIT
513: VERY-SHORT-RANGE COMMUNICATION UNIT
514: SIGNAL ANALYZING UNIT
515: THREE-AXIS SENSOR UNIT
516: GPS RECEPTION UNIT
517: SIGNAL ANALYZING UNIT
520: INPUT INTERFACE INTEGRATING UNIT
601: CONTENT DISPLAYING UNIT
602: GUI DISPLAYING UNIT
603: DISPLAY UNIT
604: SPEAKER UNIT
605: ILLUMINATION DISPLAYING UNIT
606: ILLUMINATION UNIT
710: MONITOR AREA DIVIDING UNIT
711: DEVICE DATABASE
712: AREA DIVISION PATTERN DATABASE
720: OBJECT OPTIMIZING UNIT
721: OPTIMIZING ALGORITHM
730: DEVICE INTERACTION DATA TRANSMITTING AND RECEIVING UNIT
731: TRANSMITTING AND RECEIVING ALGORITHM
2310: DISPLAY GUI OPTIMIZING UNIT
2320: INPUT UNIT OPTIMIZING UNIT
2330: DISTANCE DETECTION MODE SWITCHING UNIT
3210: REAL SIZE DISPLAYING UNIT
3220: REAL SIZE ESTIMATING UNIT
3230: REAL SIZE EXTENDING UNIT
4110: INTER-IMAGE NORMALIZING UNIT
4120: FACE NORMALIZING UNIT
4130: REAL SIZE EXTENDING UNIT
4710: DISPLAY FORM DETERMINING UNIT
4720: ROTATIONAL POSITION INPUT UNIT
4730: IMAGE PROCESSING UNIT

The invention claimed is:

1. An information processing apparatus comprising:
a distance sensor; and
a processor device to control at least one of a framework or an information density of one or more objects to be manipulated by a user in a user interface based on a determination of (i) a change in position of the user with respect to a display unit of the apparatus and (ii) a state of the user, by detecting at least one information signal input to the apparatus from outside of the apparatus,
wherein the processor device performs at least one of (i) controlling selection of an object to be displayed on the user interface of a display screen of the display unit based on a determination of whether a position of the user is a position at which the user can be personally authenticated, and (ii) adjusting an input unit of the user interface based on the determination of whether the position of the user is a position at which the user can be personally authenticated,
wherein the determination of whether the position of the user is a position at which the user can be personally authenticated is based on a signal from the distance sensor such that when the signal from the distance sensor indicates that the user is at a distance from the apparatus that is greater than, or equal to, a first distance and less than, or equal to, a second distance, the position of the user is a position at which the user can be personally authenticated, and
wherein the processor device controls random display of various objects including network contents acquired via the Internet, E-Mails or program contents of a TV broadcast on the user interface in an overlapping manner, when the user is present but not watching the display screen, and wherein the processor device controls display of the various objects in a non-overlapping manner by dividing the screen into stages and controls the information density of the various objects, when the user is watching the display screen but not manipulating the information processing apparatus.

2. The information processing apparatus of claim 1, wherein the user interface includes a graphical user interface to be displayed on the display unit.

3. The information processing apparatus of claim 2, wherein the information processing apparatus includes the display unit.

4. The information processing apparatus of claim 1, wherein the processor device controls at least one of the framework or the information density of the one or more objects to be displayed on the display screen of the display unit and manipulated by the user, based on the change in the position and the state of the user.

5. The information processing apparatus of claim 1, wherein the processor device controls the user interface depending on whether the user is watching the display screen of the display unit.

6. The information processing apparatus of claim 5 wherein, when the user is watching the display screen, the processor device selects an automatic zapping process to display at least one object on the display screen.

7. The information processing apparatus of claim 1, wherein the processor device controls the information density of an object to be displayed on the display screen of the display unit based on the change in the position of the user.

8. The information processing apparatus of claim 1 wherein, when the position of the user is a position at which the user can be personally authenticated, the processor device controls selection of the object to be displayed on the display screen using recognized information of the user.

9. The information processing apparatus of claim 1, wherein the processor device adjusts the input unit of the user interface based on the change in the position and the state of the user.

10. The information processing apparatus of claim 9, wherein the input unit includes at least one of a proximity sensor, a microphone, a touch sensor, a camera unit or a remote controller.

11. The information processing apparatus of claim 1, wherein the processor device adjusts the input unit of the user interface depending on whether the user is watching the display screen of the display unit.

12. The information processing apparatus of claim 1, wherein the processor device adjusts the input unit of the user interface based on the change in the position of the user.

13. The information processing apparatus of claim 1, wherein the processor controls a process of switching between modes in which a distance from the display screen of the display unit to the user is detected, based on the distance detected.

14. The information processing apparatus of claim 1, wherein the processor determines a change in position of the user relative to the display unit.

15. The information processing apparatus of claim 1, wherein the state of the user is determined based on the change in the position of the user.

16. An information processing method for an information processing apparatus, said method comprising:
obtaining a signal from a distance sensor; and
controlling, by a processor, at least one of a framework or an information density of one or more objects to be manipulated by a user in a user interface based on a determination of (i) a change in position of the user with respect to a display unit of the apparatus and (ii) a state of the user, by detecting at least one information signal input to the apparatus from outside of the apparatus,
wherein the processor controls at least one of (i) selection of an object to be displayed on the user interface of a display screen of the display unit based on a determination of whether a position of the user is a position at which the user can be personally authenticated, and (ii) adjustment of an input unit of the user interface based on the determination of whether the position of the user is a position at which the user can be personally authenticated,
wherein the determination of whether the position of the user is a position at which the user can be personally authenticated is based on the signal from the distance sensor such that when the signal from the distance sensor indicates that the user is at a distance from the apparatus that is greater than, or equal to, a first distance and less than, or equal to, a second distance, the position of the user is a position at which the user can be personally authenticated, and
wherein the processor controls random display of various objects including network contents acquired via the Internet, E-Mails or program contents of a TV broadcast on the user interface in an overlapping manner, when the user is present but not watching the display screen, and wherein the processor controls display of the various objects in a non-overlapping manner by dividing the screen into stages and controls the information density of the various objects, when the user is watching the display screen but not manipulating the information processing apparatus.

17. The information processing method of claim 16, further comprising controlling, by the processor, a process of switching between modes in which a distance from the display screen of the display unit to the user is detected, based on the distance detected.

18. A non-transitory computer-readable recording medium having recorded thereon a program which when executed by a computer causes an information processing apparatus to perform a method comprising:
obtaining a signal from a distance sensor; and
controlling at least one of a framework or an information density of one or more objects to be manipulated by a user in a user interface based on a determination of (i) a change in position of the user with respect to a display unit of the apparatus and (ii) a state of the user, by detecting at least one information signal input to the apparatus from outside of the apparatus,
wherein the controlling step comprises at least one of (i) selecting an object to be displayed on the user interface of a display screen of the display unit based on a determination of whether a position of the user is a position at which the user can be personally authenticated, and (ii) adjusting an input unit of the user interface based on the determination of whether the position of the user is a position at which the user can be personally authenticated,
wherein the determination of whether the position of the user is a position at which the user can be personally authenticated is based on the signal from the distance sensor such that when the signal from the distance sensor indicates that the user is at a distance from the apparatus that is greater than, or equal to, a first distance and less than, or equal to, a second distance, the position of the user is a position at which the user can be personally authenticated, and
wherein the controlling step further comprises controlling random display of various objects including network contents acquired via the Internet, E-Mails or program contents of a TV broadcast on the user interface in an overlapping manner, when the user is present but not watching the display screen, and controlling display of the various objects in a non-overlapping manner by dividing the screen into stages and controlling the information density of the various objects, when the user is watching the display screen but not manipulating the information processing apparatus.

* * * * *